(12) United States Patent
Breed

(10) Patent No.: US 7,783,403 B2
(45) Date of Patent: Aug. 24, 2010

(54) SYSTEM AND METHOD FOR PREVENTING VEHICULAR ACCIDENTS

(75) Inventor: David S. Breed, Miami Beach, FL (US)

(73) Assignee: Automotive Technologies International, Inc., Denville, NJ (US)

( * ) Notice: Subject to any disclaimer, the term of this patent is extended or adjusted under 35 U.S.C. 154(b) by 286 days.

(21) Appl. No.: 11/874,275

(22) Filed: Oct. 18, 2007

(65) Prior Publication Data

US 2008/0040004 A1 Feb. 14, 2008

Related U.S. Application Data

(63) Continuation-in-part of application No. 11/183,598, filed on Jul. 18, 2005, now Pat. No. 7,359,782, which is a continuation-in-part of application No. 11/111,474, filed on Apr. 21, 2005, now Pat. No. 7,209,221, which is a continuation-in-part of application No. 10/754,014, filed on Jan. 8, 2004, now Pat. No. 6,885,968, which is a continuation-in-part of application No. 09/851,362, filed on May 8, 2001, now Pat. No. 7,049,945, said application No. 11/111,474 is a continuation-in-part of application No. 10/180,466, filed on Jun. 26, 2002, now Pat. No. 6,918,459, which is a continuation-in-part of application No. 10/097,082, filed on Mar. 13, 2002, now Pat. No. 6,755,273, said application No. 11/183,598 is a continuation-in-part of application No. 10/180,466, filed on Jun. 26, 2002, now Pat. No. 6,918,459, which is a continuation-in-part of application No. 10/097,082, filed on Mar. 13, 2002, now Pat. No. 6,755,273, which is a continuation-in-part of application No. 09/825,173, filed on Apr. 3, 2001, now Pat. No. 6,623,033.

(60) Provisional application No. 60/442,204, filed on Jan. 24, 2003, provisional application No. 60/202,424, filed on May 8, 2000.

(51) Int. Cl.
*B60R 21/00* (2006.01)
*G08G 1/16* (2006.01)

(52) U.S. Cl. .......................... 701/45; 701/301; 340/435; 340/557; 340/995.13

(58) Field of Classification Search .................. 701/45, 701/301; 340/435, 557, 995.13
See application file for complete search history.

(56) References Cited

U.S. PATENT DOCUMENTS 3,684,309 A 8/1972 Uchiyamada et al.
(Continued)

FOREIGN PATENT DOCUMENTS

DE 2320147 11/1974
(Continued)

OTHER PUBLICATIONS

English-language translation of Notice of Rejection for JP Application No. H7-149552 dated Oct. 19, 2004.
(Continued)

*Primary Examiner*—Thomas G Black
*Assistant Examiner*—Wae Louie
(74) *Attorney, Agent, or Firm*—Brian Roffe

(57) ABSTRACT

Vehicle including an anticipatory sensor system for determining that an impact involving the vehicle is about to occur unless a corrective action is taken based on data obtained prior to the impact and determining whether the potential impact requires activation of a reactive system which controls operation of the vehicle. The anticipatory sensor system includes a receiver for receiving waves or energy and a pattern recognition system for analyzing the received waves or energy, or data representative thereof, to determine that an impact is about to occur if corrective action is not taken and whether the potential impact requires activation of the reactive system. The pattern recognition system ascertains the identity of an object from which the waves or energy have been emitted, reflected or generated, so that the determination whether the impact requires activation of the reactive system is based on identification of the object.

16 Claims, 12 Drawing Sheets

U.S. PATENT DOCUMENTS

| | | | |
|---|---|---|---|
| 4,257,705 A | 3/1981 | Hosoe et al. | |
| 4,673,937 A | 6/1987 | Davis | |
| 4,867,570 A | 9/1989 | Sorimachi et al. | |
| 4,966,388 A | 10/1990 | Warner et al. | |
| 5,227,786 A | 7/1993 | Hancock | |
| 5,247,296 A | 9/1993 | Spies | |
| 5,283,575 A | 2/1994 | Kao et al. | |
| 5,314,037 A * | 5/1994 | Shaw et al. | 180/169 |
| 5,348,342 A | 9/1994 | Haland et al. | |
| 5,377,108 A | 12/1994 | Nishio | |
| 5,434,788 A * | 7/1995 | Seymour et al. | 701/207 |
| 5,529,138 A * | 6/1996 | Shaw et al. | 180/169 |
| 5,541,590 A | 7/1996 | Nishio | |
| 5,581,232 A | 12/1996 | Tanaka et al. | |
| 5,596,332 A | 1/1997 | Coles et al. | |
| 5,629,681 A | 5/1997 | DuVall et al. | |
| 5,694,320 A | 12/1997 | Breed | |
| 5,774,831 A | 6/1998 | Gupta | |
| 5,829,782 A | 11/1998 | Breed et al. | |
| 5,983,161 A * | 11/1999 | Lemelson et al. | 701/301 |
| 6,058,339 A | 5/2000 | Takiguchi et al. | |
| 6,209,909 B1 | 4/2001 | Breed | |
| 6,275,773 B1 * | 8/2001 | Lemelson et al. | 701/301 |
| 6,343,810 B1 | 2/2002 | Breed | |
| 6,363,326 B1 | 3/2002 | Scully | |
| 6,405,132 B1 * | 6/2002 | Breed et al. | 701/301 |
| 6,487,500 B2 | 11/2002 | Lemelson et al. | |
| 6,553,130 B1 * | 4/2003 | Lemelson et al. | 382/104 |
| 6,623,033 B2 * | 9/2003 | Breed | 280/735 |
| 6,636,300 B2 | 10/2003 | Doemens et al. | |
| 6,755,273 B2 * | 6/2004 | Breed | 180/274 |
| 6,768,944 B2 * | 7/2004 | Breed et al. | 701/301 |
| 6,885,968 B2 * | 4/2005 | Breed et al. | 702/143 |
| 6,906,639 B2 * | 6/2005 | Lemelson et al. | 340/903 |
| 6,918,459 B2 * | 7/2005 | Breed | 180/282 |
| 6,977,630 B1 | 12/2005 | Donath et al. | |
| 7,016,519 B1 | 3/2006 | Nakamura et al. | |
| 7,049,945 B2 * | 5/2006 | Breed et al. | 340/435 |
| 7,147,246 B2 | 12/2006 | Breed et al. | |
| 7,209,221 B2 * | 4/2007 | Breed et al. | 356/5.02 |
| 7,232,001 B2 | 6/2007 | Hakki et al. | |
| 7,359,782 B2 * | 4/2008 | Breed | 701/45 |
| 2008/0040004 A1 * | 2/2008 | Breed | 701/45 |

FOREIGN PATENT DOCUMENTS

| | | |
|---|---|---|
| DE | 4218599 | 12/1993 |
| EP | 0546928 | 6/1993 |
| EP | 0568017 A2 | 11/1993 |
| GB | 1333269 | 10/1973 |
| GB | 2279841 | 1/1995 |
| GB | 2289786 | 11/1995 |
| GB | 2297008 | 7/1996 |
| GB | 2308256 | 6/1997 |
| JP | S48-15243 A | 2/1973 |
| JP | S61-243384 A | 10/1986 |
| JP | H2-155854 A | 6/1990 |
| JP | H3-132434 A | 6/1991 |
| JP | H4-204212 A | 7/1992 |
| JP | H4-95829 A | 8/1992 |
| JP | H4-361163 A | 12/1992 |
| JP | H5-345556 A | 12/1993 |
| JP | H6-3445 A | 1/1994 |
| JP | H6-60300 A | 3/1994 |
| JP | H6-64491 A | 3/1994 |
| WO | WO8605149 | 9/1986 |
| WO | WO9013103 | 1/1990 |

OTHER PUBLICATIONS

English-language translation of Notice of Rejection for JP Application No. H7-149552 dated Mar. 14, 2006.

English-language translation of Notice of Rejection for JP Application No. H7-149552 dated Nov. 14, 2006.

* cited by examiner

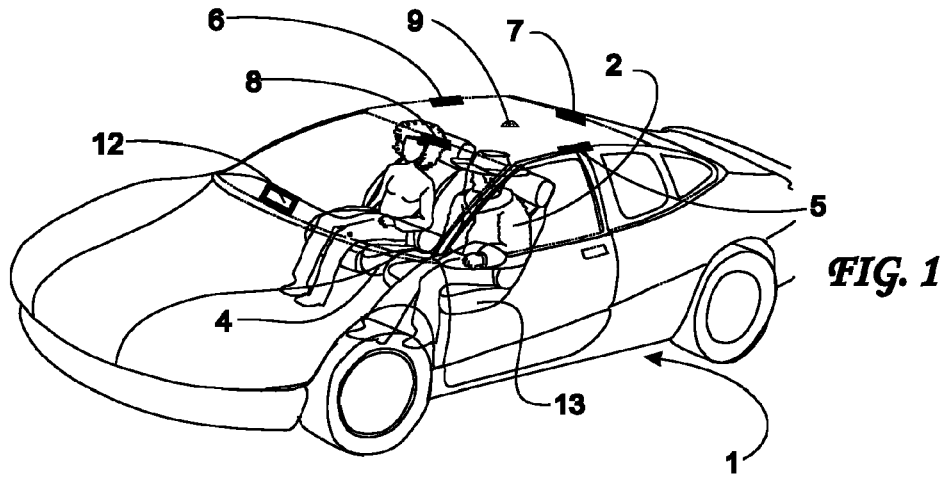
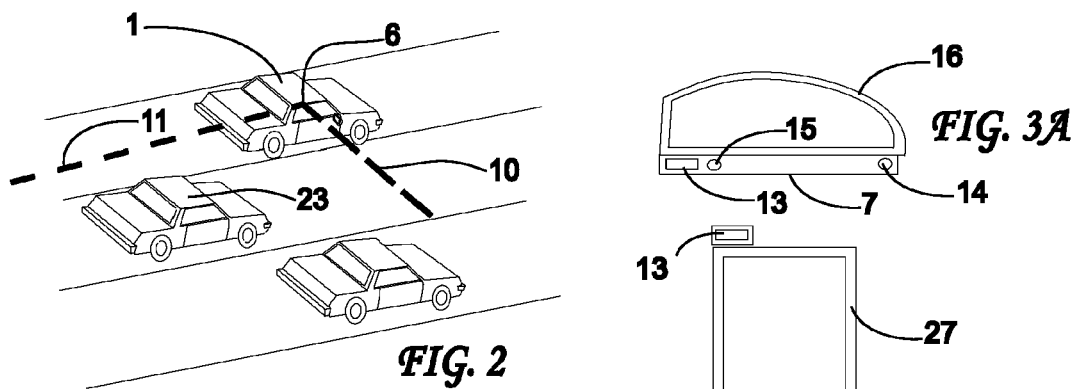
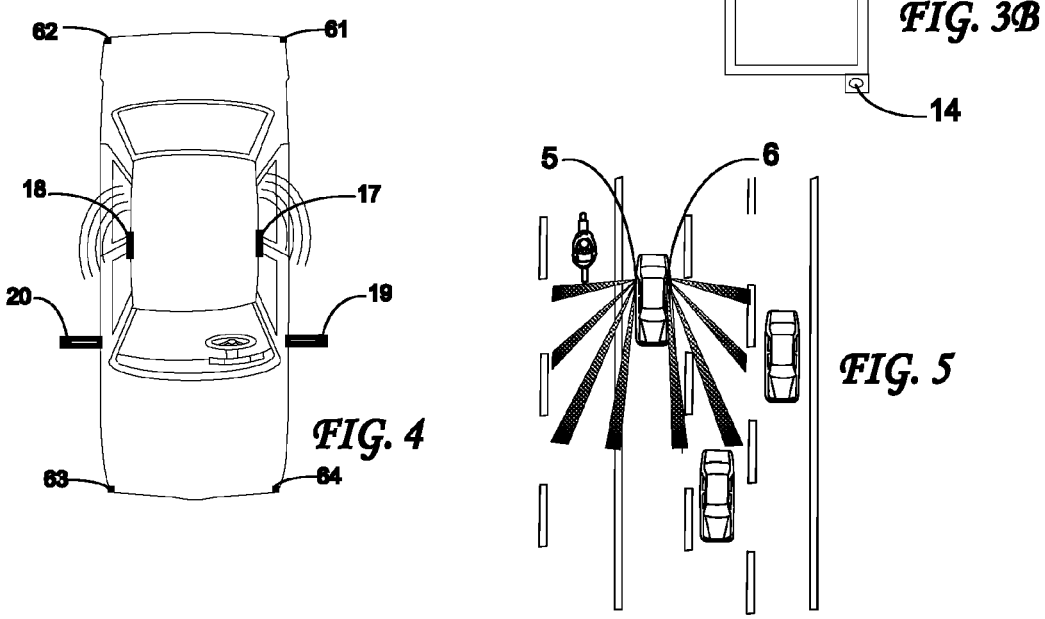

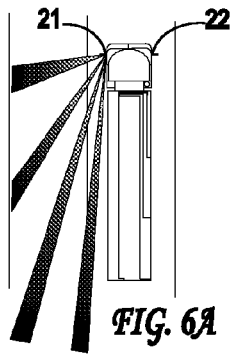
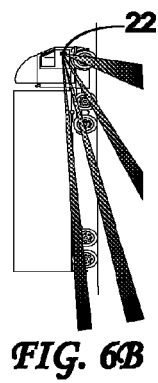
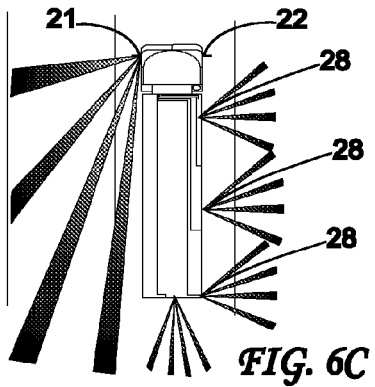
FIG. 6A  FIG. 6B  FIG. 6C
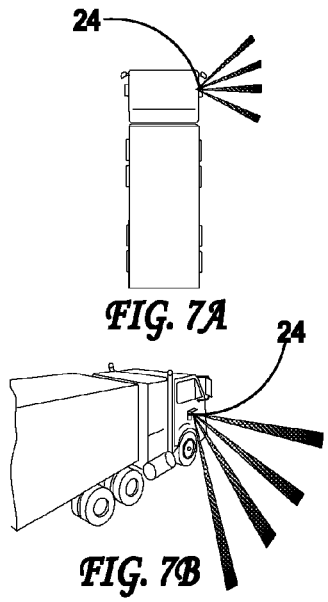
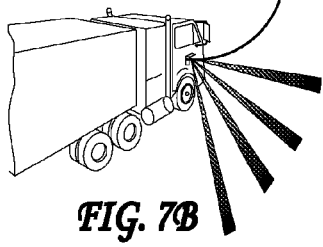
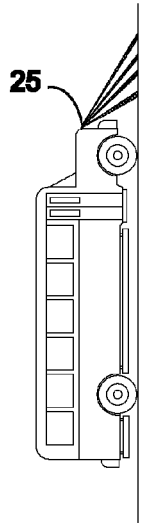
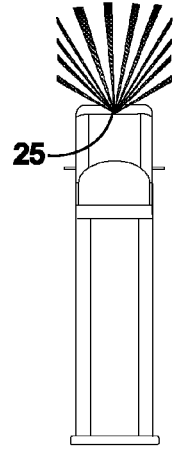
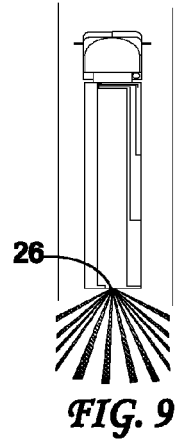
FIG. 7A  FIG. 7B  FIG. 8A  FIG. 8B  FIG. 9
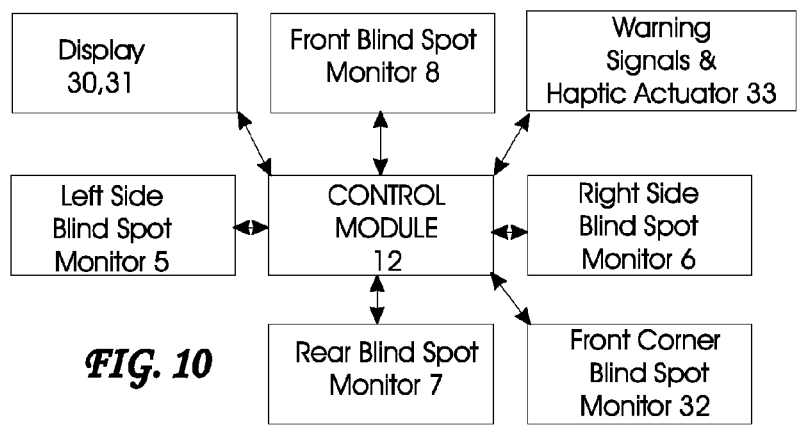
FIG. 10

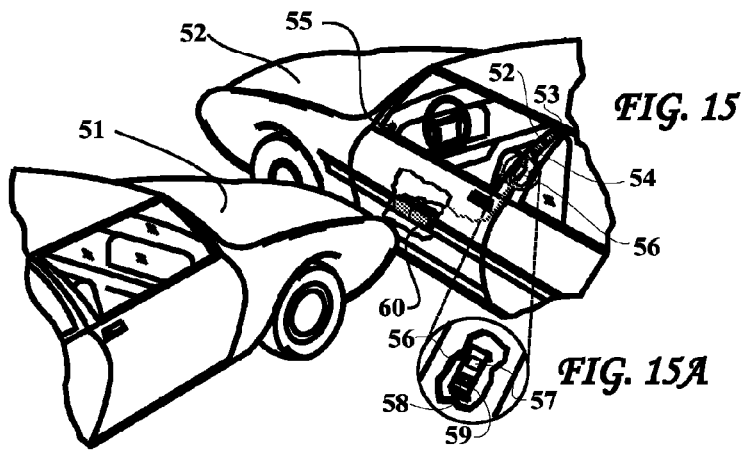
FIG. 15
FIG. 15A
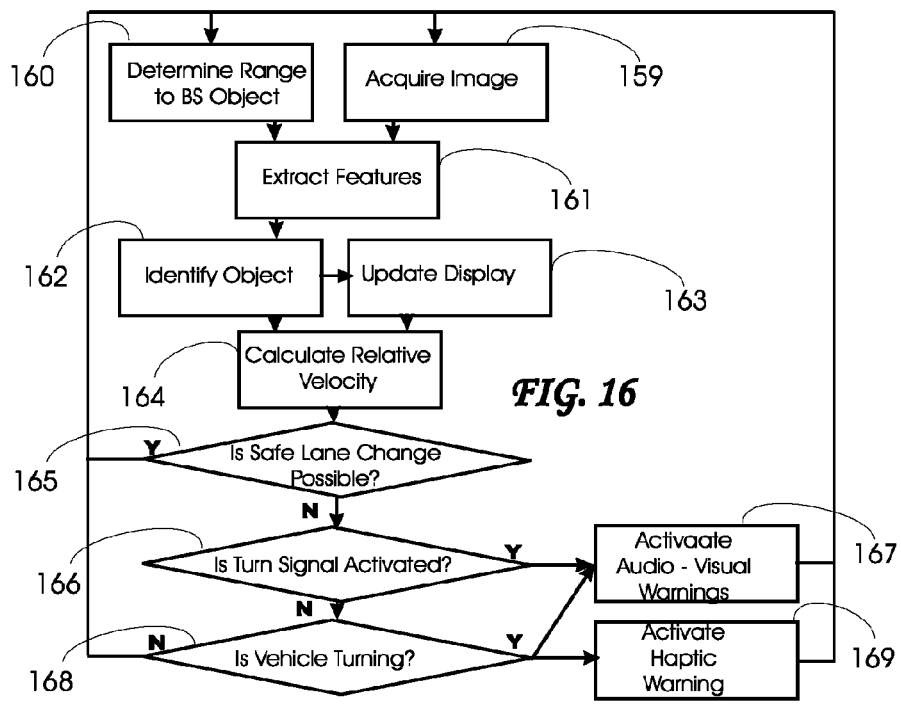
FIG. 16
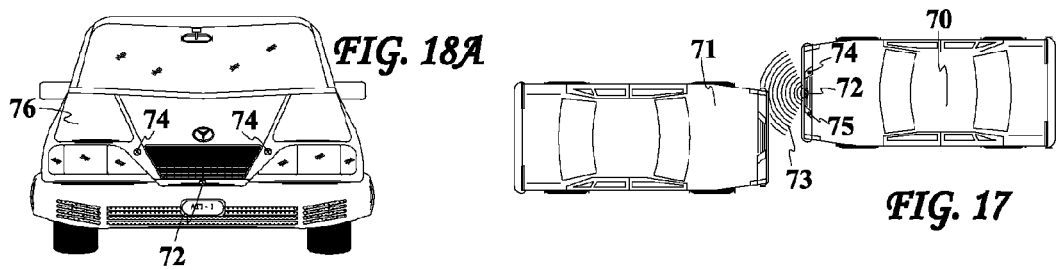
FIG. 18A
FIG. 17

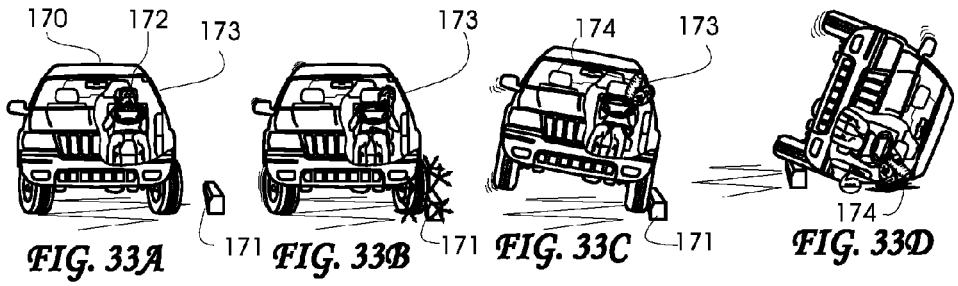
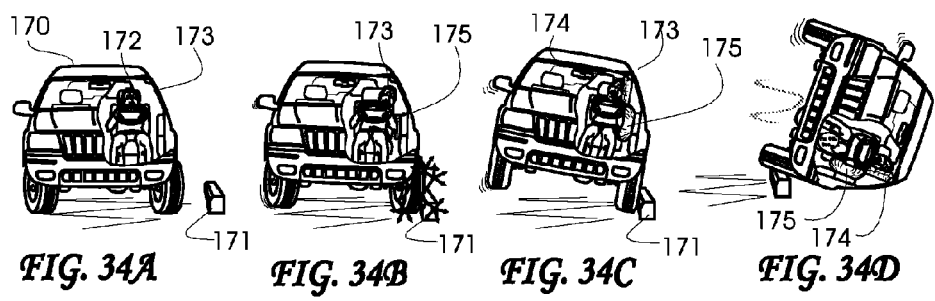
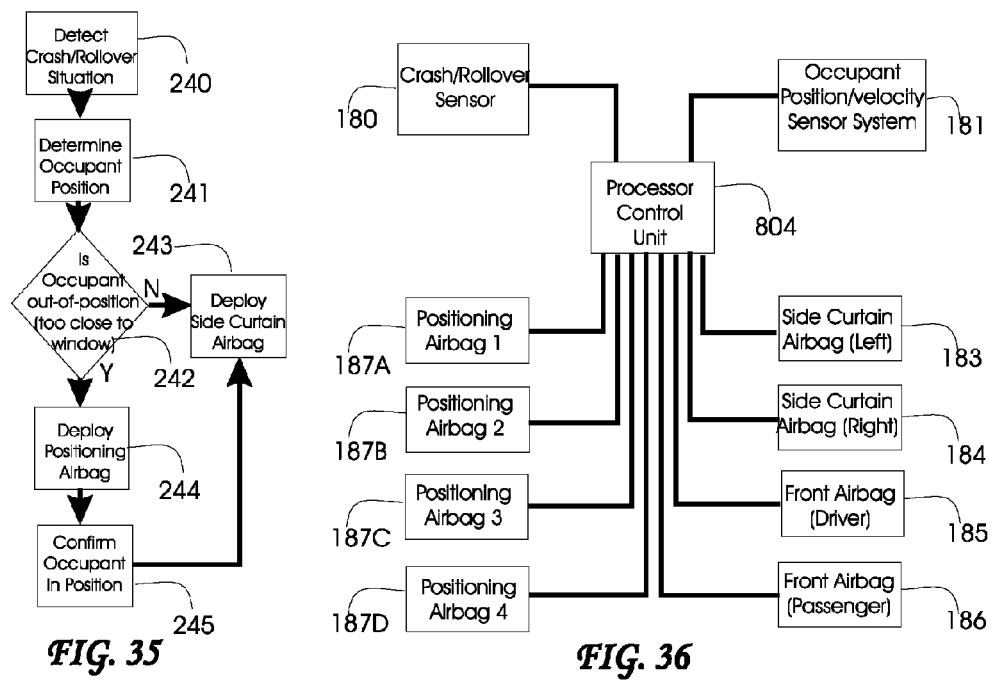
FIG. 35
FIG. 36

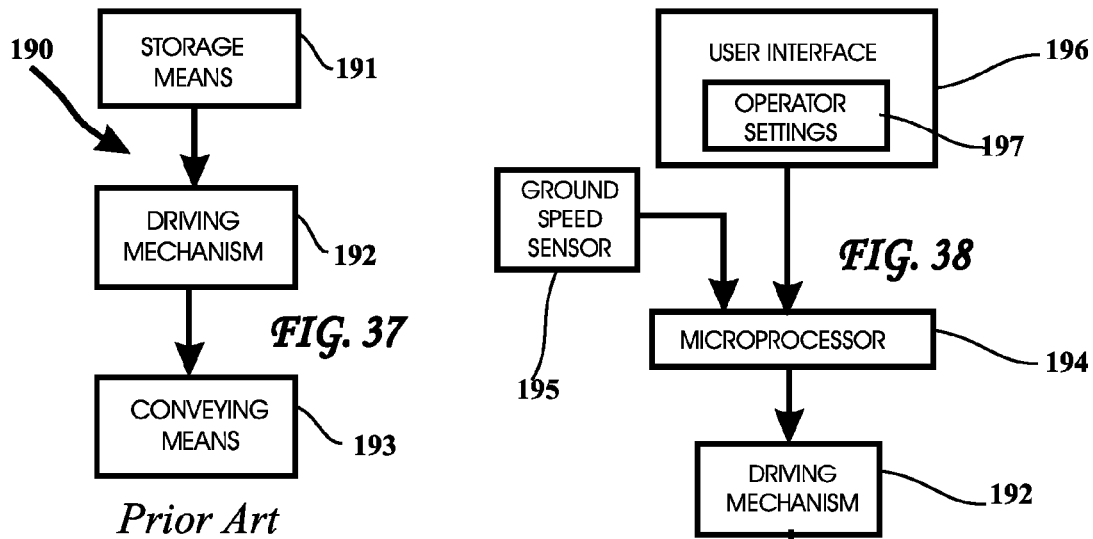
FIG. 37 *Prior Art*
FIG. 38
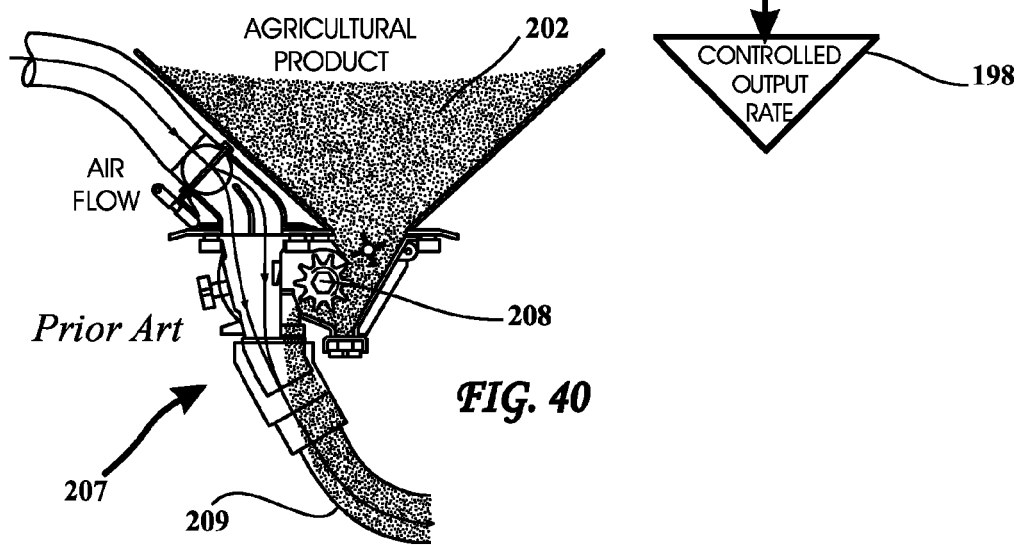
FIG. 40 *Prior Art*
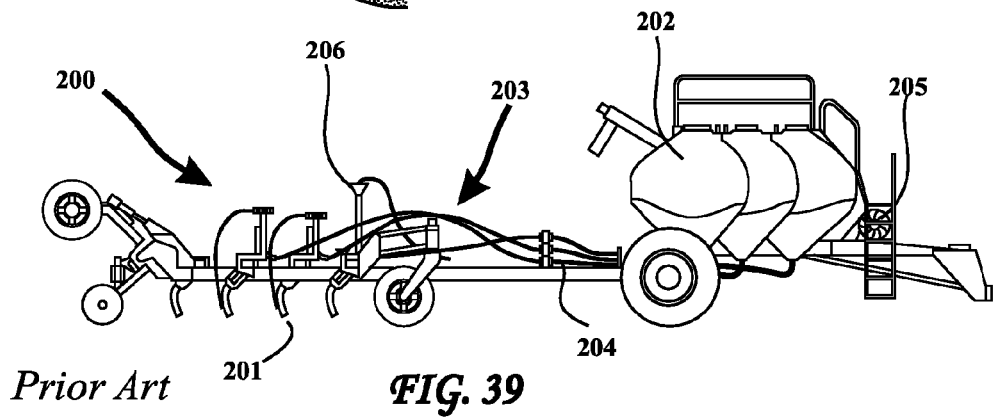
FIG. 39 *Prior Art*

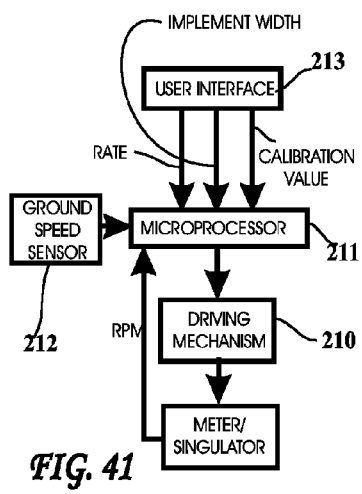
FIG. 41
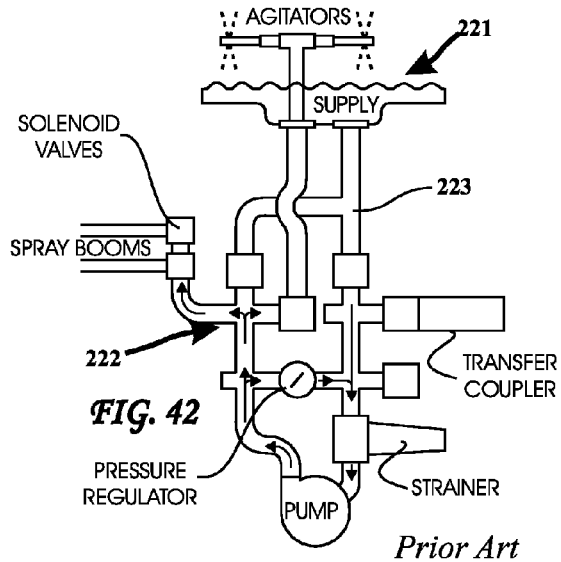
FIG. 42 *Prior Art*
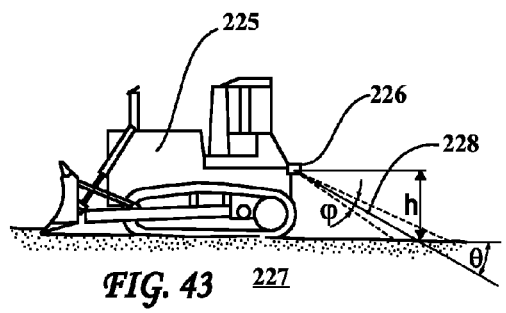
FIG. 43
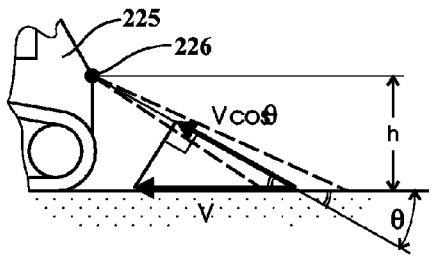
FIG. 44A
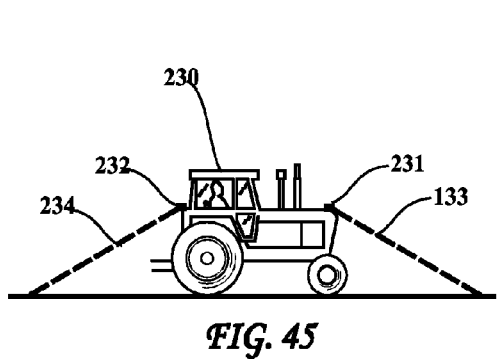
FIG. 45
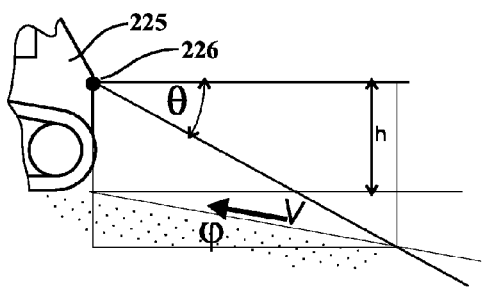
FIG. 44B

SYSTEM AND METHOD FOR PREVENTING VEHICULAR ACCIDENTS

CROSS-REFERENCE TO RELATED APPLICATIONS

This application is a continuation-in-part of (CIP) of U.S. patent application Ser. No. 11/183,598 filed Jul. 18, 2005, now U.S. Pat. No. 7,359,782, which is:

1) a CIP of U.S. patent application Ser. No. 11/111,474 filed Apr. 21, 2005, now U.S. Pat. No. 7,209,221, which is:
  A) a CIP of U.S. patent application Ser. No. 10/754,014 filed Jan. 8, 2004, now U.S. Pat. No. 6,885,968, which claims priority under 35 U.S.C. §119(e) of U.S. provisional patent application Ser. No. 60/442,204 filed Jan. 24, 2003, and is a CIP of U.S. patent application Ser. No. 09/851,362 filed May 8, 2001, now U.S. Pat. No. 7,049,945, which claims priority under 35 U.S.C. §119(e) of U.S. provisional patent application Ser. No. 60/202,424 filed May 8, 2000, and
  B) a CIP of U.S. patent application Ser. No. 10/180,466 filed Jun. 26, 2002, now U.S. Pat. No. 6,918,459, which is a CIP of U.S. patent application Ser. No. 10/097,082 filed Mar. 13, 2002, now U.S. Pat. No. 6,755,273; and
2) a CIP of U.S. patent application Ser. No. 10/180,466 filed Jun. 26, 2002, now U.S. Pat. No. 6,918,459, which is a CIP of U.S. patent application Ser. No. 10/097,082 filed Mar. 13, 2002, now U.S. Pat. No. 6,755,273, which is a CIP of U.S. patent application Ser. No. 09/825,173 filed Apr. 3, 2001, now U.S. Pat. No. 6,623,033.

These applications, and U.S. patent application Ser. Nos. 08/247,760 filed May 23, 1994, 09/024,085 filed Feb. 17, 1998 and 09/307,883 filed May 10, 1999, are incorporated by reference herein in their entirety.

FIELD OF THE INVENTION

The present invention relates generally to systems and methods for detecting and obtaining information about objects around a vehicle which are likely to impact the vehicle and taking action to reduce the potential harm caused by the impact. More particularly, the present invention relates to anticipatory sensing of an impact involving a vehicle and taking action to reduce the potential harm caused by the impact, whether it is deployment of an internal airbag to protect a vehicular occupant, deployment of an external airbag to protect a pedestrian or another type of action which can reduce the severity of the impact on the vehicular occupants or even possibly avoid the impact.

All of the publications, references, patents and patent applications mentioned or referred to herein are incorporated by reference herein in their entirety as if they had each been set forth herein in full. Note that this application is one in a series of applications covering safety and other systems for vehicles and other uses. The disclosure herein goes beyond that needed to support the claims of the particular invention set forth herein. This is not to be construed that the inventor is thereby releasing the unclaimed disclosure and subject matter into the public domain. Rather, it is intended that patent applications have been or will be filed to cover all of the subject matter disclosed below and in the current assignee's and Intelligent Technologies International's granted and pending applications. Also, note that the terms frequently used below "the invention" or "this invention" is not meant to be construed that there is only one invention being discussed. Instead, when the terms "the invention" or "this invention" are used, it is referring to the particular invention being discussed in the paragraph where the term is used.

There are numerous methods and components described and disclosed herein. Many combinations of these methods and components are described but in order to conserve space the inventor has not described all combinations and permutations of these methods and components, however, the inventor intends that each and every such combination and permutation is an invention to be considered disclosed by this disclosure. The inventor further intends to file continuation and continuation-in-part applications to cover many of these combinations and permutations.

BACKGROUND OF THE INVENTION

1. Vehicle Exterior Monitoring
 1.1 General

During the process of operating a motor vehicle, it is necessary for the operator to obtain information concerning the proximity of various dangerous objects and their relative velocities for the operator to make sound driving decisions, such as whether or not there is enough time to change lanes. This information should be obtained from the area that completely surrounds the vehicle. In order to gather this information, the operator is frequently required to physically turn his or her head to check for occupancy of a blind spot, for example. In taking such an action, the attention of the driver is invariably momentarily diverted from control of the vehicle.

For an automobile, the blind spots typically occur on either side of the vehicle starting approximately at the position of the driver and extending backwards sometimes beyond the rear of the vehicle. The locations of these blind spots depend heavily on the adjustment of the angle of the rear view mirror. Different areas are in the blind spot depending on the mirror angle. Since it is in general not known whether or how the mirror is set for the particular vehicle, a blind spot detector must detect objects anywhere along the sides of the vehicle, and even behind the vehicle, regardless of the mirror setting.

The problem is more complicated for trucks, enclosed farm tractors and construction equipment that not only can have much larger blind spots along the sides of the vehicle but also can have a serious blind spot starting in front of the right front bumper of the vehicle and extending beyond the right door. This blind spot is particularly serious with trucks and even vans, SUVs and cars in urban driving where small vehicles, motorcycles, pedestrians, bicycles etc. in this area can be completely hidden from the view of the driver.

Several systems have been designed which attempt to rotate the mirror to pick up or allow a driver to visually see the object in the blind spot. This is difficult to do without knowledge of the location of the eyes of the driver. For most systems that do not incorporate an occupant sensor capable of determining the location of the driver's eyes, there is a risk that the mirrors will be positioned wrongly thus exacerbating rather than helping the blind spot detection problem. Also, a system that rotates the mirror will make the driver nervous since he or she will not be able to see the scene that he or she is accustomed to seeing in the mirror.

Monitoring systems that are based on radar or ultrasound have been available but not widely adopted for automobile blind spot detection for reasons related to cost, accuracy and false alarms. Both systems use beams of energy that can become several feet in diameter by the time they reach the edges of the blind spot and thus can confuse a large vehicle or a guardrail, sign, parked car etc. two lanes over with a vehicle in the blind spot. Some such systems attempt to filter threatening objects from non-threatening objects based on the relative speed of the object and thus err by eliminating a significant number of such threats. A tradeoff exists in all such systems where, if all threatening objects are made known to the driver, the false alarm rate becomes unacceptable and the driver soon loses confidence in the system and ignores it. If the false alarm rate is kept low, many dangerous situations can be ignored.

These prior art systems thus have serious failure modes. The lesson is that if a vision-based system such as the rear view mirror is going to be replaced with a non-vision system, then the non-vision system must be almost as good as the vision system or it will not be adopted.

Some other problems arise when a vehicle strays into the lane of the host vehicle, i.e., the vehicle with the blind spot detector. Most systems will fail to warn the operator and thus an accident can result. As such, the blind spot problem is really two problems relating to the motion of the potentially striking vehicle and the potentially struck vehicle.

A problem that is addressed herein is to determine what information is needed about the object in the blind spot and then the manner in which this information is presented to the vehicle operator so as to eliminate accidents caused by the failure of the operator to see such an object. This information includes the accurate location of the object relative to the host vehicle, its size, its relative and/or absolute velocity, and the identity or kind of object. This information must be known regardless of the changes in road geometry such as steep hills and sharp curves or changes in environmental conditions. Naturally, the system must be low cost if it is going to be purchased by the public or installed by vehicle manufacturers.

Studies have shown that giving the driver an extra half-second could eliminate as many as 50 percent of the accidents. Thus, the risk of an accident must also be communicated to the operator in a timely fashion to permit the driver to take evasive action or not take a particular action such as a lane change.

What is needed therefore is a system that acts like the eyes of the driver and interprets the situation and only gives a warning when there is a real possibility of an accident. A passive warning can be given in the form of a light on the mirror whenever an object is in the blind spot; however, an active signal such as an audible signal or an intervention in the steering of the automobile should only be provided when it is necessary to prevent an accident. This system must work with very high reliability and accuracy since the consequences of an error can be serious injuries or death.

One approach reported in the paper C. Thorpe et al, "Driving in traffic: Short range sensing for Urban Collision Avoidance", Carnegie Mellon University (CMU), January 2002, is a relatively superficial discussion based on the use of vision, radar, ladar and other systems for interrogating the environment around the vehicle. No mention is made of how various objects are identified that could pose threats for vehicular occupants or pedestrians or the distinction between objects that may temporarily occupy a space from those that are permanently part of the infrastructure. The technology described below and in other patents assigned to Automotive Technologies International (ATI) and Intelligent Technologies International (ITI) presents in detail how such objects are found and identified and how the location of fixed objects, such as curbs, are known and are part of a vehicle resident accurate map. The CMU solution, based on observations without the aid of location determining technologies such as DGPS and accurate maps, will require reliance on models of vehicles, models of pedestrians and human factors, the analysis of all of which is at best inexact and incapable of solving the problem of collision avoidance. Also, by not having a good identification of such objects, such as provided herein, the CMU solution will not be able to provide the proper response in critical situations. The inventions described below and in the related patents and patent applications of ATI and ITI, on the other hand, solve the total problem of avoiding fatalities on roadways and lead toward Zero Fatalities. The system and method for achieving this objective is referred to with the trademarks ZERO FATALITIES™, ROAD TO ZERO FATALITIES® and RTZF®.

The use of range gating is a significant part of several implementations of inventions disclosed herein. The concept of range gating is currently not new when used to determine to distance to a point on an object that is illuminated by radar, for example (see U.S. Pat. No. 3,735,398 which describes use of range gating with an ultrawide band radar system). The use of range gating in conjunction with acquiring an image of an object and allowing separation or segmentation of the object's image from reflections from other objects that are at different distances from a vehicle is believed to be unique to the inventions disclosed herein.

1.2 Blind Spot Detection Systems

The term "blind spot" as used herein is meant to include more than the common definition of the term. See section 8. Definitions for a more complete definition.

In U. Dravidam and S. Tosunoglu, "A survey on automobile collision avoidance system", Florida conference on recent advances in robotics 1999, the authors provide a good review of the field of obstacle sensors. What follows is a summary of their analysis. Obstacle sensors such as used for blind spot detection can be divided into three types:

Optical sensors include passive infrared, laser radar and vision. They generally are sensitive to external environmental conditions, which may not be a problem for blind spot detection since the objects to be detected are usually nearby the host vehicle. Passive infrared and vision cannot provide a direct measurement of distance to an object unless part of the field of view is illuminated by a point or structured light. Laser radar does provide the capability of direct distance measurement, as will be described below, and a stereo camera can also provide distance information.

AMCW (amplitude modulated continuous wave), FMCW (frequency modulated continuous wave) and impulse and noise or pseudo-noise (CDMA—code modulated multiple access) radar are not generally affected by adverse environmental conditions. Although relatively expensive, FMCW radar is a good technique for long-range distance measurement provided the object to be measured can be separated from other objects. Radar in general has a high false alarm rate due to the large pixel size at any significant distance from the host vehicle, to multipath effects and reflections from signs, bridges, guardrails etc.

Ultrasonics are good in applications where only short relative distance measurements are required, since they are able to provide high distance to the target resolution for a relatively low cost. However, for imaging applications, the slow speed and relatively large pixel size renders ultrasonics marginal even for close up targets. Also, ultrasonic waves can be significantly distorted by thermal gradients and wind.

Various researchers have attempted combinations of these technologies with the particular combination of laser radar and pulse or FMCW being quite advantageous for long distance collision avoidance applications.

What follows is a brief description of the principles of operation for different types of sensors including their main advantages and disadvantages. For blind spot applications, sensors should be able to accurately determine the location of the object and the speed of the obstacle relative to the host vehicle. How well this is achieved can be measured with the following indicators:

Sensing range: the maximum and minimum range over which the technique can be used.

Range Resolution: the relative change in range that can be measured.

Pixel Resolution: the width of the beam or size of the pixel received and to which the sensor is sensitive.

Response time: how quickly the sensor can respond to a change in the blind spot occupancy.

Ultrasonics: These sensors work by measuring the time-to-flight of a short burst of ultrasound energy typically at a frequency of 30-200 kHz. The time taken for the ultrasonic waves to travel to and return from the obstacle is directly proportional to the distance between the obstacle and the host vehicle. The main advantage is their relative low cost and small size. These sensors are also very sensitive to changes in the density of air that can be caused by, e.g., high wind velocity and temperature gradients. Velocity can be measured by the Doppler frequency Passive Infrared: These sensors measure the thermal energy emitted by objects. Their main advantage is their low cost and small size, and main disadvantage is their inability to determine the distance to a detected object and slow response time.

Laser Radar: As with regular radar, two techniques exist: (1) a pulsed-beam of infrared light coupled with time-of-flight measurements, and (2) the modulation of a continuous light beam. The pulsed technique offers long range, high directionality, and fast response time. Its limitations are its sensitivity to environmental conditions.

FMCW or AMCW Radar: This type of radar uses modulated microwave or millimeter frequencies, so that the frequency difference between the reflected signal and the transmitted signal is proportional to the relative velocity of the object. When two waves of slightly different frequencies are used, the distance to the object can also be determined by the phase relationship between the two received reflections. Despite its high cost, this technique offers the advantages of being insensitive to environmental conditions, but the disadvantage of having a large pixel size. Velocity can be measured by the Doppler frequency shift.

Impulse Radar: This radar differs from FMCW in that it uses very short pulses instead of a continuous wave. Like FMCW radar, it is insensitive to environmental conditions, and the cost is significantly lower than FMCW. Distance can be determined by time-of-flight measurements and velocity can be determined from successive distance measurements. It also has the disadvantage of having a large pixel size resulting in a high false alarm rate and too little information to permit object identification.

Capacitive and Magnetic: Capacitive and magnetic sensors are able to detect close objects (within about 2 m.), using the capacitance or magnetic field variations between electrodes excited at low frequencies, typically about 5 kHz. Despite their limited range, they are low in cost, and robust to external environmental effects. Poor resolution compared to other techniques makes it unlikely that these devices will be used for blind spot detection since most objects are close to the vehicle.

Vision Systems: These techniques are based on the use of a camera and image-processing software. They are sensitive to external environmental conditions; however, this is not a significant shortcoming for blind spot detection. Active infrared vision systems can have significantly longer range in smoke, fog, snow and rain than human eyesight. This is especially the case if range gating is used (see U.S. Pat. No. 7,202,776).

Considering now some relevant patent prior art. U.S. Pat. No. 4,766,421; U.S. Pat. No. 4,926,170; U.S. Pat. No. 5,122,796; U.S. Pat. No. 5,311,012; U.S. Pat. No. 5,122,796; U.S. Pat. No. 5,354,983; U.S. Pat. No. 5,418,359; U.S. Pat. No. 5,463,384 and U.S. Pat. No. 5,675,326 and International Publication No. WO 90/13103 are all assigned to Auto-Sense, Ltd., Denver, Colo. and describe modulated optical systems. However, these references do not disclose a camera and in fact, each receiver is a single pixel device. The sensor is not mounted on the side rear view mirror but instead is mounted on the rear of the vehicle. These references disclose the use of multiple detectors and thereby achieving a sort of mapping of the detected object into one of several zones. The references also provide a crude velocity measurement of the object moving from one zone to another. Otherwise, they do not provide accurate ranging.

These references describe a blind spot detection system wherein beams of infrared radiation are sent from the interrogating or host vehicle at a significant angle in order to illuminate possible objects in an adjacent lane. No direct measurement of the distance is achieved, however, in some cases multiple detectors are used in such a way that when the adjacent detected vehicle is very close to the detector, that is, below the threshold distance, the sensing of the adjacent vehicle is suppressed. In other cases, multiple beams of infrared are used and distance is inferred by the reception of reflected radiation. The detectors are single pixel devices. No attempt is made to image the detected object. Also, no attempt is made to directly measure the location of the detected object.

U.S. Pat. No. 5,008,678 describes a phased array radar system wherein the antenna can be made to conform to the geometry of an edge of the automobile. The locations of the antenna, however, make it difficult to detect many objects in the side blind spots. The particular location and velocity of such objects are also not accurately determined. No image of the device is formed. The device is based on a single pixel having a relatively large size making recognition and identification of the object impossible.

U.S. Pat. No. 5,087,918 describes the use of a combination of two types of radar: dual frequency Doppler radars and frequency modulated continuous wave radar (FMCW). The system provides an indication of the range of the object from the vehicle but does not indicate where in a plane perpendicular to the vehicle the object is located and therefore whether it is a threat or not. Also, the system does not apply pattern recognition so that different types of objects in the blind spot can be identified. This patent gives a good description of the limitations of radar systems.

U.S. Pat. No. 5,229,975 describes a method for diagnosing when the system is not operating properly by placing an LED outside the vehicle next to the sensor. This is a single pixel device and thus no imaging or object recognition is possible. Range is not measured directly but through a series of sensors whereby each sensor covers a particular zone. Thus, no accurate range measurement is provided. As the object moves in the blind spot area, it is sensed by a variety of the sensors and the last one to sense it gives a crude indication of the distance.

U.S. Pat. No. 5,235,316 describes an ultrasonic blind spot detecting system that in fact interrogates as much as 200 degrees around the vehicle. It is mounted in place of the conventional mirror and a new side mirror is provided. The ultrasonic sensor rotates until it locates an object and then it causes the mirror to rotate so that the driver can see the object.

The patent does not take an image of the threatening object or the object in blind spot. It is a one-pixel device and it does not employ pattern recognition. Additionally, it provides too much information for the driver thus creating the possibility of driver information overload.

U.S. Pat. No. 5,289,321 describes a camera and an LCD display on the instrument panel. The camera views rearward and the driver sees the image captured on an LCD. It does not disclose a camera mounted on the rear view mirror. The main problem is that the LCD driver-viewing screen is more likely to confuse than to aid the driver due to its poor dynamic light intensity range and the ability to relate the image to the location and velocity of the object in the blind spot.

U.S. Pat. No. 5,291,261 describes illumination ports at an angle with respect to single pixel receiver ports. Fiber optics are used to transmit the few pixels to a central processing station. There is no direct ranging. Some crude ranging is accomplished since when the object is in certain zones where the projected light overlays the receiving fields, the reflected light can be sensed. It requires multiple locations and cannot be mounted, for example, on the side rearview mirror.

U.S. Pat. No. 5,325,096 uses Doppler radar to determine the presence and relative velocity of an object blind spot. It filters out stationary objects and concentrates only on those objects that have approximately the same velocity as the vehicle. As a result, many objects, such as a high speed passing vehicle, are missed. A light is used to indicate the presence of an occupying item in the blind spot area and an audible alarm is sounded when the turn signal is activated. There is some crude range measurement possible. It is also a single pixel device and thus, no image of the object can be formed. It invariably will miss objects that move rapidly into blind spot. There is no precise ranging. It does not appear that the system can be easily adjusted for vehicles of different length.

U.S. Pat. No. 5,424,952 describes an optical system using cameras wherein distance is measured stereoscopically. Objects that are not in the adjacent lane are ignored. The problems are that no attempt is made to analyze the image or to determine its velocity and therefore, a high false alarm rate can be expected. Although the image is captured, the information is ignored except for its use to determine a stereo distance.

U.S. Pat. No. 5,467,072 describes a phased array radar system that can scan the blind spot as well as all other areas around vehicle. However, the system does not provide an image and therefore no optical pattern recognition is possible. The 10-degree divergence angle of radar indicates that a single pixel has a diameter of over 3 feet at 20 feet from the radar transmitter, which is insufficient resolution to determine the lane that the threatening vehicle is occupying, especially if there is a slight curvature in the road. Such a system is not sufficiently accurate to provide drivers who are attempting to merge into adjacent lanes with sufficiently accurate position information to permit a safe merge under heavy traffic without visual contact. Additionally, there is no pattern recognition claimed or even possible with this low resolution device.

U.S. Pat. No. 5,517,196 describes a multi-frequency radar system using Doppler techniques. Stationary objects are filtered out. In fact, the system also only looks at objects that are traveling at approximately the same speed as the host vehicle. It has a good range of 0.25 to 100 feet. Some problems are that this system will interfere with other vehicles having the same system. There appears to be no direct measurement of the object's position, but it does give a good distance resolution of 0.55 feet. This patent also contemplates the use of steering wheel angle and vehicle speed inputs to the system. Even though ultrasonic, infrared and radar are disclosed, it is still a single pixel system. Once again, the system will invariably miss a high-speed vehicle passing on either the right or the left since it is limited to a two mile per hour velocity difference between the blind spot object and the host vehicle. It also appears to be a very expensive system. Another potential problem is that when an especially long truck having the system of this patent is turning, the system would pick up the end of truck and treat it as an object in the blind spot.

U.S. Pat. No. 5,668,539 uses thermal imaging to recognize a car or truck in the blind spot. It uses a vibrating element between the field of view containing the blind spot using three lenses thus giving three different locations and a reference field of view that is the road behind the vehicle. One problem with this device is that this system does not know where the infrared rays are coming from. It could be from the sun or from reflections from the wrong lane. The slow cycle time prevents averaging to eliminate errors. At a 60 km per hour passing rate, the vehicle will travel 1.7 m each cycle based on a 10 hertz cycle rate. The patent also mentions that the form of the signal that comes from a vehicle and the blind spot has high frequency associated with it whereas the form of the signal from the road does not. This is an alternate method of discriminating between a vehicle and the road but one that still lacks resolution.

U.S. Pat. No. 5,670,935 describes a camera and a display where the actual images of the vehicle in the blind spot and behind the subject vehicle are displayed on the visual display. Unfortunately, the various figures in the patent that illustrate this phenomenon are not accurate and appear to show that the positions of the vehicles relative to the subject vehicle can be visually seen which is not the case. Thus, the invention described in this patent cannot be used for blind spot detection in the manner described since the relative locations of vehicles cannot be determined. Also, no attempt has been made to identify and analyze objects in the blind spot and warn the driver of a pending accident. U.S. Pat. No. 5,765,116 describes a system wherein a torque is artificially applied to the steering wheel to keep a driver in the center of his lane. This is not a blind spot related patent but this same technique can be used to prevent a driver from attempting to change lanes when there is an object in the blind spot.

U.S. Pat. No. 6,038,496 describes a lane boundary finder. It uses a linear array of LEDs plus a linear CCD with a total of 64 pixels in the CCD array. It can be used for blind spot monitoring, although this is not the main purpose of this invention. The CCD array suffers from the problem that, due to its limited dynamic range, it can be overwhelmed by light from the sun, for example, reflected off a vehicle or other surface. Since there is only a linear array of only 64 pixels, no information as to what is in the blind spot can be obtained. In other words, the system knows that something is in the blind spot but does not know what it is or even accurately where it is. Nevertheless, the use of the scanning system disclosed wherein the particular pixel or the beam that is being activated to create a light on a leading or reflecting surface is an important addition to the technology and may also be used with this invention.

U.S. Pat. No. 6,501,371 describes a method for locating eyes of a vehicle driver and locating an object external to the vehicle and adjusting a rear view mirror so that the driver sees the external object. All of these ideas are believed to have previously been disclosed in patents assigned to ATI and ITI.

International Publication No. WO 95/25322 describes a passive infrared blind spot detector that processes infrared waves based on a crude form of pattern recognition. There is no accurate ranging and there will likely be a high false alarm rate with this system. There is also sometimes a period when the system is unavailable due to changes in ambient conditions such as the start of a rain shower or when the temperature of the road changes due to shading. It is a one-pixel device and therefore does not permit the location of the object in the blind spot to be determined. This device and other similar passive infrared devices will have trouble distinguishing between a small objects such as a motorcycle which is relatively close to the sensor and larger objects such as a truck which are relatively far away, for example two lanes over. As a result, it will likely falsely indicate that a relatively large object is within a danger zone when in reality the object is at a distance and does not pose a threat.

International Publication No. WO 99/42856 describes a rear of vehicle mounted blind spot detector based on various radar systems. It has the capability of tracking multiple targets and of accurately determining the ranges to the various targets using range-gating techniques. It does not attempt to capture an image of an object in the blind spot or determine the identity of such an object and thus many non-threatening objects will appear to be threatening. Accordingly, the system can be expected to have a high false alarm rate.

In general, the poor resolution of radar systems requires that they use relative velocity as a filter in order to reduce the false alarm rate. As a result, such systems miss a high-speed vehicle that is in the blind spot and was not observed approaching the blind spot by the driver. This is a very common occurrence on European superhighways and in the United States on two lane roads.

Thus, none of the related art described above discloses a method or apparatus of monitoring the area surrounding a vehicle that analyzes an image of one or more objects that occupy the blind spot, identifying them and determining the location and relative velocity of the objects relative to the host vehicle in a manner that permits an accurate warning to be issued to the driver of a potentially dangerous situation.

1.3 Optical Methods

Optics can be used in several configurations for monitoring the exterior of a vehicle. The receiver can be a CCD or CMOS imager, to receive the emitted or reflected light. A laser can either be used in a scanning mode, or, through the use of a lens, a cone or beam of light can be created which covers a large portion of the object in the blind spot. Alternately, a combination of these techniques can be used such as a scanning beam or an adjustable lens system that converts a laser beam to a converging, constant diameter or expanding illuminator. In these configurations, the light can be accurately controlled to only illuminate particular positions of interest on the vehicle. In the scanning mode, the receiver need only comprise a single or a few active elements while in the case of the cone of light, an array of active elements is needed. The laser system has one additional significant advantage in that the distance to the illuminated object can be determined as disclosed in U.S. Pat. No. 5,653,462.

In a simpler case, light generated by a non-coherent light emitting diode (LED) device is used to illuminate a desired area. In this case, the area covered is not as accurately controlled and a larger CCD or CMOS array is required. The cost of CCD and CMOS arrays has dropped substantially with the result that this configuration is now a cost-effective system for monitoring the blind spot as long as the distance from the transmitter to the objects is not needed. If greater distance is required, then a laser system using modulation and phase detection or time-of-flight techniques, a stereographic system, a focusing system, a combined ultrasonic and optic system, or a multiple CCD or CMOS array system as described herein, or other equivalent systems, can be used. In a particular implementation, the illuminating light is in the form of a modulated infrared laser light that is scanned in a line that illuminates an object in the blind spot. The reflected light is received by a pin or avalanche diode, or equivalent, after passing through a narrow frequency band notch or other appropriate filter. The diode is a single pixel device, although several or an array of diodes can be used, but since the direction of the transmitted light is known, the direction of the reflected light is also known. The phase of received light is then compared with the transmitted light. The modulating frequency can be selected so that no more than one wavelength of light exists within the blind spot area. The location of the reflecting object can then be determined by the phase difference between the transmitted and reflected light. Although the described system uses a line scan, it is also possible to use a two-dimensional scan and thereby obtain a three-dimensional map of the area of interest. This can be done using a pin or avalanche diode or equivalent as described or the light can be received by a CMOS array and can be monitored on a pixel by pixel basis in a manner similar to the PMD system described in Schwarte, et. al. "New Powerful Sensory Tool in Automotive Safety Systems Based on PMD-Technology" 4th International Conference—Advanced Microsystems for Automotive Applications, Apr. 6/7, 2000, Berlin (Germany). In this latter case, the entire blind spot area may be flooded with modulated infrared light as described in the paper. On the other hand, it is difficult to overcome the light from natural sources such as the sun by a single floodlight source and therefore a line or even a scanning point source permits better distance measurement using a light source of reasonable intensity. An alternative is to increase the power of the transmitted illumination, for example by using a high power diode laser, and to increase the beam diameter to remain below eye safety limits.

This technique can also be used for vehicle velocity determination and at the same time the topology of the ground covered by the scanning laser can be determined and reflections from rocks and other debris can be eliminated from the velocity calculation for applications where the prime goal is to determine the vehicle velocity relative to the ground.

A mechanical focusing system, such as used on some camera systems can determine the initial position of an object in the blind spot. A distance measuring system based of focusing is described in U.S. Pat. No. 5,193,124 (Subbarao) which can either be used with a mechanical focusing system or with two cameras. Although the Subbarao patent provides a good discussion of the camera focusing art, it can be more complicated than is needed for the practicing the instant invention. A neural network or optical correlation system, as described below, can also be used to perform the distance determination based on the two images taken with different camera settings or from two adjacent CCD's and lens having different properties as the cameras disclosed in Subbarao making this technique practical for the purposes of some of the inventions disclosed herein. Distance can also be determined by the system described in U.S. Pat. No. 5,003,166 by the spreading or defocusing of a pattern of structured light projected onto the object of interest. Distance can also be measured by using time-of-flight measurements of the electromagnetic waves or by multiple CCD or CMOS arrays as is a principle teaching herein.

There will be conditions when the optical system from the CMOS camera has deteriorated due to contaminants obscuring the lens. Similarly, the light emitting laser diodes will emit less light if the lenses are soiled. The system of this invention contemplates a continuous diagnostic feature that will permit sensing of either of these conditions. This can be accomplished in a variety of ways such as a laser diode aimed at the road surface close to the vehicle but within view of the CMOS camera. If the reflection over a period of time is not sufficient, then a warning light will appear on the instrument panel informing the driver that maintenance is required. Naturally, there are many other methods by which a similar diagnostic can be accomplished.

Except as noted, there appears to be no significant prior art for the optically based apparatus and methods of the inventions disclosed herein. In particular for optical systems that obtain sufficient information about objects in the area surrounding the vehicle to permit a pattern recognition system.

In U.S. patent application Pub. Nos. 20020191388, 20030193980, 20030193981 and 20030198271, a method for illuminating a highway is disclosed which permits multiple vehicles approaching each other to pulse illuminate the roadway in a manner timed by a GPS timing signal such that they do not blind each other's imaging system. The imaging system is turned off except during an interval necessary for the illumination to travel to the roadway and return. If groups of vehicles traveling toward each other transmit at different times, when one group is transmitting the other opposing group has its receiver turned off and thus is not blinded. No mention is made of pattern recognition, positioning the display in the field of view of the driver, or measuring the distance to the object of interest and thus the limited use of the inventions disclosed in these patent publications is not believed to anticipate inventions disclosed herein.

1.4 Combined Optical and Acoustic Methods

Both laser and non-laser optical systems in general are good at determining the location of objects within the two-dimensional plane of the image and a pulsed or modulated laser or continuous modulated radar system in the scanning mode can determine the distance of each part of the image from the receiver by measuring the time-of-flight, correlation or by phase measurement. It is also possible to determine distance with the non-laser system by focusing as discussed above, or stereographically if two spaced apart receivers are used and, in some cases, the mere location in the field of view can be used to estimate the position of the object in the blind spot, for example.

Acoustic systems are additionally quite effective at distance measurements since the relatively low speed of sound permits simple electronic circuits to be designed and minimal microprocessor capability is required. If a coordinate system is used where the z-axis is from the transducer to the object, acoustics are good at measuring z dimensions while simple optical systems using a single CCD are good at measuring x and y dimensions. The combination of acoustics and optics, therefore, permits all three measurements to be made from one location with low cost components as discussed in U.S. Pat. No. 5,835,613 and U.S. Pat. No. 5,845,000.

One example of such a system is an optical system that uses natural light coupled with a lens and CCD or CMOS array which receives and displays the image and an analog to digital converter (ADC), or frame grabber, which digitizes the output of the CCD or CMOS and feeds it to an artificial neural network (ANN), correlation system or other pattern recognition system for analysis. This system uses an ultrasonic transmitter and receiver for measuring the distances to the objects located in the area or volume of interest. The receiving transducer feeds its data into an ADC and from there, the converted data is directed to the ANN. The same ANN can be used for both systems thereby providing full three-dimensional data for the ANN to analyze. This system, using low cost components, will permit accurate identification and distance measurements not possible by either system acting alone. If a phased array system is added to the acoustic part of the system, the optical part can determine the location of the object and the phased array can direct a narrow beam to the location and determine the distance to the object through time-of-flight, for example. This technique is especially applicable for objects near the host vehicle. The combination of radar and optics can also be used in a similar manner at a significant cost penalty.

Although the use of ultrasound for distance measurement has many advantages, it also has some drawbacks. First, the speed of sound limits the rate at which the position of the object can be updated. Second, ultrasound waves are diffracted by changes in air density that can occur when thermal gradients are present or when there is a high-speed flow of air past the transducer, compensation techniques exist as reported in the current assignee's patents and applications such as U.S. Pat. No. 6,279,946, U.S. Pat. No. 6,517,107 and U.S. Pat. No. 6,856,876. Third, the resolution of ultrasound is limited by its wavelength and by the transducers, which are high Q tuned devices. Typically, the resolution of ultrasound is on the order of about 2 to 3 inches. Finally, the fields from ultrasonic transducers are difficult to control so that reflections from unwanted objects or surfaces add noise to the data. In spite of these drawbacks, ultrasound is a fine solution in some applications such as for velocity and displacement determination for automobiles in rear end impacts and farm tractors and construction machines where the operating speeds are low compared with automobiles.

1.5 Discussion of the External Monitoring Problem and Solutions

The above review of related art blind spot detecting systems illustrates that no existing system is believed to be sufficiently adequate. A fundamental problem is that vehicle operators are familiar with visual systems and inherently distrust all other technology. As soon as the non-visual system gives a false alarm or fails to detect an object in the blind spot, the operator will cease to depend on the system. Theoretically, the best systems would be based on cameras that allow the operator to view all of the blind spots. However, there are no adequate display systems that will appear to the operator to be equivalent to an actual view of the scene. CRTs and LCDs require driver concentration and do not have the dynamic range of lighting that is comparable to the real world. Either the display will be too bright at night or too dim during daylight or the wrong object will be bright compared with the object of interest. Although radar systems can accurately measure distance to an object, they are poor at placing the object in the lateral and vertical coordinates relative to the vehicle and thus create many false alarms.

The simplest system must be able to accurately position the object in the blind spot, or other area of interest, relative to the host vehicle and inform the driver that a collision potential exists if the driver decides to change lanes, for example. This warning must be given to the driver either at a place where he can almost subconsciously observe the warning when he is contemplating a lane change maneuver, or it must provide an audible warning if he attempts to make such a lane change maneuver. Finally, such a system might even prevent a driver from executing such a maneuver. A more sophisticated system involving icons will be discussed below.

To accomplish these goals, it is desirable to positively locate an object in the area of interest such as one or more blind spots and provide some identification as to what that object is. A driver will respond quite differently if the object is a guardrail or a line of parked cars then he will if it is a Porsche overtaking him at 150 kph.

Thus, the requirements of the system are to identify the object and to locate the object relative to the host vehicle. To identify the object preferably requires a pattern recognition system such as neural networks or optical correlation systems discussed below. To locate the object preferably requires some means for measuring the distance from the camera or other sensor to the object. A CMOS camera is quite capable of capturing an image of an object in the blind spot, for example, and if the camera is an HDRC camera, then it can perform well under all normal lighting conditions from midnight to bright sunshine especially if minimal illumination is provided on dark nights.

However, even the HDRC camera can be blinded by the sun and thus an alternate solution is to use a scanning laser radar where the point of IR can overpower the emissions of the sun at that wavelength. A scanning laser radar can scan in either one or two dimensions depending on the design. The scanning mechanism can be a rotating polygon mirror, vibrating galvanometer-type mirror, a vibrating MEMS mirror or a solid-state acoustical-optical crystal. In the case of the solid-state device, one or more special lenses or reflectors can be used to increase the effective scan angle. The IR wavelength can be in the far, mid or near IR bands. If the wavelength is in the mid-IR band, it can be selected so as to provide the greatest range in rain, snow or fog. Also, its amplitude at the selected wavelength should be sufficient to be detected in bright sunlight. Range gating can also be used to partially overcome the effects of rain, snow, fog and/or smoke.

An alternate to the HDRC camera is to use an electronic shutter and/or variable iris. In this case, the camera can be operated in the range that best images objects of interest or a series of images can be taken at different settings and portions of each image combined to create a sharp image of the area of interest as reported in S. K. Nayar and T. Mitsunaga, "High Dynamic Range Imaging: Spatially Varying Pixel Exposures", Proceedings of IEEE Conference on Computer Vision and Pattern Recognition, Hilton Head Island, S.C., June 2000, for example.

The measurement of the distance to the object can be accomplished in many different ways including ultrasonically, using laser radar (lidar), FMCW or AMCW radar, micropower impulse radar, any of which can be combined with range gating. All of these distance measuring techniques as well as stereographic, focusing, structured light, triangulation, correlation using random or pseudorandom code modulation and other similar techniques are envisioned for use in some of the inventions described herein and in general there is little prior art describing any of these methods or systems for monitoring the area exterior to a vehicle.

A low-cost preferred approach of solving the distance-measuring problem that is consistent with an HDRC camera system is to project onto the volume of the area of interest a series of infrared light pulses. These pulses are created by an array of laser diodes that are displaced from the camera in such a manner that a pulse of light reflected off of an object in the blind spot will appear on a certain pixel area in the camera field of view and since the location of the transmission of the pulse is known and the location of the camera is known, the distance to the reflecting surface is also known by triangulation. By a judicial choice of transmission angles from the laser diode array, the entire volume of the blind spot can be covered with sufficient accuracy so that no significant object can penetrate the blind spot without creating a reflection and thereby permitting the distance to the object to be determined. No prior art has been uncovered describing this or a similar principle.

In one implementation, a series of pulses from a laser diode array are contemplated. Other techniques will also accomplish the same goal, however, at a generally higher cost. For example, a continuous laser beam can be used that would scan the blind spot area, for example, in either one or two dimensions. Since the direction of the laser will be known that all times its reflection and excitation of pixels on the CMOS array would permit, once again, an accurate, mapping of the distance to various points on the object in the blind spot to be accomplished. This technique however requires a scanning laser system that in general, although more accurate, would be more expensive than a simple array of LEDs. Once again, the photonic mixing device described above would also provide a three-dimensional image of the contents of the blind spot as would a similar and preferred system described below. Another technique is to superimpose on the blind spot area, for example, a pattern of light commonly referred to as structured light. The source of the structured light must be displaced from the imaging array. By observing characteristics of the reflected pattern, such as the distances between portions of the pattern, the distance to the object can be determined. This system, although common in machine vision applications, requires greater computational resources than the simple LED array described above. Nevertheless, it is a viable approach and envisioned for use in the invention and again there appears to be little, if any prior art for the use on structured light in monitoring the area surrounding a vehicle.

Various forms of structured light coupled with other patterns which are either inherent in the lens of the camera or are superimposed mathematically on the image can create what is commonly known as Moiré patterns that also permit the determination of the distance from the camera to the object. In some sophisticated examples, this technique can actually provide the equivalent of topographical maps of the object in the area of interest that would be of value in interpreting or identifying an object. However, these techniques require more computational power and may are not be as cost-effective as the simple LED array described above or a linear scanning LED or laser with a pin diode, or equivalent, receiver as disclosed below. Nevertheless, these techniques are viable for many applications and will become more so as component prices decrease.

All of these systems permit differentiation between light that is reflected from the transmitted infrared systems and reflected light from the sunlight, for example. It is quite likely that at certain times, certain pixels in the camera will receive infrared radiation that overwhelms the reflection of the infrared sent by the host vehicle system. If this radiation comes from pixels other than those that are expected, then the system will know that the results are erroneous. Thus, the systems described above have the capability of permitting the diagnosis of the data and thereby achieving a high accuracy of the results. If the results do not agree with what is expected, then they can be ignored. If that happens over a significant period of time, then the operator of the vehicle is warned that the area monitoring system is non-operational.

Using sophisticated image processing and mathematical techniques, however, it is expected that those periods of non-functionality will be minimal. The vehicle operator however will not be subjected to a false alarm but instead will be told that the system is temporarily non-operational due to excessive sunlight etc. A typical driver can easily relate to this phenomenon and thereby would not lose confidence in the system. The use of a narrow notch filter, as well as polarizing filters, can significantly improve the separation of the artificially illuminated reflected light from the light reflected from the sun. Additionally, the camera shutter can by synchronized with the transmitted light.

Initially, one would assume that the only situation that the driver of a vehicle should be concerned with is if he or she decides to change lanes and after looking into the rear view mirror and not seeing an object in the blind spot, proceeds to change lanes. Unfortunately, the blind spot problem is significantly more complicated. The road may be curved and the lane changing maneuver might be quite easily accomplished. However, based on the geometry of the blind spot detecting system, using prior art systems, the driver is warned that he cannot execute such a lane change. This may be fallacious in that the vehicle that the system determines is in the blind spot may actually be in a different lane. Under the stress of congested driving conditions, the driver will not tolerate an erroneous message and thereby he might lose confidence in the system.

Identification of the object in the blind spot or other area of interest is important and a significant part of one or more of the present inventions disclosed below. Previous blind spot detectors have only indicated that there is a reflection from some object that is near the vehicle that may or may not interfere with the desired intentions of the vehicle operator to change lanes or execute some other maneuver. This is very disquieting to a vehicle operator who was told that something is there but not what that something is. For example, let us say that an operator of a vehicle wished to move that vehicle to the situation where he is partially on the shoulder in order to avoid a vehicle that is intruding onto his lane from the right. Most if not all current systems would tell the vehicle operator that he cannot do so. The system described in the present invention would say that there is a guard rail fifteen feet to your left, thereby allowing movement of 10 feet onto the shoulder and thereby avoid the vehicle intruding onto the lane from the right. This is a real world situation, yet all existing blind spot detection systems would give an erroneous answer or no answer at all to the vehicle operator.

Future automobile safety systems will likely be based on differential GPS and centimeter accurate maps of the roadway. The blind spot detector of this invention is an interim step to help eliminate some of the accidents now taking place. The particular geometry of the road is unknown to vehicles today, therefore, a blind spot detection system cannot use information that says, for example, that the road is about to take a sudden curve to the left, in its decision-making function. Nevertheless, this is a real situation and the system for detecting objects in the blind spot should not give erroneous information to be operator that he is about to have collision when the cause of this analysis is based on the assumption that the road will be straight when in fact a strong left turn is taking place. Note that prior to the presence of accurate maps even the inaccurate maps that now exist or of probe vehicle augmented maps can still be used to aid in this problem.

This problem cannot be solved absolutely at this time but if features such as angular position of the steering wheel of the host vehicle are data that can be entered into the system, then these types of situations can become less threatening. A preferred implementation of the present invention uses data from other vehicle sources in the decision making process including the steering wheel angle, vehicle speed etc. and map and location information if available.

In prior art blind spot detection systems, the inventor has generally realized that the operator of the vehicle cannot be continuously informed that there is an object in the blind spot. Every driver on the highway during rush hour would otherwise be subjected to a barrage of such warnings. Prior art systems have therefore generally provided an optical warning typically placed as an LED on the rear view mirror and an audible alert sounded when the driver activates the turn signal. Unfortunately, under normal driving conditions only about 70% of drivers use their turn signals as an indication of a lane change. Under stressful congested automobile driving situations, one can expect that the percentage would drop significantly. The driver must be warned when he is about to change lanes but the activation of a turn signal is not sufficient. Even crude maps that are available on route guidance systems today can add valuable information to the system by permitting the anticipation of a curve in the road, for example, especially if augmented with data from probe vehicles.

Various studies have shown that the intentions of a driver can sometimes be forecasted based on his activities during a several second period prior to execution of the maneuver. Such systems that monitor the driver and, using neural networks for example, try to forecast a driver's action can be expected to be somewhat successful. However, these computationally intensive systems are probably not practical at this time.

Another method is to provide a simulated audio rumble strip or vibrating actuation to the steering wheel at such time as the driver elects to redirect the motion of the vehicle based on an object in the blind spot. Whereas a rumble strip-type message can be sent to the driver, control of the vehicle cannot be assumed by the system since the road in fact may be executing a sharp curve and taking control of the vehicle might actually cause an accident.

The audio rumble strip method, or a tactile or other haptic messaging system, is the preferred approach to informing the driver of a potentially dangerous situation. Initially, a resistance would be applied to the steering wheel when the driver attempts to alter the course of the vehicle. Since the system will not know whether the driver is following a curve in the road or in fact changing lanes, the driver will be able to easily overcome this added resistance but nevertheless, it should indicate to the driver that there is a potential problem. If the driver persists, then a slight to moderate vibration would be applied to the steering wheel. Once again, this would be easily overcome by the driver but nevertheless should serve to positively warn the driver that he or she is about to execute a maneuver that might result in an accident based on the fact that there is an object in the blind spot.

The blind spot problem for trucks is particularly difficult. Trucks experience the same type of blind spot as do automobiles where the blind spot extends the length of the vehicle. However, the truck driver is also unable to see objects that are in another blind spot extending from forward of the front of the vehicle back typically 25 feet. This blind spot has been discussed in U.S. Pat. No. 5,463,384 and International Publication No. WO 90/13103. Trucks also have blind spots behind the trailer that are problematic during backup maneuvers. The invention disclosed herein is applicable to all three blind spot situations for trucks, automobiles or other vehicles.

It is noteworthy that some trucks have the capability of automatically rotating the side rear view mirrors based on the relative angle between the cab and the trailer. Such mirror systems are designed so that they maintain their orientation relative to the trailer rather than the cab. The blind spot monitoring system of this invention can make appropriate use of this technology to monitor the space along side of the trailer rather then cab.

Buses, trucks and various municipal people conveyors also have a blind spot directly in front vehicle and children have been run over by school buses when the driver was not aware that a child was crossing in front of the bus after embarking from the bus. The system of this invention is also applicable for monitoring this blind spot and warning a bus driver that a child is in this blind spot.

The images obtained from various locations outside of the vehicle can alternately be achieved by cameras or by fiber-optic systems. The inventions herein are not limited to the physical placement of cameras at particular locations when a fiber optic transmission system could be used as well.

1.6 Lane Departure Warning System

Various vehicle manufacturers are now offering early versions of a vision-based lane departure warning system on some vehicle models.

1.7 Night Vision

Various vehicle manufacturers are offering a night vision system on some vehicle models. Some of these systems are based on passive infrared radiation that is naturally emitted from warm bodies and is in the long wave or thermal region of the IR spectrum. Other manufacturers are offering active IR systems that operate in the near IR region of the spectrum that is just below the visual band in frequency. Despite claims to the contrary, it is the view of the inventor herein that such systems are of marginal value and may even contribute to degrading the safety of the vehicle since they can act as a distraction (as discussed below).

1.8 Headlight Control

Various systems have appeared from time to time to automatically dim the headlights of a vehicle when it senses the headlights of an oncoming vehicle. Such systems have now been removed from vehicle models since they had a large number of cases where the lights were dimmed when it was not necessary. Some examples were when the system sensed the reflection of the vehicle's own headlights from a sign, roadway furniture on a curve or even from the roadway when the road changes its angle at the start of a hill, for example. Such systems also did not dim the lights when the vehicle was following another vehicle.

A more sophisticated approach has been developed as described in U.S. Pat. No. 6,587,573. This patent makes use of pattern recognition techniques as disclosed in patents assigned to ATI to determine that light sources from vehicle's head or rail lights are present in images and are distinguishable from other sources of light. The solutions presented in this patent are, however, unnecessarily complicated and alternative approaches are disclosed herein.

2. Displays

Several systems have been proposed that display a view of the blind spot, using a video camera, onto a display either on the instrument panel or on the windshield as a "heads-up" display. Any system that displays a picture of the object on the screen that is inside the vehicle is also going to confuse the driver since he or she will not be able to relate that picture to an object such as another vehicle in the blind spot on the side of the host vehicle. Additionally, the state of the art of such displays does not provide equally observable displays at night and in bright sunlight. Thus, displays on a CRT or LCD are not natural and it is difficult for a driver to adjust to these views. The lighting of the views is too faint when sunlight is present and too bright when the vehicle is operating at night or the brightest object is not the object of interest and can be difficult to see in the presence of brighter objects. Therefore, none of the prior art television-like displays can replace the actual visual view of the occupant. In the discussion below, an icon display derivable from a pattern recognition system will be disclosed.

U.S. Pat. No. 6,429,789 discloses the use of icons in a display system for sensed exterior objects but does not explain how such objects are identified or how to effectively display the icons so as to not confuse the driver. To display an icon without knowing which icon to display or where to display it is of little value.

US patent application Pub. No. 20040032321 describes use of a camera for viewing the space behind the vehicle for obstacles and a display showing the obstacles, but the display is a video screen and does not display icons. As a result, the display is difficult to see and interpret.

U.S. Pat. No. 5,949,331 describes a video display with the forecasted path of the vehicle overlaid. It does not identify other vehicles or objects nor represent them with icons.

An article on the EE Times website published Jan. 5, 2004, "Head-up displays get second glance", describes a multicolor head-up display.

An Article in Nature, Issue 428, pages 911-918, Apr. 29, 2004 titled "The path to ubiquitous and low-cost organic electronic appliances on plastic" provides a good review of the state of the art for organic displays based on OLEDs which the inventor herein expects to be the future of automotive head-up displays.

European patent application EP1179958 describes use of an overhead view, as well as from any other direction, of a host vehicle along with a view of the objects that surround the vehicle. This differs from some of the ideas disclosed herein in that the invention actually compose a video image from up to eight camera images that are mounted on the vehicle exterior. No mention is made of the use of icons and this patent is a good example of the complexity of that approach and of the confusion that results especially when pixels which are not observable due to blockage are displayed as black. A preferred approach as disclosed herein is to identify objects that are in the vicinity of the host vehicle and then represent them as icons. This is a far simpler computational approach, results is a clearer image and allows for the full representation of the object including pixels that cannot be seen by the cameras. It also permits use of panoramic cameras thereby reducing the total number of cameras to four for imaging all areas surrounding the vehicle.

3. Identification

Neural networks and in particular combination neural networks are used in several of the implementations of this invention as the pattern recognition technology since it makes the monitoring system accurate, robust, reliable and practical. The resulting algorithm(s) created by a neural network program is usually only a few hundred lines of code written in the C or C++ computer language. The resulting systems are easy to implement at a low cost, making them practical for automotive applications. The cost of the CCD and CMOS arrays, for example, have been expensive until recently, rendering their use for around vehicle area monitoring systems impractical. Similarly, the implementation of the techniques of the above referenced patents frequently requires expensive microprocessors while the implementation with neural networks and similar trainable pattern recognition technologies permits the use of low cost microprocessors typically costing less than $10 in large quantities.

In using neural networks the data is usually preprocessed, as discussed below, using various feature extraction techniques. An example of such a pattern recognition system using neural networks on sonar signals is discussed in two papers by Gorman, R. P. and Sejnowski, T. J. "Analysis of Hidden Units in a Layered Network Trained to Classify Sonar Targets", *Neural Networks*, Vol. 1. pp 75-89, 1988, and "Learned Classification of Sonar Targets Using a Massively Parallel Network", IEEE Transactions on Acoustics, Speech, and Signal Processing, Vol. 36, No. 7, July 1988. Examples of feature extraction techniques can be found in U.S. Pat. No. 4,906,940. Examples of other more advanced and efficient pattern recognition techniques can be found in U.S. Pat. No. 5,390,136 and U.S. Pat. No. 5,517,667. Other examples include U.S. Pat. No. 5,235,339, U.S. Pat. No. 5,214,744, U.S. Pat. No. 5,181,254, and U.S. Pat. No. 4,881,270.

Although a trained neural network or combination neural network is contemplated for preferred embodiments of this invention, adaptive neural networks and other forms of artificial intelligent systems are also applicable especially where the host vehicle may be towing different loads that could confuse a static trained system. In this case, part of the system can be made adaptive to adjust to the particular load being pulled by the vehicle.

The field of neural networks is a developing field of research and the future can be expected to see vast improvements in artificial intelligence systems that go far beyond the concepts now in use of neural networks and associative memories. All applications of this work to solving automotive safety problems are contemplated herein and the term neural network will be used herein as representative of the class of such methods now in existence or to be developed. Of particular interest is a book by Jeff Hawkins, *On Intelligence*, 2004 Times Books, Henry Holt and Company, LLC, New York, N.Y. This book provides a basis for the development of future AI methods which will have applicability to automotive safety.

4. Anticipatory Sensors

The principles of the inventions disclosed herein can also be used for other purposes such as intelligent cruise control, speed over ground sensors, parking aids, height sensors for active suspensions, anticipatory crash sensors and obstacle detection systems. One particular application is for rear impact anticipatory sensors where both the distance and velocity (perhaps using Doppler principles where applicable) can be determined and used to deploy a movable headrest or equivalent.

The state of the art as of Apr. 23, 2001 of anticipatory sensors can be found summarized in a report by P. L. J. Morsink titled "Pre-crash sensing for increasing active and passive safety", TON report) 1.OR.BV.013.0/PM which is available on the Internet at passivesafety.com. Most of the ideas on anticipatory sensing that appear in patents assigned to ATI and ITI covering anticipatory sensing that predate this report are not mentioned in the report or are handled superficially. Although mention is made of the need for object classification and other information, how to do it is generally missing from this report. The report lists the following information that is needed from sensors as:

time to impact
distance to the object
object classification (including size and shape)
trajectory of the obstacle
closing velocity
impact direction
acceleration of the incoming object
mass and stiffness of the incoming object
point of impact One point that is made with regard to anticipatory sensors is "The crash pulse is still necessary because, e.g., a radar sensor cannot distinguish an empty box or concrete pillar." Although in principle if a concrete pillar looks like an empty box, this might be true, however the frequency of this happening is vanishingly small and in those and similar cases, the system would be biased not to set off the airbags for cases where an appropriate pattern recognition system is not sure of the identity of the object. In such cases, the default position would be to rely on the crash sensors. A properly trained pattern recognition system is not going to confuse a Mack truck traveling toward the vehicle at 60 mph with a cardboard box. Thus, the system discussed below will make the proper decision in 99+% of the cases and rely on the crash sensors whenever it is unable to make a decision. Due to this general misconception and teaching away from the inventions disclosed below, plus the 43,000+ roadway fatalities, there is clearly a long felt need for a proper and accurate anticipatory sensor as disclosed herein.

U.S. patent application Pub. No. 20050065688 also describes some of the ideas presented below and in ATI and ITI patents.

4.1 Positioning Airbags

Frontal impacts were the number one killer of vehicle occupants in automobile accidents with about 16,000 fatalities each year. Side impacts were the second cause of automobile related deaths with about 8,000 fatalities each year. The number of fatalities in frontal impacts as well as side impacts has been decreasing due to the introduction of airbags and mandatory seatbelt use laws.

Several automobile manufacturers are now using side impact airbags to attempt to reduce the number of people killed or injured in side impacts. The side impact problem is considerably more difficult to solve in this way than the frontal impact problem due to the lack of space between the occupant and the side door and to the significant intrusion of the side door into the passenger compartment which typically accompanies a side impact.

Some understanding of the severity of the side impact problem can be obtained by a comparison with frontal impacts. In the Federal Motor Vehicle Safety Standard (FMVSS) 208 49 kph crash test which applies to frontal impacts, the driver, if unrestrained, will impact the steering wheel at about 30 kph. With an airbag and a typical energy absorbing steering column, there is about 40 cm to about 50 cm of combined deflection of the airbag and steering column to absorb this 30 kph difference in relative velocity between the driver and vehicle interior. Also, there is usually little intrusion into the passenger compartment to reduce this available space.

In the FMVSS 214 standard crash for side impacts, the occupant, whether restrained or not, is impacted by the intruding vehicle door also at about 30 kph. In this case, there is only about 10 to 15 cm of space available for an airbag to absorb the relative velocity between the occupant and the vehicle interior. In addition, the human body is more vulnerable to side impacts than frontal impacts and there is usually significant intrusion into the passenger compartment. A more detailed discussion of side impacts can be found in a paper by Breed et al, "Sensing Side Impacts", Society of Automotive Engineers Paper No. 940651, 1994.

Ideally, an airbag for side impact protection would displace the occupant away from the intruding vehicle door in an accident and create the required space for a sufficiently large airbag. Sensors used for side impact airbags, however, usually begin sensing the crash only at the beginning of the impact at which time there is insufficient time remaining to move the occupant before he is impacted by the intruding door. Even if the airbag were inflated instantaneously, it is still not possible to move the occupant to create the desired space without causing serious injury to the occupant. The problem is that the sensor that starts sensing the crash when the impact has begun is already too late, i.e., once the sensor detects the crash, it is usually too late to properly inflate the airbag.

There has been discussion over the years in the vehicular safety community about the use of anticipatory sensors so that the side impact accident could be sensed before it occurs. Prior to 1994, this was not practical due to the inability to predict the severity of the accident prior to the impact. A heavy truck, for example, or a tree is a much more severe accident at low velocity than a light vehicle or motorcycle at high velocity. Further, it was not possible to differentiate between these different accidents with a high degree of certainty.

Once a sufficiently large airbag is deployed in a side impact and the driver displaced away from the door and the steering wheel, he will no longer be able to control the vehicle that could in itself cause a serious accident. It is critically important, therefore, that such an airbag not be deployed unless there is great certainty that the driver would otherwise be seriously injured or killed by the side impact. Anticipatory sensors have previously not been used because of their inability to predict the severity of the accident. As discussed more fully below, the present invention solves this problem and therefore makes anticipatory sensing practical. This permits side impact airbag systems that can save a significant percentage of the people who would otherwise be killed as well as significantly reducing the number and severity of injuries. This is accomplished through the use of pattern recognition technologies such as neural networks such as discussed in U.S. Pat. No. 5,829,782.

Neural networks, and more recently modular neural networks, are capable of pattern recognition with a speed, accuracy and efficiency previously not possible. It is now possible, for example, to recognize that the front of a truck or another car is about to impact the side of a vehicle when it is one to three meters or more away even in fog, smoke, rain or snow and further away if range gating is used. This totally changes the side impact strategy since there is now time to inflate a large airbag and push the occupant out of the way of the soon to be intruding vehicle. Not all side impacts are of sufficient severity to warrant this action and therefore, there will usually be a dual inflation system as described below.

Although the main application for anticipatory sensors is in side impacts, frontal impact anticipatory sensors can also be used to identify the impacting object before the crash occurs. Prior to going to a full frontal impact anticipatory sensor system, neural networks can be used to detect many frontal impacts using data in addition to the output of the normal crash sensing accelerometer. Simple radar or acoustic imaging, for example, can be added to current accelerometer based systems to give substantially more information about the crash and the impacting object than possible from the acceleration signal alone.

The side impact anticipatory sensor of this invention can use any of a variety of technologies including optical, radar (including noise radar, Micropower impulse radar, and ultra wideband radar), acoustical, infrared or a combination of these. The sensor system typically contains a neural network processor to make the discrimination however a simulated neural network, a fuzzy logic or other algorithm operating on a microprocessor can also be used.

European Patent Publication No. EP0210079 (Davis) describes, inter alia, a radar system for use in connection with an airbag deployment apparatus to prevent injury to passengers when impact with an approaching object is imminent. Voltage level inputs representative of the distance between an object and the vehicle, the approach rate of the object with respect to the vehicle, the vehicle speed and driving monitor inputs, e.g., steering angles, turning rates and acceleration/deceleration, are all generated by appropriate detectors, weighted according to their importance to a normal vehicle operators' sensed safe or danger levels and then the weighted input voltages are summed to provide an "instantaneous voltage level". This instantaneous voltage level is compared with a predetermined voltage level and if the instantaneous voltage level falls within a predetermined safe zone, output signals are not produced. On the other hand, if the instantaneous voltage level falls outside of the safe zone, i.e., within a danger zone, then the system can be designed to initiate deployment of the airbag on the additional condition that the vehicle speed is above a predetermined level. For example, the system can be programmed to deploy the airbag when the vehicle speed is between 35 and 204 miles per hour at a time of about 0.2 second prior to impact thereby enabling the airbag sufficient time to fully inflate.

Davis includes a radar system that includes an antenna assembly, a signal-processing unit and an output monitor. Davis relies on a radar signal generated by an antenna in the antenna assembly and which causes a return signal to be produced upon reflection of the radar signal against the approaching object. The return signal is received by a transceiver to be processed further in order to determine the distance between the object and the vehicle and the rate the object is approaching the vehicle. The return signal from the radar signal generated by the antenna is a single pulse, i.e., a single pixel. The elapsed time between the emission of the radar signal by the antenna and the receipt of the return signal by the transceiver determines the distance between the object and the vehicle and based on the elapsed time for a series of radar signals generated at set intervals, it is possible to determine the approach rate of the object relative to the vehicle.

In operation, the approach rate of the object relative to the vehicle, the distance between the object and the vehicle, the vehicle speed as well as other driving parameters are converted to voltage levels. Davis then uses an algorithm to weigh the voltage levels and compare the voltage levels to predetermined conditions for which airbag deployment is desired. If the conditions are satisfied by the results of the algorithm operating on the weighted voltage levels, then the airbag is deployed. In one embodiment, by appropriate manipulation of the voltage levels, false-triggering of the airbag can be prevented for impacts with objects smaller than a motorcycle, i.e., the voltage corresponding to a motorcycle at a certain distance from the vehicle is smaller than the voltage corresponding to a truck, for example at that same distance.

Davis does not attempt to recognize any pattern of reflected waves, i.e., a pattern formed from a plurality of waves received over a set period of time, from many pixels simultaneously (as with light and CCDs, for example) or of the time series of ultrasonic waves. A tree, for example can have a smaller radar reflection (lower voltage in Davis) than a motorcycle but would have a different reflected pattern of waves (as detected in the present invention). Thus, in contrast to the inventions described herein, Davis does not identify the object exterior of the vehicle based on a received pattern of waves unique to that object, i.e., each different object will provide a distinct pattern of reflected or generated waves. The radar system of Davis is incapable of processing a pattern of waves, i.e., a plurality of waves received over a period of time, and based on such pattern, identify the object exterior of the vehicle. Rather, Davis can only differentiate objects based on the intensity of the signal.

International Publication No. WO 86/05149 (Karr et al.) describes a device to protect passengers in case of a frontal or rear collision. The device includes a measurement device mounted in connection with the vehicle to measure the distance or speed of the vehicle in relation to an object moving into the range of the vehicle, e.g., another vehicle or an obstacle. In the event that prescribed values for the distance and/or relative speed are not met or exceeded, i.e., which is representative of a forthcoming crash, a control switch activates the protection and warning system in the vehicle so that by the time the crash occurs, the protection and warning system has developed its full protective effect. Karr et al. is limited to frontal crashes and rear crashes and does not appear to even remotely relate to side impacts. Thus, Karr et al. only shows the broad concept of anticipatory sensing in conjunction with frontal and rear crashes.

U.S. Pat. No. 4,966,388 relates to an inflatable system for side impact crash protection. The system includes a folded, inflatable airbag mounted within a door of the vehicle, an impact sensor also mounted within the door and an inflator coupled to the impact sensor and in flow communication with the airbag so that upon activation of the inflator by the impact sensor during a crash, the airbag is inflated.

U.S. Pat. No. 3,741,584 shows a pressurized air container and two air lines leading to a protective air bag. An air line passes through a first valve which is controlled by an anticipatory sensor and the other air line passes through a second valve controlled by an impact detector. The purpose of having two sensors associated with different valves is to ensure that the protective bag will inflate even if one of the crash sensors does not operate properly.

U.S. Pat. No. 3,861,710 shows an airbag inflation system with a single airbag which is partially inflated based on a signal from an obstacle detecting sensor and then fully inflated based on a signal from an impact detecting sensor. The obstacle detecting sensor controls release of gas from a first gas supply source into the gas bag whereas the impact detecting sensor controls release of gas from a second gas supply source into the gas bag. The first gas supply source includes a first gas container filled with a proper volume of gas for inflating the gas bag to a semi-expanded condition, a first valve mechanism, a pipe between the first gas container and the first valve mechanism and a pipe between the first valve mechanism and the gas bag. The second gas supply source includes a second gas container filled with gas in a volume supplementing the volume of gas in the first gas container so that the contents of both gas containers will fully inflate the gas bag, a second valve mechanism, a pipe between the second gas container and the second valve mechanism and a pipe between the first valve mechanism and the gas bag.

U.S. Pat. No. 3,874,695 shows an inflating arrangement including two inertia-responsive switches and coupled gas-generators. The gas-generators are triggered by the switches to inflate an airbag. The switches are both crash sensors and measured acceleration produced during the collision, and thus are not anticipatory sensors. The purpose of the two switches operative to trigger respective gas-generators is to enable the airbag to be inflated to different degrees. For example, if the crash involving the vehicle is a low speed crash, then only switch is actuated and gas-generated is triggered and the airbag will be inflated to part of its full capacity.

In U.S. Pat. No. 5,667,246, there are two accelerometers, each of which provides a signal when the value of the increase in deceleration exceeds a respective threshold value. The signal from the accelerometer is set to a first ignition stage and through a delay member to a second ignition stage. The second ignition stage also receives as input, a signal from the accelerometer and provides an inflation signal only when it receives a signal from both accelerometers. In operation, when the accelerometer sends a signal it serves to partially inflate the airbag while full inflation of the airbag is obtained only by input from both accelerometers.

Taniguchi (JP 4-293641) describes an apparatus for detecting a body moving around another body, such as to detect a car thief moving around a car. The apparatus includes a detection section supported on a support toll to the roof of the car. Taniguchi states that the detection section may be based on an infrared, microwave or ultrasonic sensor.

4.2 Exterior Airbags

Externally deployed airbags have been suggested by Carl Clark and William Young in SAE paper "941051 Airbag Bumpers", 1994 Society of Automotive Engineers. Clark and Young demonstrated the concept of pre-inflating the airbag for frontal impacts but did not provide a method of determining when to inflate the airbag. The sensing problem was left to others to solve.

4.3 Pedestrian Protection

Although numerous patents have now appeared that discuss using an external airbag for the protection of pedestrians, little if any prior art exists on using anticipatory sensing for the detection of a pedestrian and for the pre-inflating of the pedestrian protection exterior airbag. Let us now consider some related art. None of the relevant ideas on the detection and classification of objects around the vehicle are believed to predate those disclosed in U.S. Pat. No. 6,343,810 and its linked predecessors.

Stereo cameras and neural networks are disclosed in a 1999 paper by L. Zhao and C. Thorpe at the itsc'99 Conference in Tokyo, Japan titled "Stereo- and Neural Network-Based Pedestrian Detection" and earlier in U.S. Pat. No. 6,370,475. The paper mentions that it can operate at video rate (30 frames per second) which is fast enough for automotive application; however, later they say that the stereo system can operate at 3-12 frames per second. Twelve frames would border on being too slow. The detection rate was stated at 85.2% with a false alarm rate of 3.1%. It is difficult to believe that such a system would be used for pedestrian detection for automobiles where hood raising or external airbags would be deployed with such a high false alarm rate. For such automotive applications, the false alarm rate would have to be effectively zero due to the large number of non-pedestrian scenes that a vehicle encounters on every trip. Other concepts discussed in the paper include:

Use of depth (from stereovision) segmentation to select candidate windows.

Normalization of candidate windows to 30×65 pixels.

Feed intensity gradient image directly into a feed-forward neural network.

Train using back-propagation and bootstrapping.

Note that the performance is not high even with a small database and that depth segmentation will not work if pedestrians are not close to the camera.

T. Evgeniou and T. Poggio, in "Sparse Representation of Multiple Signals", MIT AI Laboratory, September 1997, A. I. Memo No. 1619, attempt to fine sparse representations of a class of signals specifically those from images of pedestrians. In a sense, they use pattern recognition or it can be thought of as a deterministic determination. In any event, the recommend method is too complicated and too slow for practical use. Also, the accuracy of recognition of a pedestrian is not reported and it only considers forward facing pedestrians. This paper is related to pedestrian recognition only indirectly. It is a pattern-matching related approach, which has similar problems to those that have to be solved for Radial Basis Function (RBF) and Support Vector Machine (SVM) networks to reduce number of memorized support vectors.

This paper is very mathematical and is not closely related to pedestrian detection. The only application in the pedestrian detection problem is to help in the selection of a compact set of features from an over-complete transform such as wavelet decomposition.

C. Wohler, J. K. Anlauf, T. Portner and U. Franke, in "A time delay neural network algorithm for real-time pedestrian detection" 1998 IEEE International Conference on Intelligent Vehicles, pages 247-252, discuss a motion-based pedestrian detection system using stereo cameras which appears to also be too slow and too inaccurate. It uses neural networks in a time delay fashion which is similar to the combination neural networks developed by the current assignee. It is based on leg motion and therefore is not viable for pedestrians walking head-on into or away from an oncoming vehicle. It discusses using a fast stereo algorithm and motion tracking uses a Kalman filter but no data is provided as to how this is implemented.

C. Papageorgiou, T. Evgeniou and T. Poggio, in "A trainable pedestrian detection system", Proceedings of Intelligent Vehicles, Stuttgart Germany October 1998, discuss a system that appears to not be based on a vehicle and even in its most advance form, the system requires 1.2 seconds to detect and classify a pedestrian and thus is too slow. Since the distance to a pedestrian is not recorded, it is difficult to make any judgment as to the accuracy of the system. This paper discusses the use of wavelets, edges and SVM, all of which have limitations as discussed herein.

The key point in this approach is feature extraction. Once the feature vectors are extracted, they can be processed using SVM, RBF, or simple feed-forward neural networks as has been done for years by the current assignee.

D. M, Gavrila, in "Pedestrian Detection from a moving vehicle", Proceedings of the European Conference on Computer Vision, pp 37-49, Dublin, 2000, also reports on a pedestrian detection system. This system requires 1 second using a dual Pentium 450 megahertz processor. This is clearly too slow and requires too much processing power so as to render this system impractical. It makes use of template matching which is a slow computationally intensive pattern recognition method.

The technology in this article and in U.S. Pat. No. 6,556, 692 by the same author focuses on finding the regions of interest or candidate windows in the images. The method is shape-matching (or correlation) against a preset template tree. The shape is found using edge detection, and fuzziness is added by distance transform or simply low pass filtering. In this paper, it is also proposed to use pattern matching approach based on texture features. FIG. 1(d) demonstrates picture after texture processing (DT), This is similar to some work done by the current assignee's employees. The inventor herein believes that pattern matching approaches should be avoided as they are very limited by artificially constructed pattern templates.

As discussed in U.S. Pat. No. 6,556,692 and in the current assignee's prior patents, when using neural networks approaches, "a priori knowledge" about the objects is not required. It is enough to have a properly marked training set with sufficient size. Modular neural networks are a better approach than the tree structure used in the '692 patent. Also, instead of softening with the distance transformation as discussed, a better approach is to use a "stop at an edge" technique, shifts of initial image and fixed set of networks in an ensemble, which can simulate "eye saccades", and allows precisely defined and most probable place of an object in the image and increased the probability of a successful recognition.

US patent application Pub. No. 20050084156 describes neural networks as something others might do. Since the effective use of neural networks, as taught in the current assignee's patents, is somewhat complicated. The fact that others might consider their use for pedestrian detection is not an enabling statement. The technique discussed uses a multi-path classification or detection:

Stereovision: obtain depth map and then run exhaustive search of the template database.

Image feature-based: use neural network to process features such as edge energy, intensity variation, symmetry, shadow, histogram, etc.

Include other data sources such as radar.

The only detailed approach in this patent application is (histogram-based, no stereo, and only for separation between car and pedestrian):

1. Generate image histogram
2. Find a double threshold using contour score (with an improbable formula)
3. Generate binary image by applying double threshold
4. Generate row-sum and column-sum vectors
5. Calculate object score and apply threshold (using the same faulty formula)

N. Checka, in "Fast pedestrian detection from a moving vehicle", Proceedings of the 2004 Student Oxygen Workshop, MIT Computer Science and Artificial Intelligence Laboratory, uses cascade-based neural networks which is a subset of modular neural networks developed by the current assignee. No accuracy or speed data is provided in this paper. This paper is a very brief description. Nothing informative is presented except that the AdaBoost algorithm is used in a cascade architecture or multistage classification. There is no detailed explanation of the approach. In this paper some texture-like features appear to be used, actually wavelets, and some sort of modular neural networks. By comparison the assignee is using a wider range of features including edges and contours and has selected better texture features. There is nothing said about using sequences of images which can greatly improve the accuracy.

While reading Fang, Y., K. Yamada, Y. Ninomiya, B. K. P. Horn, & I. Masaki "A Shape-Independent Method for Pedestrian Detection with Far-Infrared Images," *IEEE Transactions On Vehicular Technology*, Vol. 53, No. 5, September 2004, it becomes obvious that the authors of this paper, as well as all of the previous papers discussed above, do not really understand neural networks. Their application of neural networks is very primitive and doomed to failure. Also, this system is based on thermal infrared technology and it is very difficult to get the distance to an object based on thermal IR unless stereo cameras are used to which also is relatively inaccurate for longer separations. The accuracy of the system probably is poor since the distance to the pedestrian is not provided. At six frames per second, this system is also too slow.

The proposed method applies to night vision only. The detection consists of two stages: hypothesis and verification (a common approach to many detection/classification problems). The hypothesis (or segmentation) stage is done as follows:

1) Binarize far-infrared images
2) Count bright pixels at each column
3) Find peaks of pixel count along the horizontal direction
4) Within the regions of peaks, narrow down the vertical position based on brightness and intensity variation along the horizontal direction.

The verification (or classification) stage is done by using (with or without a combination of) the following methods:

Similarity of the intensity histogram.

The fact that bright pixels usually locate near the center of the region of a pedestrian and often locate close to the boundary of the region of a non-pedestrian.

The fact that the pedestrian regions locate more closely in a data space defined by the vertical edge pixel counts in the region and its immediate upper/lower neighbors.

A. Shashua, Y. Gdalyahu and G. Hayon. Pedestrian Detection for Driving Assistance Systems: Single-frame Classification and System Level Performance. *Proc. of the IEEE Intelligent Vehicles Symposium* (IV2004), June 2004, Parma, Italy, discloses a speed of ten hertz which is marginal. The accuracy is probably poor however since the accuracy is critically based on the distance from the vehicle and since this is not stated it is difficult on any of these papers to judge what the accuracy is when the pedestrian is no more than ten meters away. The method of dividing the pedestrian to separate segments is unnecessary if one understands the basis of neural networks and it is probably a poor choice in any event. Although it is difficult to ascertain, it looks like that for a distance of up to fifteen meters there is a ninety six percent accuracy with some false positives; however, it takes 4.6 frames to reach this accuracy which is approximately one half second which would be too slow. In the opinion of the inventor herein, the actual capability of generalization is not as good as it sounds in this paper, and the flat-road assumption can cause problems in the real world.

To summarize:

The paper focuses on single-frame classification.

The single-frame classification algorithm has 2 stages:

1. The region of interest is divided into sub regions, and orientation histogram (or edge energy) is extracted from each sub region. Then Ridge Regression is used to calculate the weights with which the best linear separation can be achieved within individual training clusters (i.e., subsets of training set).

2. Then, the inner-product of the weights and the feature values forms a new feature vector and AdaBoost is used to optimize against the entire training set.

The paper lacks details on other modules of the entire system.

The authors mention an "attention mechanism", which generates about a fixed number of candidate windows (75 on average). The current assignee also employs an "attention mechanism" that generates arbitrary number of candidates depending on a particular image but usually the number is much smaller. The "attention mechanism" isn't described in the paper so it is difficult to evaluate it. The current assignee uses neural networks inside the "mechanism" to increase probability to find the Region of Interest (ROI) containing a pedestrian.

Similar to the described approach, the currently assignee also treats "Single Frame Classification Algorithm" (Part III) as one of most important parts of the system. Most important in the presented paper is splitting ROI to 9 sub-regions for independent analysis and manually preparing 9 separate training sets. These are strong limitations of the algorithm because it becomes suitable for pedestrians only. Also they use oriented gradients to construct a feature vector for recognition and (as it is described) some texture parameters to find a ROI. The presented approach is also limited. The assignee uses both types of features for recognition, as well as contours. The authors build their system on the 9 sub-regions instead of complex net for whole ROI. They mentioned that the results with a complex network, as taught by the current assignee, is better.

Several key features related to pedestrian recognition were first disclosed by ATI and ITI in the patents referenced herein. Among these ideas are the placement of the camera on the rear view mirror, the use of pattern recognition which includes template matching, segmentation, use of stereo or multiple cameras for monitoring the area of the space surrounding the vehicle, the general concept of detecting and classifying of pedestrians, vehicles, and other objects surrounding the vehicle, use of the visual, near infrared or far infrared portions of the electromagnetic spectrum and various advantages of using each of these particular portions of the spectrum.

In particular, the method of segmentation which is how to separate interesting objects in a scene so that they can be isolated and analyzed and identified separately using stereo vision, a scanning laser radar with distance measuring capabilities, and range gating were all believed to have been first disclosed by ATI and ITI in their patents. Several combinations of these techniques have been disclosed as examples of how one would combine various techniques. For example, a laser radar can be used in conjunction with a night vision far infrared system to measure the distance to the object emitting the radiation. In fact, using radar or any other method of detecting that there may be an object of interest including using the radiation emitted by that object which can be in the form of visual, thermal, or acoustic can be used to get the attention of system and subsequently cause a thin beam scanning laser radar to determine the location of emitting object. One technique which was not disclosed in detail but nevertheless obvious is to obtain a rough estimate of the distance of an object, and the object is classified for example as a pedestrian based on the size of the region of interest that has been isolated to contain the image of the pedestrian. Other obvious techniques are based on the vertical location of the object of interest in the camera field of view which may require the assumption that the road is relatively flat.

4.4 Rear Impact

The first disclosure of any rear impact sensor, either anticipatory or a contact sensor, is believed was made in U.S. Pat. No. 5,629,681 and U.S. Pat. No. 5,694,320. Such sensors can be used as disclosed in the current assignee's patents for deploying a variety of whiplash protection devices and the first disclosure of such a device deployed by a sensor was also made by the current assignee in the above patents. Although Japanese patent No. 2003-112545 is related, it is believed to follow the invention by the current assignee's inventors.

4.5 Positioning of out-of-position occupants

U.S. patent application Ser. No. 11/423,596, now U.S. Pat. No. 7,338,069, describes positioning airbags and especially for such airbags that are triggered by an anticipatory sensor, and any prior art cited therein might be relevant to this aspect.

5. Agricultural Product Distribution Machines

A description of agricultural product distribution machines is set forth in the parent '598 application and in U.S. Pat. No. 6,285,938.

6. Distance Measurement

As discussed above, regardless of the distance measurement system used, a trained pattern recognition system, as defined below, can be used to identify and classify, and in some cases to locate, the illuminated object. Distance measurements by a variety of techniques can be used to determine the distance from the sensor to an object in the monitored area. They can also determine the distance to the ground for agricultural applications, for example, and provide correction information of the effective angle of transmission as will be discussed below.

Use of passive optical camera systems, such as the HDRC camera, has been discussed and the method of using either neural networks, optical correlation, or other pattern recognition systems has also been and will be discussed that illustrates how, in the present invention, the identity of the object occupying the area of interest will be determined. What follows now is a more detailed discussion of position determination.

For a preferred implementation of the system, the light from laser diodes will cross the field of view of the camera. If there is a heavy fog, for example, in the monitored area, then the reflection of the light off of the fog will create an elliptical image on the camera sensor array. This would also be true when heavy rain, smoke or heavy snowfall is present. This fact can be used to determine visibility. Observations of visibility conditions of objects in the area surrounding the vehicle even during severe weather conditions has led the inventor of this invention to the conclusion that when the visibility is so poor that the optical system using laser diodes described herein, for example, is not functioning with sufficient accuracy, that the operator of the vehicle should not be operating the vehicle on the roads and therefore the vehicle operator should be informed that safe travel is not possible. Thus, the use of radar or other technologies to view the blind spot, for example, which is actually quite close to the vehicle, is not necessary since vehicle operation should not be permitted when the visibility is so poor that the object cannot be seen in the blind spot, for example, by the systems of this invention. Nevertheless, the inventions herein can contribute to safe driving in these conditions, if such driving is attempted, since an indication will be obtained by the system based on the elliptical reflections from the laser diode indicating that the visibility is unacceptable. Note that when using a scanning IR laser radar system, the range of view of the system greatly exceeds that of the human operator especially when range gating is used to remove close-up reflections from the atmosphere (rain, snow, fog, smoke etc.)

For the embodiment of the invention using triangulation, it is desirable for the laser diodes, scanning laser diode or other light source to be displaced as far as reasonably possible from the camera in order to permit the maximum accuracy for the triangulation calculations. In an automobile, as much as six inches exists from one side of the exterior rear view mirror to the other side. This is marginal. For large trucks, the vertical distance separating the top and bottom of the rear housing can be as much as 24 inches. In both cases, the laser diode would be placed at one extreme and the camera at the other extreme of the mirror housing. An alternate approach is to place the camera on the mirror housing but to place the light source on the vehicle side. Alternately, both the camera and the light source can be placed at appropriate positions on the side of the vehicle. The key is that the direction of the light source should cross field of view of the camera at preferably a 10 degree angle or more.

Since the dots or a line created by a light source used to monitor the area of interest will likely be in the infrared spectrum and the majority of the light coming from objects in the monitored area will be in the visible spectrum, the possibility exists to separate them through the use of an infrared filter which will allow more accurately the determination of the location of the reflection from the laser diode onto the optical array. Such filters can be done either mathematically or through the imposition of a physical filter. However, this approach can require a mechanical mechanism to move the filter in and out of the camera field of view if visible light reception is also desired. Alternately, to eliminate the need to move the filter, a pin diode or equivalent dedicated receiver can be used to receive the reflected infrared light. Of course, multiple imagers can also be used, one for infrared and another for visible.

7. Scanners

A large number of patents and literature is available on rotating and vibrating mirror scanners and need not be listed here. These include rotating polygons such as used in surveying and office copiers and oscillating mirrors as in galvanometer type approaches. Scanners based on acousto-optical principles for use in automotive applications are new and are disclosed in the above-referenced patents and patent applications to ITI. A discussion on acousto-optic scanners can be found in U.S. Pat. No. 06,560,005.

8. Definitions

Preferred embodiments of the invention are described below and unless specifically noted, it is the applicant's intention that the words and phrases in the specification and claims be given the ordinary and accustomed meaning to those of ordinary skill in the applicable art(s). If the applicant intends any other meaning, he will specifically state he is applying a special meaning to a word or phrase.

Likewise, applicant's use of the word "function" here is not intended to indicate that the applicant seeks to invoke the special provisions of 35 U.S.C. §112, sixth paragraph, to define his invention. To the contrary, if applicant wishes to invoke the provisions of 35 U.S.C. §112, sixth paragraph, to define their invention, he will specifically set forth in the claims the phrases "means for" or "step for" and a function, without also reciting in that phrase any structure, material or act in support of the function. Moreover, even if applicant invokes the provisions of 35 U.S.C. §112, sixth paragraph, to define his invention, it is the applicant's intention that his inventions not be limited to the specific structure, material or acts that are described in the preferred embodiments herein. Rather, if applicant claims his inventions by specifically invoking the provisions of 35 U.S.C. §112, sixth paragraph, it is nonetheless his intention to cover and include any and all structure, materials or acts that perform the claimed function, along with any and all known or later developed equivalent structures, materials or acts for performing the claimed function.

The definitions set forth in the parent '598 application, section 8 of the Background of the Invention section, are applicable herein.

OBJECTS AND SUMMARY OF THE INVENTION

An object of the present invention is to provide a system and method for detecting and obtaining information about objects around a vehicle which are likely to impact the vehicle and taking action to reduce the potential harm caused by the impact.

Additional objects and advantages of the invention, or other disclosed inventions, are set forth in the parent '598 application.

In order to achieve some of these objects, a motor vehicle in accordance with the invention includes a reactive system for controlling the motion or travel direction of the vehicle, and an anticipatory sensor system for determining that an impact involving the vehicle is about to occur unless a corrective action is taken based on data obtained prior to the impact and determining whether the potential impact requires activation of the reactive system. The anticipatory sensor system includes at least one receiver for receiving waves or energy and a pattern recognition system for analyzing the received waves or energy or data representative of the received waves or energy to determine that an impact is about to occur if corrective action is not taken and to determine whether the potential impact requires activation of the reactive system. The pattern recognition system ascertains the identity of an object from which the waves or energy have been emitted, reflected or generated, so that the determination whether the impact requires activation of the reactive system is at least partially based on the identification of the object. The pattern recognition system includes a processor embodying a pattern recognition algorithm which provides an output of one of a number of pre-determined identities of the object, e.g., a human or more specifically a pedestrian or a cyclist, a truck, or an animal. The anticipatory sensor system may include monitors, including the receivers, which monitor any or all of the sides of the vehicle.

The reactive system may be a system which is arranged to activate at least one of the brakes of the vehicle, a throttle of the vehicle or steering of the vehicle.

The sensor system can include a transmitter for transmitting energy or waves away from the vehicle and which are receivable by the wave receiver(s) after reflection from the object, and which transmitter may be arranged apart from the wave receivers. The transmitter may generate a visible or infrared laser beam, in which case, the wave receivers can be a charge coupled or CMOS device which receive reflected light. The sensor system can also include circuitry coupled to the wave receivers to process signals from the wave receivers representative of the waves received by the wave receivers into an indication that an impact is about to occur if corrective action is not taken. Use of the system can be for side impacts, in which case, the wave receivers are arranged on a side of the vehicle to sense a pending side impact, or at a front of the vehicle to sense a pending frontal impact. The transmitter may transmit infrared waves, in particular those in an eye-safe range. The transmitter may be controlled by a controller or processor in the anticipatory sensor system such that the intensity of transmitted infrared waves is determined at least in part by the distance to the reflecting object, this distance may be obtained from received waves or another distance measurement technique. The anticipatory sensor system may also be arranged to apply range gating to select a range of an object to be identified, and then analyze the received waves accordingly.

The pattern recognition system may be designed to receive images from the wave receiver(s), if they are optical receivers, and analyze images of the object in order to ascertain the identity thereof. This analysis may involve image subtraction or analysis of multiple images obtained during variant imaging conditions, e.g., when the object is illuminated by waves transmitted from the vehicle and in the absence of such illuminating waves.

A method for protecting an occupant of a vehicle during an impact between the vehicle and an object in accordance with the invention includes determining that an impact involving the vehicle is about to occur if corrective action is not taken prior to the impact, and determining whether the impact requires activation of a reactive system for controlling motion or travel direction of the vehicle. This latter step entails receiving waves or energy from the object, and ascertaining the identity of the object based on the received waves or energy by inputting the received waves or energy or data representative of the received waves or energy into a pattern recognition algorithm which ascertains the identity of the object based thereon, the pattern recognition algorithm being designed to provide an output of one of a number of pre-determined identities of the object, for example, a pedestrian, a cyclist, a truck, an animal and a school bus. Finally, the reactive system is activated when the impact is determined to require such activation. Activation of the reactive system may be activation of the brakes of the vehicle, control of the throttle and/or control of the steering. The manner in which each can be controlled may be any known technique for exercising such control known to those skilled in the art.

Determining that the impact is about to occur if corrective action is not taken may involve transmitting waves away from the vehicle, receiving the transmitted waves after the waves have been reflected from the object and analyzing the received waves. The transmitted waves may be infrared waves, preferably in an eye-safe range. The intensity of the infrared waves may be determined based at least in part on a distance to the reflecting object.

BRIEF DESCRIPTION OF THE DRAWINGS

The following drawings are illustrative of embodiments of the invention and are not meant to limit the scope of the invention as encompassed by the claims.

FIG. 1 is a perspective view of an automobile showing a preferred mounting location for the optical blind spot detection system in accordance with the invention.

FIG. 2 is a perspective view of the vehicle of FIG. 1 shown operating on a highway.

FIG. 3A is a detailed view of an automobile mirror assembly showing the location of a LED array or a scanning laser and the CMOS camera.

FIG. 3B is a detailed view of a truck mirror assembly showing the location of a LED array or a scanning laser and the CMOS camera.

FIG. 4 is an overhead view of an alternate blind spot monitoring system where the light source and camera are not collocated and some additional collocated corner mounted examples.

FIG. 5 is a view similar to FIG. 2 however showing the pattern of laser diode illumination projected from a vehicle mirror preferred installation.

FIG. 6A is a top view of a large truck vehicle showing the coverage of a side blind spot area.

FIG. 6B is a side view of the large truck vehicle of FIG. 6A showing the coverage of a side blind spot area.

FIG. 6C is a side view of the large truck vehicle of FIG. 6A showing the coverage of a side blind spot area using multiple cameras along the side of the vehicle.

FIG. 7A is a top view illustrating the coverage of the forward right hand side of a truck vehicle blind spot.

FIG. 7B is a side view illustrating the coverage of the forward right hand side of a truck vehicle blind spot.

FIG. 8A is a side view illustrating the application to a bus for monitoring the space in front of the bus.

FIG. 8B is a front view illustrating the application to a bus for monitoring the space in front of the bus.

FIG. 9 is a top view of a system applied to monitor the rear of the truck trailer to protect for backup accidents.

FIG. 10 is a block diagram illustrating the blind spot detector, steering control, display and warning system.

FIG. 15 is a perspective view of a vehicle about to impact the side of another vehicle showing the location of the various parts of the anticipatory sensor system of this invention.

FIG. 15A is an enlarged view of a portion of FIG. 15.

FIG. 16 is a flowchart for the lane change problem.

FIG. 17 is an overhead view of a vehicle about to be impacted in the front by an approaching vehicle showing a wave transmitter part of the anticipatory sensor system;

FIG. 18A is a plan front view of the front of a car showing the headlights, radiator grill, bumper, fenders, windshield, roof and hood;

FIGS. 33A, 33B, 33C and 33D show the manner in which an occupant can be positioned improperly for deployment of a side curtain airbag during a rollover leading to severe injury;

FIGS. 34A, 34B, 34C and 34D show the manner in which an occupant is re-positioned for deployment of a side curtain airbag during a rollover thereby preventing severe injury;

FIG. 35 is a flow chart showing the manner in positioning airbags are used in accordance with the invention; and FIG. 36 is a schematic of the apparatus for deploying multiple airbags in accordance with the invention.

FIG. 37 is a block diagram of a known agricultural product distribution machine.

FIG. 38 is a block diagram of a control unit, in accordance with an embodiment of the primer system.

FIG. 39 represents a basic air delivery system.

FIG. 40 represents a metering mechanism of the air delivery system in FIG. 39.

FIG. 41 is a block diagram of a primer system in accordance with an embodiment of the present invention, as it applies to seeders and planters.

FIG. 42 represents a basic sprayer system.

FIG. 43 shows a rearward pointing installation arrangement for a vehicle speed detection system on a bulldozer according to an embodiment of the invention.

FIGS. 44A and 44B show the effects of slope and pitch on the ground speed sensor of this invention.

FIG. 45 shows a forward pointing installation arrangement for a vehicle speed detection system on a tractor according to an embodiment of the invention.

DETAILED DESCRIPTION OF THE INVENTION

1. Exterior Monitoring 1.1 General

Figure 11:
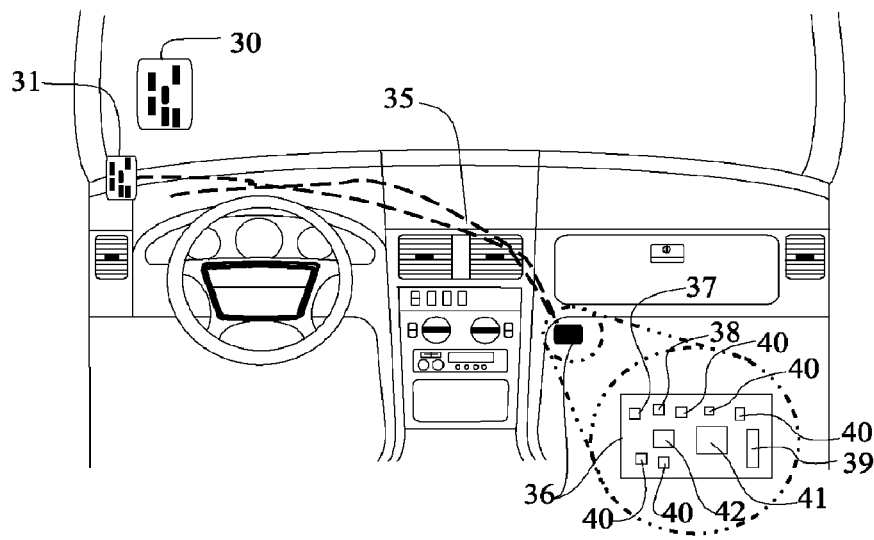
FIG. 11 shows an icon display for the instrument panel and an alternate heads up display indicating the position of the host vehicle and the positions of surrounding potentially threatening vehicles as seen from above.

Referring now to the drawings wherein the same reference numerals refer to like elements, a perspective semi-transparent view of an automobile is shown generally as 1 in FIG. 1. A driver 2 of the automobile sits on a front seat 4. Five transmitter and/or receiver assemblies 5, 6, 7, 8 and 9 are positioned at various places with views of the environment surrounding the vehicle. Any of these assemblies can have multiple transmitters and/or receivers. A processor such as control circuitry 12 is connected to the transmitter/receiver assemblies 5-9 by appropriate wires, not shown, or wirelessly and controls the transmission of waves or energy from the transmitter portion of the assemblies 5-9 and captures the return signals received by the receiver portion of the assemblies 5-9. Control circuitry 12 usually contains one or more analog to digital converters (ADCs) or frame grabbers, a microprocessor containing sufficient memory and appropriate software including pattern recognition algorithms, and other appropriate drivers, signal conditioners, signal generators, etc. Usually, in any given implementation, only two to four of the transmitter/receiver assemblies would be used. Some or all of the processor functions can take place in the assemblies 5-9.

These optical, for example, transmitter/receiver assemblies 5-9, also referred to herein as transducer assemblies or transceivers, are comprised of an optical transmitter or light emitting component, which may be an infrared LED, a high power laser diode forming a spotlight, a laser with a diverging lens, a floodlight or a scanning laser assembly, any of which can be pulsed or modulated, and a receiver such as a CCD or CMOS array or pin diode or equivalent photo detector. If modulation is used, it can be frequency, amplitude or pulse-modulated and the modulation scheme can be sine wave or code and if code, the code can be random or pseudorandom. Preferably, a transmitter/receiver assembly comprises an active pixel CMOS array or an HDRC array as discussed below. The transducer assemblies map the location of the objects and features thereof, in a two and/or three-dimensional image as will also be described below. In a preferred design, range gating is used to locate objects in the field of view and aid in separating an object of interest from other objects and the background. Range gating is also used to aid in low visibility situations such as in fog, smoke, rain and snow.

In one preferred embodiment, assemblies 5-9 are high-powered laser flash sources that emit very short IR pulses, which can be in the eye-safe part of the spectrum, to illuminate the area surrounding the vehicle and range gating techniques can be used to determine the distances to reflecting objects. The laser on/off duty cycle is kept small and the timing of the flash can be determined by the vehicle location (such as its GPS coordinates) such that the emissions from one vehicle are not confused by or with emissions from other nearby vehicles. Such systems can also be used with auto focus lenses or other optical devices to control the beam pattern.

The foregoing examples of possible wave/energy/light emitting components and light/wave/energy receiver components are not intended to limit the invention and it should be understood by those skilled in the art that other transmitter and receiver components and combinations can be used in accordance with the invention without deviating from the scope and spirit thereof.

In a preferred embodiment, four transducer assemblies 5-8 are positioned around the exterior of the vehicle in the spaces to be monitored, each comprising one or more LEDs or laser diodes and a CMOS array with a light valve and an appropriate lens. Although illustrated together, the illuminating source will frequently not be co-located with the receiving array particularly when triangulation distance measurement is used, as described below. The LED, laser or other appropriate source of illumination can emit a controlled angle diverging beam of infrared radiation that illuminates a particular space and illuminates an object at a particular point that depends on the location of the object relative to the vehicle and the direction of the LED or laser beam, for example. In some applications, the beam does not diverge and in others, the beam converges.

The image from each array is used to capture two or three dimensions of object position information, thus, the array of assembly 5, which can be located approximately behind the driver's door on the B-pillar provides both vertical and transverse information on the location of an object in the vicinity of the vehicle. A similar view from a location on the passenger side is obtained from the array of assembly 6. The mounting locations of the assemblies 5, 6 shown in FIG. 1 are exemplary and are not intended to limit the possible positions for placement of the assemblies. Other positions for installation of the assemblies on the sides of the vehicle are contemplated. For example, the assemblies 5, 6 could be placed on the side of the vehicle alongside the passenger compartment, engine compartment or trunk compartment.

If the receiving array of assembly 5 contains a matrix of 100 by 100 pixels, then 10,000 pixels or data elements of information will be created each time the system interrogates the space on the driver side of the vehicle, for example. Interrogation of the space on the driver side of the vehicle would entail commanding the assembly 5 to transmit optical waves or energy into the environment surrounding the vehicle by means of the transmitter component of the assembly 5 and receiving any reflected optical waves or energy by the receiver component of the assembly 5.

There are many pixels of each image that can be eliminated because they do not contain any useful information. This typically includes the corner pixels and other areas where an object cannot be located. This pixel pruning can typically reduce the number of pixels by up to 20 percent resulting in approximately 8,000 remaining pixels, for example. The output from each array is then preferably preprocessed to extract the salient features and fed to an artificial neural network, or other pattern recognition system, to identify the object or ascertain the identity of the object. The preprocessing can include edge detection and a variety of filters such as described in U.S. patent application Ser. No. 11/025,501 filed Jan. 3, 2005. Range gating also can be used to eliminate reflections from unwanted objects and to reduce the effects of fog, smoke, rain and snow, for example, as described below.

The preprocessing step frequently makes use of distance or relative motion information to separate one object from another and from other parts of the captured scene. Once this operation is completed for all of the object images, the identification of the objects in the space proximate to the driver side of the vehicle has been determined.

The feature extraction frequently involves identifying the edges of objects in the field of view and the angular orientation of the found edges. The locations of the edges and their orientation can then be input into appropriate recognition software. Other feature extraction techniques are also applicable.

A pattern recognition technique such as a trained neural network can be used to determine which of the trained occupancies most closely corresponds to the measured data. The output of the neural network can be an index of the setup that was used during training that most closely matches the current measured state. This index can be used to locate stored information from the matched trained occupancy. Information that has been stored for the trained occupancy typically includes the locus of the centers of different objects and an appropriate icon. For the case of FIG. 1, it is also known from one of the techniques to be described below where the object is located relative the vehicle.

There are many mathematical techniques that can be applied to simplify the above process. One technique used in military pattern recognition, for example, uses the Fourier transform of particular areas in an image to match by correlation with known Fourier transforms of known images. In this manner, the identification and location can be determined simultaneously. There is even a technique used for target identification whereby the Fourier transforms are compared optically. Other techniques utilize thresholding to limit the pixels that will be analyzed by any of these processes. Still other techniques search for particular features and extract those features and concentrate merely on the location of certain of these features.

A particularly useful technique, as mentioned above, calculates the location of the edges of the object in the blind spot and uses these extracted edges as the features that are fed to the neural network. (See, for example, the Kage et al. artificial retina paper referenced above which, together with the references cited therein, is incorporated herein by reference.)

1.2 Blind Spots 1.2.1 General

In the discussion below, blind spots are used as an example of monitoring the space around the vehicle. Although the phrase "blind spot" is used, it is the intention of the inventor that this is merely an example of monitoring the exterior of the vehicle and thus "blind spot" will be used as a surrogate for monitoring of any area surrounding the vehicle from the vehicle.

One principle used in this embodiment of the invention is to use images of different views of an object in the blind spot to correlate with known images that were used to train a pattern recognition system such as a neural network for blind spot occupancy. Then, carefully measured positions of the known images are used to locate particular parts of the object such as the windshield, tires, radiator grill, headlights, etc.

One important point concerns the location and number of optical assemblies. For an automobile, one assembly is generally placed on each side of the vehicle such as shown by assemblies 5, 6. In some embodiments, a third assembly 7 can be placed to view the blind spot behind the vehicle and a fourth assembly 7 can be placed to view in front of the vehicle for automatic cruise control, for example. Use of an optical imaging assembly as a cruise control device permits one device to perform the functions of providing information for both maintaining an appropriate distance behind another vehicle, as in an automatic cruise control system, and collision avoidance and anticipatory sensing functions.

The methods by which the principles herein described can be carried out are numerous. In one preferred embodiment, four assemblies are placed on the four sides of the vehicle with each assembly having a field of view of 180 degrees. A cylindrical lens or equivalent is used to capture the 180 degree field of view. Sections of the view can be selectively analyzed and similarly sections can be selectively illuminated as the situation requires. For illumination, either the illuminating IR laser diode can be selectively directed to illuminate smaller angular sections of the view, a more powerful laser diode can be used to illuminate the entire 180 degrees, multiple laser diodes can be used or other alternatives. The same can be applied to CMOS imagers. Either the imager can be caused to change its field of view, or a specially designed imager that images the full 180 degrees or multiple imagers can be used. As mentioned above, the distance to objects within the field of view can be determined through a variety of methods including range gating. The illumination timing of the laser diode(s) can be a function of the vehicle location, such as the DGPS coordinates, so as not to interfere with systems on other vehicles. The IR illumination source can be a high powered (1-100 transmitted watts) device operating in the eye-safe part of the IR spectrum (>1.4 microns).

1.2.2 Range Gating

An alternate approach is to make a three-dimensional map of the object in the blind spot based on the optical energy or waves received by the receiver components of the assemblies 5-9 and to precisely locate these features using neural networks, fuzzy logic or other pattern recognition techniques. One method of obtaining a three-dimensional map is to utilize a laser radar (lidar) system where the laser is operated in a pulse mode and the distance from the object being illuminated is determined using range-gating in a manner similar to that described in various patents on micropower impulse radar to McEwan. (See, for example, U.S. Pat. No. 5,457,394 and U.S. Pat. No. 5,521,600). Range gating is also disclosed in U.S. Pat. No. 7,202,776. Alternatively, the laser can be modulated and the phase of the reflected and the transmitted light can be compared to determine the distance to the object or random or pseudorandom modulation can be used with correlation techniques.

1.2.3 Scanning

The scanning portion of the laser radar device can be accomplished using rotating mirrors or prisms, galvanometer mirrors, MEMS mirrors or preferably, a solid state system, for example an acousto-optical device utilizing $TeO_2$ as an optical diffraction crystal with lithium niobate crystals driven by ultrasound (although other solid state systems not necessarily using $TeO_2$ and lithium niobate crystals could also be used). An alternate method is to use a micromachined mirror, which is supported at its center or edge and caused to deflect by miniature coils or electrostatically. Such a device has been used to provide two-dimensional scanning to a laser. This has the advantage over the $TeO_2$—lithium niobate technology in that it is inherently smaller and lower cost and provides two-dimensional scanning capability in one small device. The maximum angular deflection that can be achieved with this process is on the order of about 10 degrees. A diverging lens or mirror, or similar technique, can be used to achieve a greater angular scan if necessary. An alternate preferred approach is to use passive optical images with superimposed infrared dots created by an array of infrared laser diodes in a manner similar to that described in U.S. Pat. No. 6,038,496. Other forms of structured light can of course be used. An alternate approach uses a digital light processor (DLP) from Texas Instruments which can contain on the order of 1 million mirrors.

In the DLP implementation, the hardware for the scanner includes a DLP addressable mirror array wherein each mirror can rotate plus or minus 12 degrees and wherein the array includes up to one million or more mirrors. Each mirror can be moved at a rate of 40 KHz. Additional hardware includes cylindrical lenses, one or more CMOS cameras, a ten to one hundred watt laser diode having a wavelength of approximately 1.5 microns, means for pulsing the laser and one or more light valves or spatial light monitors located in front of the cameras.

Information on the DLP can be found at dlp.com.

The DLP is capable of reflecting the light from the laser diode, or other illumination source, in one million directions assuming that the DLP has one million mirrors. These beams can pass through a properly designed cylindrical lens which can have the effect of multiplying motions of the beams in the horizontal direction but not in the vertical direction, for example. The beam that passes through the cylindrical lens can have its angle increased, for example, by a factor of 4 or 5. In so doing, the shape of the beam will become elliptical with a ratio of horizontal to vertical dimensions of 4 or 5 to 1. In the above example, 1 to 5 cameras can be selected depending on the portion of the scene and resolution desired. These cameras can also each have a cylindrical lens which can have the effect of increasing the horizontal field of view relative to the vertical. This compression can be reversed during signal processing to create an undistorted partially panoramic image.

Under normal operation when there are no objects of interest in the viewing area, the one million pixels would be spread out as a pattern of beams projecting down the highway and to either side. The cameras monitoring the deflected beams would operate in a low resolution mode. Whenever an object was discovered in the view that could potentially be threatening, the DLP will shift some of its beams to provide a more complete illumination of the object and the cameras will shift into a higher resolution mode. If multiple cameras are used, then only the camera that images the object would have to be in the high resolution mode. Based on when the object came into the scene and which beams first illuminated the object, an approximate range to the object can usually be determined. Range gating can then be used to segment the object for identification and also to determine more precisely where the object is in its velocity. The object can be further monitored until it is no longer threatening. Depending on the computational capacity of the system, and assuming that ten thousand pixels are sufficient to illuminate one object, the million pixel DLP could track up to one hundred objects in its field of view simultaneously.

Power problems are eliminated by using eye safe lasers. Eye safe lasers have been used by the military at up to one million watts. (See Verle Aebi and Peter Vallianos "Laser-illuminated viewing provides long-range detail", Laser Focus World, September 2000).

The range gating system should be coordinated with the laser pulsing system. The laser pulsing system can be based on the geographical location of the vehicle in such a manner that vehicles in the vicinity of each other would not confuse each other's system. If ten or even one hundred slots are managed in this matter there should be little or no interference between vehicles' systems.

The same system can be used to monitor the highway for fiduciary objects that have been previously identified during the mapping process. The precise distance to these fiduciary objects can be measured and in fact tracked as the vehicle passes such an object. This becomes a far simpler method of getting precise positioning independent of GPS than the earlier signature matching concepts.

Actually, the system or a similar system can be used inside the vehicle allowing the occupant monitor to concentrate only on the occupant and not on the surrounding vehicle interior and especially windows. When used inside the vehicle, it can also be used for anti-trap functions such as for windows and doors. For inside the vehicle, a cylindrical lens would be replaced by another convenient lens.

1.2.4 Structured Light

An alternate method of obtaining three-dimensional information from a scanning laser system is to use multiple arrays of IR dots, or other form of structured light, to replace the single arrays used in FIG. 1. In the case, the arrays are displaced from each other and, through triangulation, the location of the reflection from the illumination by a laser beam of a point on the object can be determined by triangulation and/or correlation in a manner that is understood by those skilled in the art. Of course, the arrays can be timed differently if desired to further enable the correlation of the reflection with the array source.

1.3 Optical Methods 1.3.1 Single 360 Degree Optical System

An alternate configuration is shown at assembly 9 which is a lens arrangement which provides a view of 360 degrees by approximately 20 degrees. Although this camera does not provide as complete a view of objects in the various blind spots, it is possible using a single device to observe areas on both sides as well as the front and back of the vehicle. The same lens is used for receiving the images and for projecting a rotating scanning laser beam, for example, that approximately bisects the 20-degree angle. This rotating laser beam is modulated thereby permitting the distance to the reflected laser light to be determined. A rotating mirror or prism, that also serves to deflect the laser beam, captures the returned laser light. This mirror or prism is positioned so that it is above the portion of the lens used for receiving the images such that laser system does not interfere with the imaging system. Again, in a preferred implementation, the laser is a high powered spotlight in the eye-safe IR portion of the electromagnetic spectrum.

Special lenses can be used to collect the light from the spherical segmented lens and project the combined image onto a CMOS imager. In some cases, software is provided to remove known distortions for image analysis or, in other cases, this is not necessary as the pattern recognition system has been trained on the combined received image, or a segmented version thereof which divides the image into, for example, four segments representing front, right, rear, and left quadrants.

1.3.2 Laser Flash Systems—General

One preferred method of monitoring the space surrounding a vehicle is to use a laser flash system as discussed in U.S. Pat. No. 7,202,776. In this embodiment, a laser beam is projected into the space of interest. It can be a broad spotlight beam that illuminates a substantial area or it can be a narrow scanning beam. The beam can be made to diverge, converge or remain of approximately constant diameter. It is generally in the near infrared portion of the electromagnetic spectrum. The beam can be modulated in any manner such as by a sine or other periodic wave or by pulse modulation. The modulation can be varied as to amplitude or phase or by random, pseudorandom or code modulation or any combination thereof. Of particular interest is that the laser beam, whether modulated or not, can be sent in bursts permitting the distance to an object to be determined or the reflections from in front of or beyond an object or particular range to be range gated thereby permitting an image to be obtained, for example, of an object at a particular distance from the vehicle. This range gating can be accomplished through a variety of spatial light monitors including Pockel or Kerr cells, garnet crystals, liquid crystals or the equivalent as discussed in the '776 patent.

Use can be made also of the fact that infrared is more easily absorbed by atmospheric moisture such as fog and snow than reflected so that the penetration of the IR laser can be increased when such atmospheric moisture is present by increasing the emitted power and by reducing the divergence of the beam. In some cases, the beam can be made to converge through appropriate lenses to compensate for the absorption and scattering of the laser light. In one embodiment, a narrow beam IR laser is used to monitor the atmospheric absorption and thus to control the light emitted by the main illuminating laser system. In this case, the monitoring laser sends out a beam of IR and samples the return at each distance from the source using range gating. A map can then be determined of the absorption plus scattering as a function of distance from the source and thus the maximum IR radiation that can be emitted and the beam angle from the main illuminating laser system determined so that at no distance from the source does the intensity exceed eye safety limits. Note that research is underway to permit control of the frequency emitted by the laser system thus permitting a matching of the frequency as well as the intensity and beam angle to the atmospheric conditions. Once again, preferred IR wavelengths used are in the eye-safe portion of the spectrum. By carefully selecting the exact frequency emitted to coincide with solar minimums, the chance of the reflected light being overpowered by emissions from the sun is minimized.

When the atmospheric adjustment system described above is coupled with range gating, distances to, and images of, objects of interest can be obtained for ranges exceeding 500 meters in low visibility conditions. Thus, the system of this invention can replace radar for collision avoidance, automatic cruise control, blind spot monitoring and all other around vehicle monitoring applications. The laser atmospheric monitoring system can also be used to determine visibility conditions which can then be used to set the maximum speed the vehicle is permitted to travel. This visibility information as a function of distance can also be communicated to other vehicles either by direct communication or indirectly through infrastructure-based transceivers or through the Internet, providing the vehicle has an Internet connection, where it can then be transmitted to vehicles in the vicinity as a map update, for example.

As disclosed elsewhere herein and in the patents and patent applications of the current assignee, the modulation scheme can also be used to determine the distance to an object either alone on in conjunction with range gating. Code, random or pseudorandom modulation is particularly useful for this function however even simple sine wave modulation can permit the more accurate location of an object within a range gated signal.

When the distance to an object is the main function of the laser system, additional range can be obtained if the receiving beam is focused onto a simple pin or avalanche diode receiver. This system is enhanced even more if the IR is polarized to permit the partial elimination of noise from the atmosphere. Range gating can be used along with various modulation schemes as desired by the designer. Naturally both systems can be used where an imager is used for identification and a parallel pin diode for ranging.

1.3.3 Laser Flash Systems—Timing

A potential problem can arise when several vehicles have the same or a similar system and the systems then can be multiplexed in a variety of ways to prevent interference. These include time, code and frequency methods that can be managed based to the sensing of output from the other vehicles and/or by a method based on the GPS clock and/or the accurate coordinates of the vehicle perhaps coupled with its velocity vector. Any of these can additionally employ polarization methods. Some of these combinations will now be discussed but this invention contemplates all combinations of the above mentioned interference avoidance methods and others which are used to control the emission of IR light beams from laser illumination systems that are used to monitor the space around the vehicle.

If broad beam illumination is used and simple imaging techniques are employed, then the illumination from other vehicles may not interfere with the system especially in high dynamic range cameras are used that minimize the effects of one vehicle's system blinding another. Such cameras can adjust the sensitivity to received illumination on a pixel-by-pixel basis (see, e.g., products produced by IMS chips of Stuttgart Germany and other active pixel cameras available from other manufacturers). When it is deemed desirable to eliminate the interference from another vehicle, one simple method is similar to the Ethernet protocol where when one vehicle senses the transmission from another vehicle it backs off for a random delay and then retries. Since the duty cycle for such a system can be very small, less that 1% for example, such a system can permit hundreds of vehicles to operate simultaneously with each vehicle obtaining its desired information. This method is an inefficient use of resources, however, and other more sophisticated methods may be required. If each vehicle modulates its transmissions with a pseudorandom or other code, then the reflections from a particular vehicle's transmissions can be filtered out using correlation techniques. This can require a significant computational load if all of the pixels of an image need to be individually analyzed. Naturally, each vehicle can operate at a slightly different frequency and if variable frequency laser systems are available, then this becomes a viable alternative, provided there is an algorithm that instructs each vehicle as to the frequency that it should use. A similar comment applies to different polarization angles for vehicles using the same frequency. Such an algorithm can be based on the location and/or velocity vector of the vehicle as discussed below.

It is anticipated that the systems described here may be a part of a more extensive system that is designed to substantially reduce vehicle accidents and congestion such as described in the '325 application referenced above. For this case, each equipped vehicle will know its exact location and velocity vector. It will also know the time very accurately based on the atomic clocks resident in the GPS satellites. Each vehicle can then operate its laser monitoring system in a particular direction during an allotted time period where that time period is determined based on the vehicle's location and velocity vector in such a manner that no two vehicles within a range of each other, for example, will use the same time slice in a direction of transmission that it would interfere with any other vehicle within that range. This range can be fixed, a function of the vehicle location or a function of traffic density or other consideration such as geographical considerations which can be found on vehicle resident maps.

An important application of the laser illumination system disclosed herein is to provide an image of objects that may pose a threat to the system-resident vehicle. In this case, the image can be analyzed using a pattern recognition algorithm and the results either displayed as an icon in the field of view of the driver or pilot using a heads-up display or the results of the analysis can be used to cause an audio, haptic or visual warning to be issued to the vehicle operator. In some cases, the results of the analysis can be used to control the vehicle through its braking or steering system or by some other appropriate means. In general, this system is not intended as a general road illumination system. In some cases, the vehicle will have a resident accurate map of the roadway which will permit the vehicle laser illumination system to know where the road ahead is and thus where to point the illumination system so that it covers the lane on which the vehicle is driving and, through range gating, even those parts of the lane that are on curves and hills. For more general illumination use of a similar system, see U.S. patent application Pub. Nos. 20020191388, 20030193980, 20030193981 and 20030198271.

Although the systems discussed above use active IR illumination, passive IR can also be used to complement the active system. A passive IR system can frequently spot animals or vehicles in locations where they may be missed by the active system which can then be used to direct the attention to the active system. The active system may be concentrating on the road ahead and thus miss a deer or pedestrian that is about to enter the path of the vehicle but has not yet done so.

The discussion above on active IR has mainly been concerned with the near IR range which has wavelengths below 1400 nanometers and where eye safety is still a problem. Developments in the SWIR range (particularly in the range of 1400 nm to 1700 nm) using indium gallium arsenide (InGaAs) for an imager permit much higher power transmissions as they are below the eye safety zone (see, e.g., Martin H. Ettenberg "A Little Night Vision", Solutions for the Electronic Imaging Professional, March, 2005, a Cygnus Publication available at sensorsinc.com.

1.3.4 Pattern Recognition

As mentioned elsewhere herein, a key component of many of the inventions disclosed herein is the use of pattern recognition technologies to identify objects and makings on the roadway and/or in its vicinity. The pattern recognition of choice is based on neural networks in all of its various forms including associative memory systems, modular neural networks, cellular neural networks, support vector machines and combination neural networks. Of course, pattern recognition also contains within its definition other more crude methods such as pattern matching and the use of templates. Objects that can be recognized using this technology include animals such as deer, lane marking lines, other vehicles, pedestrians, stop signs and stop lights including the color of the light (red, yellow, green), speed limit and other roadside signs, ice and snow on the roadway, character of the shoulder and area beyond the shoulder, trees, motorcycles, bicycles, light posts, and all other objects that are commonly found on or along side of a road.

All types of collision avoidance systems including lane departure or road departure warning systems can use the pattern recognition technologies disclosed herein.

1.3.5 Combination of Vision, Accurate Maps and IMU for External Monitoring

Monitoring the space surrounding a vehicle can be used to get a measure of the motion of the vehicle and of the time to contact a vehicle as described in U.S. Pat. No. 6,704,621, WO0139018 and US patent application Pub. No. 20030040864. However, such methods are at best relatively inaccurate and computationally expensive. Inertial Measurement Units (IMUs) based on MEMS technology are being rapidly developed and improving in accuracy. When corrected using DGPS or another infrastructure-based location system, these devices can be used on all vehicles where they will accurately monitor the motion of the vehicle and serve as chassis control, crash and rollover sensing, and navigation systems. An IMU, however, can aid the exterior monitoring system by eliminating vibrations in the camera mounting and, in conjunction with accurate maps, aid in knowing where the monitoring system should be monitoring. The system will know when to look for stop lights, when there is an intersection approaching and where there is an increased possibility for deer to be present, for example. Knowing where to monitor will substantially reduce the computational load on the vision system resulting in system cost reduction.

A good discussion of the combined use of inertial sensors and cameras can be found in Michael Brownell, "Fusing Inertial Sensors with Stereoscopic Cameras Advances 3-D Vision Systems" SPIE OEMagazine, March 2004. This article talks about using the inertial devices to provide an accurate ground plane from which the vision system can get its reference. This can be useful in vehicle applications providing the inertial system, which would most likely be in the form of an IMU, has a method of error correction such as provided by DGPS, or another position determination system, such as described in the '325 application referenced above. It might be possible to reverse the process and use the vision system to correct the IMU but this may not have the required accuracy.

1.3.6 Stereo Vision

Stereo vision has been suggested as a method for determining the location of an object relative to the host vehicle (see, e.g., U.S. patent application Pub. No. 20040252863). This approach doubles the number of cameras and perhaps illumination systems as well as increases the computational complexity and thus the cost of the system. There are also problems with objects approaching directly in the direction of a camera pair and getting the required velocity vector accuracy for collision avoidance. For these and other reasons, a laser radar approach disclosed herein is preferred. The need to determine the position of objects relative to a vehicle will of course decrease as more and more vehicles are equipped with vehicle-to-vehicle communication and can broadcast their positions and velocities to other vehicles. When all vehicles have such capability, the only remaining obstacles are animals, pedestrians, objects fallen from trucks, rocks from rock slides, fallen trees etc. These objects are unlikely to have an appreciable velocity and thus their position is all that is usually required. The position of such objects can be more easily determined from the techniques herein described.

The techniques of U.S. Pat. No. 6,704,621, WO0139018 and US patent application Pub. No. 20030040864 are also a preferable approach to the complexity introduced by stereo cameras. Also, a structured light approach as described for interior vehicle monitoring in U.S. Pat. No. 7,164,117 is a simpler and less expensive method of obtaining a 3D depth map of the field of view than resorting to stereo cameras. Finally, a similar approach is based on the knowledge of various geometric features of the road or nearby structures which are known from a vehicle resident map database and using that knowledge to determine the location and/or size of an object. For example, if it is known that the width of the road lane on which the vehicle is traveling is 10 feet and an object down the road has a height that is equal to 50% of the road width at that point, then the height of the object can be estimated to be 5 feet. Also, if the camera parameters are known the location of the object relative to the vehicle can be determined by conventional triangulation methods known to those skilled in the art.

1.3.7 Miscellaneous

When monitoring the exterior space around a vehicle, optical methods have been discussed. Optical infrared frequencies are absorbed more than lower frequencies such as terahertz and millimeter wave radar. Radar, on the other hand, has much lower resolution than optics but can more easily determine the distance to objects especially in the presence of fog, rain and snow. One possibility is to fuse the two technologies so that they cover the same area of exterior space and provide a composite image that combines the advantages of both systems. The optical system would provide the imaging capabilities when there is appropriate visibility and the radar when there is not. Even in good visibility situations, the radar can provide the distance to objects in the field of view and the optics can aid in the interpretation of the radar image. The direction of the optical beam can be controlled through the rotation of a mirror, for example, and the direction of the radar beam through solid state steerable antenna technology as in a phased array antenna system.

Various types of coatings can be applied to the lenses of the optical systems disclosed herein. Examples of some suitable coatings including photocatalytic and hydrophilic coatings as disclosed in U.S. Pat. No. 6,193,378.

1.4 Combined Optical and Acoustic Methods

An ultrasonic system is the least expensive and potentially provides less information than the laser or radar systems due to the delays resulting from the speed of sound and due to the wave length which is considerably longer than the laser systems. The wavelength limits the detail that can be seen by the system. In spite of these limitations, as shown in Breed et al. (U.S. Pat. No. 5,829,782), ultrasonics can provide sufficient timely information to permit the position and velocity of an approaching object to be accurately known and, when used with an appropriate pattern recognition system, it is capable of positively determining the class of the approaching object. One such pattern recognition system uses neural networks and is similar to that described in the papers by Gorman et al. and in the rear facing child seat recognition system referenced and described in the Breed et al. patent referenced above.

The particular locations of the optical assemblies are selected to provide accurate information as to the locations of objects in the blind spots. This is based on an understanding of what information can be best obtained from a visual image. There is a natural tendency on the part of humans to try to gauge distance from the optical sensors directly. This typically involves focusing systems, stereographic systems, multiple arrays and triangulation, time-of-flight measurement, phase comparison, etc. What is not intuitive to humans is to not try to obtain this distance directly from apparatus or techniques associated with the mounting location but instead to get it from another location. Whereas ultrasound is quite good for measuring distances from the transducer (the z-axis), optical systems are better at measuring distances in the vertical and lateral directions (the x and y-axes).

For monitoring the interior of the vehicle, such as described in U.S. Pat. No. 6,324,453 this can more easily done indirectly by another transducer. That is, the z-axis to one transducer is the x-axis to another. For external monitoring, a preferred approach, as described below, is to use an array of LEDs or a scanning laser and locate the position of the object in blind spot by triangulation, time-of-flight, range-gating or phase measurement although sometimes appropriately located cameras in concert can provide three-dimensional information directly (such as by stereo cameras).

Systems based on ultrasonics and neural networks, and optics and optical correlation have been very successful in analyzing the seated state of both the passenger and driver seats in the interior of automobiles. Such systems are now in production for preventing airbag deployment when a rear facing child seat or an out-of-position occupant is present. The ultrasonic systems, however, suffer from certain natural limitations that prevent the system accuracy from getting better than about 99 percent. These limitations relate to the fact that the wavelength of ultrasound is typically between 3 mm and 8 mm. As a result, unexpected results occur which are due partially to the interference of reflections from different surfaces.

Additionally, commercially available ultrasonic transducers are tuned devices that require several cycles before they transmit significant energy and similarly require several cycles before they effectively receive the reflected signals. This requirement has the effect of smearing the resolution of the ultrasound to the point that, for example, using a conventional 40 kHz transducer, the resolution of the system is approximately three inches, although this has been improved. These limitations are also present in the use of ultrasound for exterior vehicle monitoring.

In contrast, the wavelength of the portion of the infrared spectrum that is contemplated for one preferred use in the invention is less than five microns and no significant interferences occur. As a result, resolution of the optical system is determined by the pixel spacing in the CCD or CMOS arrays or the speed of the pin or avalanche diode and scanner when used. For this application, typical arrays have been selected to be approximately 100 pixels by 100 pixels and therefore, the space being imaged can be broken up into pieces that are significantly less than a few inches in size. If greater resolution is required, arrays having larger numbers of pixels are readily available.

Another advantage of optical systems is that special lenses can be used to magnify those areas where the information is most critical and operate at reduced resolution where this is not the case. For example, the area closest to the center of the blind spot can be magnified and those areas that fall out of the blind spot, but are still being monitored, can be reduced. This is not possible with ultrasonic or radar systems where it is even very difficult to get an image of sufficient resolution to permit an identification of the object to be accomplished.

Additional problems of ultrasonic systems arise from the slow speed of sound and diffraction caused by variations in air density. The slow sound speed limits the rate at which data can be collected and thus eliminates the possibility of tracking the motion of an object moving at high speed relative to the vehicle.

1.5 Discussion of the External Monitoring Problem and Solutions

In the embodiment shown in FIG. 1, transmitter/receiver assemblies 5-9 may be designed to emit infrared waves that reflect off of objects in the blind spot, for example, and return thereto. Periodically, the assemblies 5-9, as commanded by control circuit 12, transmits a pulse of infrared waves and the reflected signal is detected by a different assembly. Alternately, a continuous scanning arrangement can be used. The transmitters can either transmit simultaneously or sequentially. An associated electronic circuit and algorithm in control circuit 12 processes the returned signals as discussed above and determines the identity and location of the object in the blind spot. This information is then sent to a warning system that alerts the driver to the presence of the object as described below. Although a driver side system has been illustrated, a similar system can also be present on the passenger side and can be applied to the front and rear of the vehicle.

The accuracy of the optical sensor is dependent upon the accuracy of the camera. The dynamic range of light external to a vehicle exceeds 120 decibels. When a car is driving at night, for example, very little light may be available whereas when driving in a bright sunlight, the light intensity can overwhelm most cameras. Additionally, the camera must be able to adjust rapidly to changes and light caused by, for example, the emergence of the vehicle from a tunnel, or passing by other obstructions such as trees, buildings, other vehicles, etc. which temporarily block the sun and cause a strobing effect at frequencies approaching 1 kHz.

Improvements have been made to CMOS cameras that have significantly increased their dynamic range. New logarithmic high dynamic range technology such as developed by IMS Chips of Stuttgart, Germany, is now available in HDRC (High Dynamic Range CMOS) cameras. This technology provides a 120 dB dynamic intensity response at each pixel in a monochromatic mode. The technology thus has a 1 million to one dynamic range at each pixel. This prevents blooming, saturation and flaring normally associated with CMOS and CCD camera technology. This solves a problem that will be encountered in an automobile when going from a dark tunnel into bright sunlight.

There is also significant infrared radiation from bright sunlight and from incandescent lights. Such situations may even exceed the dynamic range of the HDRC camera and additional filtering including polarizing filters may be required. Changing the bias on the receiver array, the use of a mechanical iris, light valve, or electrochromic glass or liquid crystal or a similar filter can provide this filtering on a global basis but not at a pixel level. Filtering can also be used with CCD arrays, but the amount of filtering required is substantially greater than that required for the HDRC camera.

Liquid crystals operate rapidly and give as much as a dynamic range of 10,000 to 1 but may create a pixel interference effect. Electrochromic glass operates more slowly but more uniformly thereby eliminating the pixel effect. This pixel effect arises whenever there is one pixel device in front of another. This results in various aliasing, Moiré patterns and other ambiguities. One way of avoiding this is to blur the image. Another solution is to use a large number of pixels and combine groups of pixels to form one pixel of information so that the edges and blurred and eliminate some of the problems with aliasing and Moiré patterns. Finally, range gates can be achieved as high speed shutters by a number of devices such as liquid crystals, garnet films, Kerr and Pockel cells or as preferred herein as described in patents and patent applications of 3DV Systems Ltd., Yokneam, Israel including U.S. Pat. No. 6,327,073, U.S. Pat. No. 6,483,094, US2002/0185590, WO98/39790, WO97/01111, WO97/01112 and WO97/01113.

One straightforward approach is the use a mechanical iris. Standard cameras already have response times of several tens of milliseconds range. They will switch, for example, at the frame rate of a typical video camera (1 frame=0.033 seconds). This is sufficiently fast for categorization but probably too slow for dynamic object position tracking when the object in the blind spot is traveling at a high speed relative to the host vehicle.

An important feature of the IMS Chips HDRC camera is that the full dynamic range is available at each pixel. Thus, if there are significant variations in the intensity of light within the vehicle blind spot, and thereby from pixel to pixel, such as would happen when sunlight streams and through a row of trees, for example, the camera can automatically adjust and provide the optimum exposure on a pixel by pixel basis. The use of the camera having this characteristic is beneficial to the invention described herein and contributes significantly to system accuracy. CCDs generally have a rather limited dynamic range due to their inherent linear response and consequently cannot come close to matching the performance of human eyes.

A key advantage of the IMS Chips HDRC camera is its logarithmic response that comes closest to matching that of the human eye. One problem with a logarithmic response is that the variation in intensity from pixel to pixel at an edge may be reduced to the point that the edge is difficult to recognize. A camera with less dynamic range can solve this problem at the expense of saturation of part of the image. One solution is to take several images at a different exposures and combine them in such a manner as to remove the saturation and highlight the edges. This is described in the article "High Dynamic Range Imaging: Spatially Varying Pixel Exposures" referenced above.

Other imaging systems such as CCD arrays can also of course be used with this invention. However, the techniques will be different since the camera is very likely to saturate when bright light is present and to require the full resolution capability when the light is dim. Generally, when practicing this invention, the blind spots will be illuminated with spots or a line of infrared radiation in a scanning mode. If a non-high dynamic range imager is used, the full illumination of the blind spot area may be required. If eye-safe IR is used, then a broader illumination beam is possible that in some cases can reduce or eliminate the need for scanning.

In a preferred embodiment, infrared illumination is used although this invention is not limited to the use of infrared illumination. However, there are other bright sources of infrared that must be accounted for. These include the sun and any light bulbs that may be present outside the vehicle including headlights from other vehicles. This lack of a high dynamic range inherent with the CCD technology essentially requires the use of an iris, liquid crystal, light valve and/or electrochromic glass or similar filter to be placed between the camera and the scene.

Even with these filters however, some saturation can take place with CCD cameras under bright sun or incandescent lamp exposure. This saturation reduces the accuracy of the image and therefore the accuracy of the system. In particular, the training regimen that must be practiced with CCD cameras is more severe since all of the saturation cases must be considered because the camera is unable to appropriately adjust. Thus, although CCD cameras can be used, HDRC logarithmic cameras such as manufactured by IMS Chips are preferred in many implementations. HDRC logarithmic cameras not only provide a significantly more accurate image but also significantly reduce the amount of training effort and associated data collection that must be undertaken during the development of the neural network algorithm or other computational intelligence system. Note that in some applications, it is possible to use other more deterministic image processing or pattern recognition systems than neural networks such as optical correlation techniques.

Another important feature of the HDRC camera from IMS Chips is that the shutter time for at least one model is constant at less than about 100 ns irrespective of brightness of the scene. The pixel data arrives at constant rate synchronous with an internal imager clock. Random access to each pixel facilitates high-speed intelligent access to any sub-frame (block) size or sub-sampling ratio and a trade-off of frame speed and frame size therefore results. For example, a scene with 128 K pixels per frame can be taken at 120 frames per second, or about 8 milliseconds per frame, whereas a sub-frame can be taken at as high as 4000 frames per second with 4 K pixels per frame. This combination allows the maximum resolution for the identification and classification part of the object sensing problem while permitting a concentration on those particular pixels which track the leading edge of the object for dynamic position tracking. In fact, the random access features of these cameras can be used to track multiple parts of the image and thus, in some cases, multiple objects simultaneously while ignoring the majority of the image, and do so at very high speed.

For example, several motorcycles or pedestrians in the blind spot can be tracked simultaneously by defining separate sub-frames for each individual object that is not connected to other objects. This random access pixel capability, therefore, is optimally suited for recognizing and tracking multiple objects in a blind spot. It is also suited for monitoring the environment outside of the vehicle other than for the purpose of blind spot detection such as collision avoidance and anticipatory sensing. Photobit Corporation of 135 North Los Robles Ave., Suite 700, Pasadena, Calif. 91101 manufactures another camera with some characteristics similar to the IMS Chips camera. Other competitive cameras can be expected to appear on the market.

Photobit refers to their Active Pixel Technology as APS. According to Photobit, in the APS, both the photo detector and readout amplifier are part of each pixel. This allows the integrated charge to be converted into a voltage in the pixel that can then be read out over X-Y wires instead of using a charge domain shift register as in CCDs. This column and row addressability (similar to common DRAM) allows for window of interest readout (windowing) which can be utilized for on chip electronic pan/tilt and zoom. Windowing provides added flexibility in applications, such as disclosed herein, needing image compression, motion detection or target tracking.

At least one model of the APS utilizes intra-pixel amplification in conjunction with both temporal and fixed pattern noise suppression circuitry (i.e., correlated double sampling), which produces exceptional imagery in terms of wide dynamic range (~75 dB) and low noise (~15 e-rms noise floor) with low fixed pattern noise (<0.15% sat). Unlike CCDs, the APS is not prone to column streaking due to blooming pixels. This is because CCDs rely on charge domain shift registers that can leak charge to adjacent pixels when the CCD register overflows. Thus, bright lights "bloom" and cause unwanted streaks in the image. The active pixel can drive column buses at much greater rates than passive pixel sensors and CCDs.

On-chip analog-to-digital conversion (ADC) facilitates driving high speed signals off chip. In addition, digital output is less sensitive to pickup and crosstalk, facilitating computer and digital controller interfacing while increasing system robustness. A high speed APS developed for a custom binary output application produced over 8,000 frames per second, at a resolution of 128×128 pixels. It is possible to extend this design to a 1024×1024 array size and achieve greater than 1000 frames per second for machine vision. All of these features are important to many applications of this invention.

U.S. Pat. No. 5,471,515 provides additional information on the APS camera from Photobit. To put this into perspective, a vehicle passing another vehicle at a relative velocity of 60 mph moves approximately 1 inch per millisecond relative to the slower vehicle. This renders the frame rate and computational times critically important and within the capabilities of the HDRC and APS technologies.

These advanced cameras, as represented by the HDRC and the APS cameras, now make it possible to more accurately monitor the environment in the vicinity of the vehicle. Previously, the large dynamic range of environmental light has either blinded the cameras when exposed to bright light or else made them unable to record images when the light level was low. Even the HDRC camera with its 120 dB dynamic range may be marginally sufficient to handle the fluctuations in environmental light that occur. Thus, the addition of an electrochromic, liquid crystal, light valve or other similar filter may be necessary. This is particularly true for cameras such as the Photobit APS camera with its 75 dB dynamic range.

At about 120 frames per second, these cameras are adequate for cases where the relative velocity between vehicles is low. There are many cases, however, where this is not the case and a higher monitoring rate may be required. This occurs for example, in collision avoidance and anticipatory sensor applications as well as in blind spot applications where one vehicle is overtaking another at high speed. The HDRC camera is optimally suited for handling these cases since the number of pixels that are being monitored can be controlled resulting in a frame rate as high as about 4000 frames per second with a smaller number of pixels.

Another key advantage of the HDRC camera is that it is quite sensitive to infrared radiation in the 0.8 to 1 micrometer wavelength range. This range is generally beyond visual range for humans thereby permitting this camera to be used with illumination sources that are not visible to the human eye. This IR sensitivity can be increased through special chip doping procedures during manufacture. A notch frequency filter is frequently used with the camera to eliminate unwanted wavelengths. These cameras are available from the Institute for Microelectronics (IMS Chips), Allamndring 30a, D-70569 Stuttgart, Germany with a variety of resolutions ranging from 512 by 256 to 720 by 576 pixels and can be custom fabricated for the resolution and response time required.

FIG. 2 illustrates the arrangement of FIG. 1 in a traffic situation. Optical assembly 6 on the subject or "host" vehicle contains an illuminating light source and a CMOS array. The illuminating light source of the optical assembly 6, either an array of scanning LEDs, a scanning laser radar device, laser spotlight or other source disclosed herein, distributes infrared radiation or energy in any appropriate form such as in the form of distinct narrow angle beams or a line that covers or fills in the blind spot between bounding lines 10 and 11. Any object such as vehicle 23 that is within this blind spot will be illuminated by infrared and the image of object will be captured by the CMOS array of the optical assembly 6.

An optical infrared transmitter and receiver assembly is shown generally at 7 in FIG. 3A and is mounted onto the side rear view mirror 16. Assembly 7, shown enlarged, comprises a source of infrared radiation including an array of 20 infrared LEDs, for example, or one or more laser diodes, shown generally at 13, and a CCD or CMOS array 14 of typically 160 pixels by 160 pixels or more. The CCD or CMOS array 14 is horizontally spaced apart from the LED array 13. In this embodiment, a "heads-up" display can be used to show the driver an artificial image including the host vehicle and objects in the blind spot as described below.

If two spaced-apart CCD arrays are used (e.g., array 14 and array 15 shown in FIG. 3A), then the distance to the various objects within the blind spot can be found by using a triangulation algorithm that locates similar features on both images and determines their relative location on the images. This is frequently referred to as a stereoscopic system such as described in European Patent Application No. EP0885782 A1. An alternate method is to use a lens with a short focal length. In this case, the lens is mechanically focused to determine the clearest image and thereby obtain the distance to the object. This is similar to certain camera auto-focusing systems such as one manufactured by Fuji of Japan. Other methods can be used as described in the patents and patent applications referenced above.

FIG. 3B shows a similar arrangement for mounting on a truck mirror. In this case, since the geometry of the mirror provides greater separation vertically than horizontally, the illumination source 13 is placed on the top of the mirror housing 27 and the imager 14 is placed at the bottom of the mirror housing 27. The "imager" 14 may comprise a CCD array or CMOS array. Two or more spaced-apart imagers 14 can be used in this embodiment as well and the techniques described above applied to determine the relative location of features in images obtained by the imagers 14.

Once a vehicle exterior monitoring system employing a sophisticated pattern recognition system, such as a neural network or optical correlation system, is in place, it is possible to monitor the motions of the object over time, and thereby determine if the object is acting in a predictable manner. If not, the driver of the host vehicle can be warned so that he or she can take evasive action. For example, a vehicle may be in the blind spot and the driver may be losing control of the vehicle as may happen in a passing situation when the passing vehicle has hit a patch of ice. This warning may be sufficient to allow the driver of the host vehicle to slow down and thereby avoid an accident with the out-of-control vehicle.

The system can also be used to turn on the vehicle hazard lights, sound the horn or take other appropriate action in case the driver of the threatening vehicle has fallen asleep and to warn other adjacent vehicles of a potentially dangerous situation. Thus, in general, another vehicular system can be controlled based on the determination of the presence and/or motion of the object detected in the blind spot. The use of a heads-up display is particularly useful for such a warning system since the driver is presumably looking through the windshield. Out-of-control monitoring can also apply to the host vehicle if its trajectory is unexpected relative to objects along the roadside or other proximate vehicles.

Infrared waves are shown coming from side transducer assemblies 17 and 18 in FIG. 4. As such, assemblies 17, 18 constitute infrared transmitters. In this case, CMOS imagers 19 and 20 are mounted on the side rear view mirrors providing ample displacement for triangulation calculations. Note that in some embodiments, a wide angle view can be implemented covering up to and exceeding 180 degrees for any of the imagers 17, 18, 19, 20 as well as others disclosed herein where applicable. Thus, FIG. 4 shows one arrangement of non-collocated transmitters and receivers, it being understood that other arrangements in which the transmitters are not collocated with the receivers are also within the scope and spirit of the invention. Additionally, FIG. 4 illustrates alternate mounting locations for blind spot surround vehicle monitoring in the corner light fixtures on the vehicle, the locations being designated 61, 62, 63, 64. Each such location 61, 62, 63, 64, can provide up to 270 degrees of view of the area surrounding the vehicle. Generally, the transmitter/illuminator and receiver will be located adjacent each other at these mounting locations but this need not be the case and the transmitter/illuminator can be located above or below or at some other convenient location relative to the receiver.

FIG. 5 illustrates two optical systems each having a source of infrared radiation and a CCD or CMOS array receiver. In this embodiment, transducer assemblies 5 and 6 are CMOS arrays having 160 by 160 or more pixels covered by a lens. The lens is carefully designed so that it completely covers the blind spot area under surveillance. One such sensor placed by the left outside mirror where it can monitor the entire vehicle left exterior blind spot with sufficient resolution to determine the occupancy of the blind spot. CCD's such as those used herein are available from Marshall Electronics Inc. of Culver City, Calif. and others.

The lens need not be non-distorting. The distortion of a lens can be designed by modifying the shape of the lens to permit particular portions of the exterior of the passenger compartment to be observed. The particular lens design will depend on the location on the vehicle and the purpose of the particular receiver. In this example, the light source, which can be an array of modulated LEDS is collocated with the CMOS imager. Note that although only four beams are illustrated on each side of the vehicle, typically twenty such beams are used. A modulated scanning laser or laser spotlight can alternately be used.

CCD arrays are in common use in television cameras, for example, to convert an image into an electrical signal. For the purposes herein, a CCD will be used interchangeably with CMOS and will be defined to include all devices, including CMOS arrays, TFA arrays, focal plane arrays, artificial retinas and particularly HDRC and APS arrays, which are capable of converting light frequencies, including infrared, visible and ultraviolet, into electrical signals. The particular CCD array used for many of the applications disclosed herein is implemented on a single chip that is less than two centimeters on a side. Data from the CCD array is digitized and sent serially to an electronic circuit (at times designated 12 herein) containing a microprocessor for analysis of the digitized data. In order to minimize the amount of data that needs to be stored, initial processing of the image data can take place as it is being received from the CCD array. In some cases, some image processing can take place on the chip such as described in the Kage et al. artificial retina article referenced above.

One method of determining distance to an object directly without resorting to range finders, requiring multiple arrays, is to use a mechanical focusing system. However, the use of such an apparatus is cumbersome, expensive, and slow and has questionable reliability. An alternative is to use the focusing systems described in U.S. Pat. No. 5,193,124 and U.S. Pat. No. 5,003,166. However, such systems can require expensive hardware and/or elaborate algorithms and again are slow.

Another alternative is where an infrared source having a wide transmission angle such that the entire contents of the blind spot illuminated, a sort of infrared floodlight or spotlight which preferably is in the eye-safe IR frequency range. The receiving CCD transducers can be spaced apart so that a stereographic analysis can be made by the control circuitry 12. This circuitry 12 contains a microprocessor with appropriate pattern recognition algorithms along with other circuitry as described above. In this case, the desired feature to be located is first selected from one of the two returned images from either of the CCD transducers. The software then determines the location of the same feature, through correlation analysis or other methods, on the other image and thereby, through analysis familiar to those skilled in the art, determines the distance of the feature from the transducers.

Transducer assemblies 5 and 6 are illustrated mounted onto the side mirrors of the vehicle, however, since these transducers are quite small, typically approximately 2 cm on a side, they could alternately be mounted onto the side of the vehicle or many other locations which provide a clear view of the blind spot.

A new class of laser range finders has particular application here. This product, as manufactured by Power Spectra, Inc. of Sunnyvale, Calif., is a GaAs pulsed laser device which can measure up to 30 meters with an accuracy of <2 cm and a resolution of <1 cm. This system can be implemented in combination with transducer assemblies 5 or 6. Once a particular feature of an object in the blind spot has been located, this device can be used in conjunction with an appropriate aiming mechanism to direct the laser beam to that particular feature. The distance to that feature is then known to within about 2 cm and with calibration even more accurately.

In addition to measurements within the blind spot, this device has particular applicability in anticipatory sensing applications exterior to the vehicle. An alternate technology using range gating or phase measurements to measure the time-of-flight of electromagnetic pulses with even better resolution can be implemented based on the teaching of the McEwan patents or the Intelligent Technologies Int'l patent application listed above or by modulation of the laser beam and using phase measurements such as disclosed in U.S. Pat. No. 5,653,462.

FIG. 6A is an overhead view and FIG. 6B a side view of a truck showing some preferred mounting locations of optical exterior vehicle monitoring sensors (transmitter/receiver assemblies or transducers) 160, 161. In a typical device, the diameter of the lens is approximately 2 cm and it protrudes from the mounting surface by approximately 1 cm. This small size renders these devices almost unnoticeable by observers exterior to the vehicle.

Since the sensors and transducer assemblies used in some embodiments of the invention are optical, it is important that the lens surface remains relatively clean. Control circuitry 120 contains a self-diagnostic feature where the image returned by a transducer assembly or sensor is compared with a stored image and the existence of certain key features is verified. If a receiver part of an assembly or sensor fails this test, a warning is displayed to the driver that indicates that cleaning of the lens surface is required.

The truck system shown in FIGS. 6A and 6B illustrates the use of a single blind spot detection system for the entire length of truck. The fundamental issue that determines the size of the blind spot that can be monitored with a single system relates to the ability to measure the location of the object. When a HDRC camera is used, if an object can seen in the blind spot by the human eye, then the camera should also be able to obtain a reasonable image. At night, this would require that the object in blind spot have some form of attached illumination. On a dark cloudy night, the human eye has trouble seeing a car parked along the roadway with its lights extinguished. The more distant the object, the more difficult it is to obtain a recognizable image if illumination is not present.

A significant improvement to the situation occurs if the blind spot is flooded even with low-level infrared radiation. This argues for an infrared floodlight in addition to the distance measuring infrared system. If an infrared floodlight is used along with multiple cameras displaced from one another, then the location of object in the blind spot can be determined by optical correlation between the two images and by triangulation calculations. This may be a practical solution for trucks especially those containing multiple trailers. A truck with multiple cameras placed along the left side of the vehicle is illustrated in FIG. 6C. Of course, a bright IR floodlight, preferably in the eye-safe part of the spectrum, based on a high powered diode laser and appropriate optics can be used.

The other limiting case is when bright sunlight is present and only a single imager is used for a particular blind spot. For this case, a scanning laser infrared beam, or a high powered laser diode spotlight, can still be distinguished as a reflection off of an object in the blind spot providing a narrow notch filter is used to eliminate all frequencies other than the particular infrared frequency used. Even in this case, the distance where the reflected infrared beam can be ascertained in bright sunlight can be limited to perhaps fifteen meters. Therefore, this system can be marginal for long trucks unless multiple systems are used along the side of the truck as shown at 28 in FIG. 6C. Note that certain mid-infrared frequencies having wavelengths above 10 microns are particularly good in that the radiation from the sun is significantly attenuated. Low cost imagers are not currently available but are under development for these frequencies.

From the above discussion, it would appear that multiple cameras may be the only viable solution for long trucks. A further problem arises in this system design in that if the cameras are located on different trailers, or for some other reason can move relative to each other, then the analysis computer must know the location and orientation of each camera. There are a variety of ways of accomplishing this orientation such as through locating laser beams or monitoring the relative positions of the various components of the truck. In one example, a laser beam is used to illuminate a spot on the road that can be observed from multiple camera locations. Using the position of this reflected dot in the images acquired by various cameras, the relative orientation is approximately determined. Naturally, more complicated and sophisticated systems are possible. RFID tags offer another method of determining the relative location of a point on a trailer relative to the tractor if multiple antennas are used and if the relative time of arrival of the received RFID signals are measured.

The blind spot monitoring systems described above in FIGS. 6A, 6B and 6C are mainly applicable for blind spots occurring during highway travel. For urban travel of a truck where frequent turns are made, another blind spot occurs on right hand side of the vehicle (in countries where vehicles drive on the right side of the road) and extends somewhat forward of the vehicle and back somewhat beyond vehicle cab. This area, which cannot be seen by the driver, can contain pedestrians, small vehicles, bicycles, curbs, fire hydrants, motorcycles, as well as a variety of other objects. Another more local blind spot system that covers this area is therefore necessary, as illustrated in FIGS. 7A and 7B and which is designated 24.

The applications described herein have been illustrated mainly using the driver side of the vehicle. The same systems of determining the position of an object in the blind spot are also applicable on the passenger side.

A significant number of children are killed every year by being run over by school buses. This tragic accident occurs when a child leaves the school bus and walks in front of the bus in the driver's blind spot. The driver starts driving the bus and strikes the child. A blind spot monitor of this invention, i.e., one or more transducer assemblies, is shown mounted on the front of school bus 25 near the top of the engine compartment 180 in FIGS. 8A and 8B. This monitoring system alerts the driver of the presence of an object obstructing the path of the school bus 25.

The system shown in FIG. 9 illustrates a blind spot monitoring system 26 built according to the teachings of this invention. The system can utilize a high dynamic range camera, identification and ranging capability with or without illumination or, alternately, a linear scanning laser range meter or laser spotlight. The view provided to the driver shows the location, size and identity of all objects that are within the path of the backing vehicle. The display provides maximum contrast by using icons to represent the host vehicle and the objects in the blind spot. Although this is shown for a truck, it is equally applicable for other vehicles including buses and automobiles. It can also be used in a rear impact anticipatory sensor where both the displacement and velocity, by either Doppler or differencing distance measurements, of the approaching object can be determined.

The monitoring system 26 could be activated whenever the vehicle is in reverse, unless it is also used for rear impact anticipatory sensing. Thus, the system 26 would not be needed when the vehicle is traveling forward. When the gear is shifted into reverse, a sensor could be provided to detect the change in gear and then activate the monitoring system 26. Similarly, a monitoring system which is for forward blind spot such as in front of the bus 25 shown in FIGS. 8A and 8B could be designed to activated only when the vehicle is in forward gear and not stopped or in reverse. As such, when the gear is shifted into forward, the system 25 would be activated.

In FIGS. 5-9, the illumination is shown as discrete bands. This need not be the case and, as discussed above, sources of general illumination or scanning systems can be used.

If both a forward and rear monitoring system are provided, the activation of both of these monitoring systems would not need to be simultaneous but could depend, e.g., on the direction of travel of the vehicle. In this case, a single display could be provided to the driver and alternatively display the contents of the forward blind spot or rear blind spot depending on the direction of the travel of the vehicle, i.e., in which gear the vehicle is in.

FIG. 10 illustrates a block diagram showing interface between five blind spot monitoring systems and control circuitry 12. The control circuitry 12 monitors the output from the five blind spot monitoring systems and creates icons and places the icons on a display 30,31 that shows the host vehicle and all objects in the immediate vicinity of the host vehicle. Software is provided in the microprocessor to sound a warning signal or activate haptic actuators 33 under a predetermined set of circumstances such as an attempt by the driver to change lanes into a lane occupied by an object in the blind spot. This warning signal may also be activated if the driver activates the turn signal. In addition to the audio warning signal, a visual flashing signal provided on the display and a vibration or pressure or torque or other haptic signal applied to the steering wheel to prevent or make it more difficult for driver execute the maneuver.

The display 30, 31 would selectively or alternatively display the contents of each blind spot. A screen-within-a-screen type display could also be used to display one blind spot in a majority of the screen and another blind spot in a small portion of the screen. As noted above, the blind spot displayed could depend on the status of the gear of the vehicle. The blind spot displayed could also depend on the direction of turning of the front wheels, the direction of turning of the rear wheels and/or the activation of the right or left turn signals.

External monitoring so far has been concerned with a host or resident vehicle monitoring the space in its environment. Naturally, there are vehicles that precede the host vehicle and experience the same environment prior to the host vehicle. Information from such vehicles, which can be called "probe" vehicles, can be communicated to the host vehicle to aid that vehicle in its safe travel. This brings up the subject of communication between vehicles which is covered in other patents and patent applications assigned to ATI and ITI and incorporated by reference herein so the subject will only be briefly discussed here. Generally, communication between vehicles is composed of that which should be transmitted in the most expedient fashion to aid in collision avoidance and that where some delay can be tolerated. For the first type, a broadcast protocol is preferred where each vehicle transmits a message to surrounding vehicles directly and without employing networking protocols, error correction, handshaking etc. When many vehicles are so broadcasting, the host vehicle needs to have a method of determining which vehicle to listen to which can be done, for example, by a CDMA system where the code is a function of the transmitting vehicle's location such as its GPS coordinates. The receiving vehicle with a resident map can determine the codes where potentially threatening vehicles are resident and listen only to those codes. For the second type of communication, the Internet or similar ubiquitous system is suggested. Each probe vehicle would communicate information such as the existence of a new construction zone, a patch of ice, fog or other visibility conditions, an accident or any other relevant information to a central source which would monitor all such transmissions and issue a temporary map update to all vehicles in the vicinity over the internet, or equivalent. If the probe vehicle came on an accident, then such a vehicle may also transmit a picture(s) of the accident to the central control station. This picture(s) could be transmitted automatically without any action of the driver who may not even be aware that it is occurring. The central control station could then determine the nature, seriousness, extent etc. of the accident and issue a meaningful update to the map of the area and later remove the update when the accident is cleared. This will permit the display of the accident on a map display of equipped vehicles.

This idea can be extended to cover other hazards. If some probe vehicles are equipped with appropriate sensors such as radiation, chemical and/or biological sensors, an early warning of a terrorist attack can be transmitted to the central control station all without any action on the part of the vehicle operator. In general, any information that can be sensed by a vehicle traveling on a roadway, including the maintenance state of the roadway itself, can be automatically monitored and relevant information can be transmitted automatically over the Internet, or equivalent, to a control station along with appropriate pictures if available. Any equipped vehicle can be a probe vehicle.

This assumes the existence of ubiquitous Internet, or equivalent. This is by far the least expensive way of providing such a capability to the 4 million miles of roads in the continental United States. Proposals are now being considered to put transceivers every 100 meters along the major highways in the US at a cost for installation of billions of dollars. Such transceivers would only cover the major highways even though the majority of fatal accidents occur on other roadways. The maintenance cost of such a system would also be prohibitive and its reliability questionable. For far less money, the continental US can be covered with IEEE 802.11 based systems or equivalent. Such a transceiver can cover up to a radius of 30-50 miles thus requiring only approximately 500 to 1000 such stations to cover the entire continental US. Naturally, more units would be required in densely populated areas. The cost of such units can be as low as a few thousand dollars each but even if they cost a million dollars each, it would be a small cost compared with the alternative roadside transceivers.

Initially some areas of the country will not have such 802.11 or equivalent stations. For those areas, map updates can be transmitted by a variety of methods including a station on satellite radio or some other satellite transmitting system, through the cell phone network or any other existing or special communication system. If the selected system does not support two way communication, then the messages created by the probe vehicle can be stored and transmitted when access to the Internet is available. A probe vehicle can be a specially equipped vehicle or all vehicles with the appropriate equipment.

Eventually, all cars will be connected with a combination of broadcast system for collision avoidance and ubiquitous Internet connections for map-based road hazards that are discovered by the vehicle. As a vehicle travels down a road and discovers an accident for example, a photograph of that accident will be stored and uploaded to the Internet for interpretation by a human operator who will then download a message based on the map location of the accident to warn other vehicles that are in the vicinity until the accident is cleared up which can be determined by another probe vehicle.

When all cars have the system, there will be much less need for surround vehicle monitoring except for to search for bicycles, perhaps motorcycles, pedestrians, animals, land slides, rocks, fallen trees, debris etc. All other vehicles will be properly equipped and the RtZF® can be on special lanes that permit autonomous vehicles.

There should not be any obstacles on the highway and when one is discovered, it should be photographed and uploaded to the internet for proper handling in terms of warnings and removal of the hazard. Until the time comes when the Internet is everywhere, alternate systems can partially fill in the gaps such as XM radio and other satellite based systems. This would be used only for downloading map changes. For uploading information, the vehicles would wait, maintaining data to be sent to a database until they have a direct internet connection.

To achieve ubiquitous internet coverage, IEEE 802.11 or Wi-Fi stations (or WiMAX or WiMobile or equivalent) would be placed around the nation. If, for example, each station had a radial range of 30-50 miles or more then approximately 500 to 1000 such stations could be strategically placed to provide nationwide coverage. It is anticipated that the range of such stations will be substantially increased but that the number of required stations will also increase as usage of the ubiquitous internet, or equivalent, network also increases. In that case, private industry can be earning revenues through non-safety use access charges. An estimate of the cost of a typical station is between $10,000 and $100,000 most of which is for the land and installation. The total cost thus would be around a maximum of $100 million which is a small fraction of the multi-billion dollar estimate by the Federal Highway Department to implement their proposed DSCR system with transceivers every 100 meters along the Federal Highway System, a system that would leave most of the nation unprotected and in general be of marginal value. There are many towers in place now for use by radio and TV stations and cellular telephones. It is expected that such towers can also be used for this ubiquitous network thus reducing the installation costs.

Such a proposed system could also broadcast a timing signal as well as the differential corrections to support Differential GPS (DGPS). It could even broadcast a GPS-type signal and thus eliminate the dependence of the RtZF® system on GPS. In other words, anyone could obtain centimeter level position accuracy without GPS. This concept may require a mapping of multipath delays in some urban areas.

Such a ubiquitous internet system could also provide continuous traffic updates, route guidance information as well as weather information, automatic collision notification, diagnostic and prognostic telematics communications to the manufacturer and dealer etc., and in fact all telematics transmissions would be easily achieved with such an internet system.

Looking further, ubiquitous internet could eliminate all communication systems that are currently used in the US including radio, TV, Cellular phones, XM radio and all satellite communications, telephone, OnStar® and all telematics, DSRC. Everyone could have one phone number and one phone that would work everywhere.

Other applications include remote sensing applications for home and boat security and homeland security applications, for example. Any point on the continental US would be able to communicate with the internet. If this communication happens only occasionally, then the power can be minimal and can be boosted by some form of energy harvesting and thus such a sensor could operate from years to infinitely without a power connection from batteries. For example, all monitoring and tracking operations that require satellite communication such as disclosed in U.S. patent application Ser. No. 10/940, 881 entitled Asset System Control Arrangement and Method, could be handled without satellite communication for the continental United States.

1.6 Lane Departure Warning System

Systems are now appearing on the market that warn of an unintended lane departure. Such systems are not based on the flash lidar systems disclose herein and then are seriously degraded by weather situations and particularly degraded when the roadway is wet or covered with snow. Such systems can be improved using the teachings herein through the use of pattern recognition and particularly neural networks and Kalman filters as well as other image analysis technologies disclosed herein including the lidar systems discussed above. Generally, the inventor of the inventions herein believes that the preferred approach at road and lane departure warning systems are those that are based on accurate maps and vehicle accurate location systems such as DGPS. In the meantime, before such systems are in place, use of the imaging and illumination systems disclosed herein provides an improvement to the state of the art of vision-based lane and road departure systems.

1.7 Night Vision

Various vehicle manufacturers are offering a night vision system on some vehicle models. Some of these systems are based on passive infrared radiation that is naturally emitted from warm bodies and is in the long wave or thermal region of the IR spectrum. Other manufacturers are offering active IR systems that operate in the near IR region of the spectrum that is just below the visual band in frequency. Despite claims to the contrary, it is the view of the inventor herein that such systems are of marginal value and may even contribute to degrading the safety of the vehicle since they can act as a distraction. A preferred approach, in the opinion of the inventor herein, is to use active IR systems as disclosed above and then to analyze the received images to identify objects that may be of interest to the vehicle operator. Once such an object is identified, a deer or pedestrian for example, an icon is placed on a heads-up display on the windshield where the operator would see the object if he or she could see it. This requires knowledge of the location of the eyes of the operator which can be obtained from suitable occupant sensors disclosed in other of the current assignee's patents and patent applications.

1.8 Headlight Control

A rather complicated approach to automatically dimming headlights is disclosed in U.S. Pat. No. 6,587,573. The system includes a number of approximations and arbitrary decisions as to when to turn on the bright lights and when to switch to dim some based on a guess as to where a vehicle that the host vehicle is passing is located. Many of the problems which this patent attempts to solve disappear when all vehicles can communicate their location to the host vehicle and thus the host vehicle knows exactly when to dim its lights without any arbitrary decisions. Similarly, when accurate maps are in every vehicle, the problems with reflection from signs, confusion with street lights or house lights all also disappear. Thus the problem is reduced to recognizing the headlights and tail lights of vehicles that do not have the complete collision avoidance system as described herein and in patents assigned to ATI and ITI. In this interim situation, the host vehicle needs to recognize a large number of image situations where such vehicle lights are present within the images obtained by the vehicle external imaging system. This is a natural problem for neural network-based pattern recognition systems that can be trained on literally millions of different images to permit the accurate differentiation of authentic vehicle lights from reflections and other types of lighting without going to the effort suggested by the '573 patent. The headlight dimming system need not be a separate system but can be incorporated in the general surround vehicle monitoring system disclosed herein. The '573 patent goes through enormous efforts to solve problems that are very simple for the human vision system which shows that the ultimate solution to this and many other problems lie in more sophisticated neo-cortex simulation programs. In the meantime, neural network and other pattern recognition techniques are a preferred method of solving the headlight dimming problem.

Through the imaging system disclosed herein, an entire image of an approaching vehicle can be obtained and identified which will also clear up confusion resulting from reflections from road surfaces or signs as well as house and street lights. This will also work if the vehicles lights are not on or if they are defective. A common problem not solved by the '573 patent which is solved herein, results from the case where a vehicles lights blind the eyes of a truck driver in cases where a highway separation blocks vehicle lights from automobile driver's eyes but not that of a truck driver who sits much higher.

In one sense, location is the key to headlight control. If the vehicle is getting a reflection from someplace that is not on the road or where a vehicle could not be, then the system can know that it is not from a vehicle. Therefore, a key aspect of headlight control is having every vehicle have an accurate map.

Even before maps are universally available, pattern recognition can distinguish between reflections off of a road surface or a sign from another vehicle by the shape of the reflection. If the system is trained on what a reflection from a road or a hill is or the reflection from a sign is, there should be no confusion between that and the headlights or the taillights of a vehicle or with house or street lights or anything else, the only issue being accurate pattern recognition. Similarly, the rain on the windshield or a dirty lens problems discussed in the '573 patent should be easily detectable using pattern recognition. The general theory is that in contrast to the '573 patent, the proper approach is to put the intelligence into the pattern recognition system and not in the deterministic programming which will always have holes.

2. Displays

An advanced display system can provide a simple icon image of the host vehicle and all surrounding vehicles as viewed from above. In this manner, with a simple glance, the driver can determine the location and identity of all objects that are in his blind spot or in the vicinity of the vehicle in any direction. If this display is kept simple, then the problems of visual dynamic range become much less severe. That is, if the driver need only see dark objects on a white background and if the size of these objects is sufficient, then the display could be viewed both at night and under daylight conditions.

In order to display objects on all sides of the vehicle, there should either be a type of fisheye camera and lens set-up which can be centrally mounted on the vehicle roof or at least four wide angle cameras. The images from each of these cameras can be analyzed by a pattern recognition system, such as one based of neural networks, to identify objects in the field of view. Once these objects are identified and their position relative to the vehicle determined, then a display can be constructed from any viewpoint or camera focal length as discussed in EP 1179958. Since that patent went into considerable detail illustrating how such images can be created from camera image data, a similar discussion will not be presented here. All of the created synthetic views discussed in the '958 patent can be created using icons to represent the objects that surround the vehicle. The views can be made to zoom in or out to give different perspectives which may aid in parking or in heavy traffic or when the vehicle is traveling at high speed. During such a zoom operation, only a portion of the host vehicle icon may be shown, for example when the vehicle is attempting to park. If color cameras are used, the icons can be colored to represent the color of the monitored vehicles or other objects. When an object is getting dangerously close to the host vehicle or otherwise threatening, its icon can be intensified, made to flash or otherwise modified to call attention to the object.

If the vehicle knows its location and has accurate maps, the existence of lane boundaries and all fixed objects can be accurately displayed as icons on the display. If a route guidance system is also present, all turns and other directions can be displayed also on a map display. The path that the vehicle should take can be displayed in yellow, for example. Additionally, the path that the vehicle is projected to take within the next 30 seconds, for example, based on the steering wheel angle and vehicle velocity, can also be represented in a manner similar to that disclosed in U.S. Pat. No. 594,931.

In some parts of the U.S., satellite images are available in real time that show traffic patterns including the subject vehicle. If the vehicle knows exactly its location and the location of the image, then a view of the area surrounding the subject vehicle can be superimposed on a display and the vehicle operator can see the traffic situation surrounding his or her vehicle from above. Also, using pattern recognition, the salient features of the image can be extracted and displayed as icons on a display thereby simplifying the interpretation problem for the driver as discussed above. However such a system would fail in tunnels and under heavy foliage.

A preferred embodiment of at least one of the inventions herein is to use an active or passive optical system for monitoring the presence of objects in the area of interest external to the vehicle. Pattern recognition technologies such as neural networks and optical correlation systems will be used to positively identify the object that is in the monitored areas. This object may be a pedestrian, bicyclist, motorcyclist, guardrail, animal, automobile, truck, fire hydrant, tree, telephone pole, sign or whatever. The system will be trained or otherwise programmed to inform the operator either optically or orally that such an object appears in the blind spot. It will also inform the driver as to which blind spot contains the object. The system can also inform the driver as to whether this object is moving or stationary in an absolute sense and/or also in relation to the host vehicle. This information can be presented to the operator in a variety of ways. Initially, a light or simple icon can appear on the rear view mirror, for example, indicating either that some object exists or that a particular object exists.

In more sophisticated systems, an icon representing the object can be placed on a simple icon display which can show the vehicle from an overhead view, or other convenient view, and an icon which shows the blind spot object and its location. Alternately, an oral annunciation can be provided which tells the driver that, for example, there is a guardrail three feet to his left, or that there is an automobile approaching from the rear in an adjacent lane at a relative speed of 100 kph and is currently 50 feet behind the vehicle. All of these types of warnings can be provided if identification can be made of the object in the blind spot and an accurate measurement made of the position and velocity of that object relative to the host vehicle. This will be discussed below.

It can be seen from this description that a system in accordance with the invention will inform the driver of the type of object in the blind spot, where it is located specifically and/or what its velocity is relative to the host vehicle, and in more sophisticated systems, show graphically an icon showing the object relative to the vehicle from an overhead view, for example, which is easily understandable by the driver with a mere glance at the display. Therefore, the system overcomes all of the objections and problems described above with respect to the prior art systems.

Although simple icon displays are contemplated by this invention, this is due to the lack of sophistication or capability of current display technology. In other words, the dynamic range of light that can be emitted by conventional displays is insufficient to display other than the simplest messages. Technology advances, and it is expected that accurate color displays with high dynamic range will be become available based, for example, on organic display technology (OLED). When such displays are available, a more accurate representation of the object in the blind spot even to the point of an actual image might become feasible.

The inventions herein do not generally contemplate the use of rear view mirrors to permit the vehicle operator to actually see the contents of the blind spot. This is because to accurately accomplish this requires knowledge of the position of the eyes of the driver. It is been observed that drivers adjust side rear view mirrors over an extended range that renders the use of the mirror angle unsuitable for determining the position of the driver's eyes. Furthermore, the driver may change his or her seating position without changing the position of the rear view mirror. Occupant sensing systems are now being developed for vehicles that have the capability of determining the location of the eyes of a vehicle operator. For those vehicles that contain such a system, the possibility exists not only to automatically adjust the mirror to optimally display contents of the blind spot, but also to change the orientation of the mirror when some object that the driver should be aware of is in the blind spot. This invention therefore contemplates such activities when occupant sensing systems are placed on vehicles.

FIG. 11 illustrates a control module 36 that contains a variety of electronic components 37-42. The control module is connected to the blind spot monitoring system including the transducer assemblies 5-9 by wires, not shown, or wirelessly and in turn it connects to a display on the instrument panel 31 or a heads-up display 30. Based on the calculations performed in a microprocessor 41, the control module 36 creates the icons on displays 30 and 31 and additionally initiates audio and haptic warnings as described above. The connection between the control module 36 and the audio and haptic actuators may be a wired connection or a wireless connection.

Figure 12:
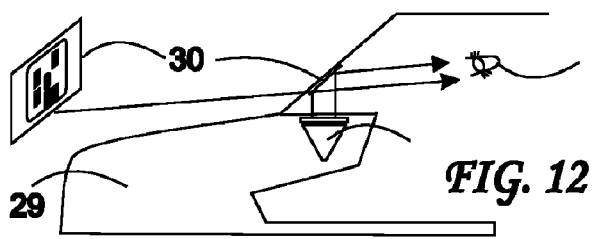
FIG. 12 is an illustration similar to FIG. 11 showing the projection of the images onto a heads-up display.

FIG. 12 is a further illustration of the heads-up display 30 shown in FIG. 11. The heads-up display 30 is constructed according to well-known principles and the image is projected focused in front of vehicle 29 such that the driver can observe the image without taking his or her eyes from the road.

Above, it has been assumed that data for determining the location of vehicles that surround the host vehicles would come from cameras. This need not be the case when vehicles are equipped with a vehicle-to-vehicle communication system in which case, the host vehicle can obtain the location and vehicle type information from transmissions directly from another vehicle. One approach is to have each vehicle periodically broadcast its ID, position and velocity. This could happen every 10 milliseconds, for example. Such information could aid in the selection of the proper icon and the placement of that icon onto the display. The channel selected for the broadcast communication could be based on the location of the broadcasting vehicle. The host vehicle could use a common algorithm plus a map to determine the channel selected by the broadcasting vehicle, and the area where the host vehicle wishes to monitor, thereby greatly limiting the number of vehicles that it would need to listen to. The broadcast approach coupled with an icon display is applicable to vehicles of all types, and airplanes in particular.

Also, the displays discussed above have been assumed to be two dimensional. Three dimensional displays, especially for airplanes, are also possible and the invention is not limited to two-dimensional displays.

3. Identification

Use of trainable pattern recognition technologies such as neural networks is an important part of some of the inventions disclosed herein, although other non-trained pattern recognition systems such as fuzzy logic, correlation, Kalman filters, template matching and sensor fusion can also be used. These technologies are implemented using computer programs to analyze the patterns of examples to determine the differences between different categories of objects. These computer programs are derived using a set of representative data collected during the training phase, called the training set. After training, the computer programs output computer algorithms containing the rules permitting classification of the objects of interest based on the data obtained after installation on the vehicle.

These rules, in the form of an algorithm, are implemented in the system that is mounted onto the vehicle. The determination of these rules is important to the pattern recognition techniques used in this invention. Neural networks either singularly or combination neural networks are contemplated by some of the inventions disclosed herein. Combination neural networks are groups of two or more neural networks and include modular neural networks and ensemble neural networks among others. Also other forms of neural-based systems such as cellular neural networks and support vector machines are also contemplated by this invention.

Artificial neural networks using back propagation are thus far the most successful of the rule determination approaches. However, research is underway to develop systems with many of the advantages of back propagation neural networks, such as learning by training, without the disadvantages, such as the inability to understand the network and the possibility of not converging to the best solution. In particular, back propagation neural networks will frequently give an unreasonable response when presented with data that is not within the training data. It is known that neural networks are good at interpolation but poor at extrapolation. A combined neural network fuzzy logic system, on the other hand, can substantially solve this problem. Additionally, there are many other neural network systems in addition to back propagation. In fact, one type of neural network may be optimum for identifying the contents of the blind spot and another for determining the location of the object dynamically.

The discussion thus far has identified pattern recognition systems and particularly neural network pattern recognition systems to be used to identify the contents of the blind spot. One particular neural network architecture has been particularly successful in this field. This is known as modular neural networks. The concept behind modular neural networks is that when a complicated task is to be accomplished by a neural network, significant improvements in speed and accuracy can sometimes be obtained if the overall problem is divided into a number of smaller problems. A separate neural network is then assigned each sub-task. Thus, a network of neural networks is created. An alternate and also successful approach is the use of Associative-Projective Neural Networks (APNN).

When a human observes a tree, the human mind concentrates on characteristics of that tree and not on characteristics of an automobile. Thus, the human mind appears to operate also as a modular neural network. There are many ways of applying this concept to blind spot monitoring. Since both the identity and the location of object in the blind spot are to be determined, it is logical to therefore separate the problem into a first neural network that determines the identity of the object and then a variety of additional neural networks that, given the identity of the object, determine its location based of attributes such as the size of the object in the image. In addition, a separate neural network may be trained to segregate any unknown objects from data that are not understood by the neural networks because nothing similar was a part of the training database.

Additional tasks that can be allocated to specific neural networks are to determine the environment that the vehicle is operating in. Obviously, an automobile in a blind spot looks considerably different at night with its headlights on than in bright sunlight. The identification and also the position determining tasks can be more accurate if they are segregated by lighting conditions. Similarly, the presence of fog, smoke, rain, snow, soiled lenses, and other factors can have a significant effect on the system accuracy and the determination of such conditions can be allocated to separate groups of neural networks.

In some embodiments of this invention, the rules are sufficiently obvious that a trained researcher can look at the returned optical signals and devise an algorithm to make the required determinations. In others, artificial neural networks are frequently used to determine the rules. One such set of neural network software for determining the pattern recognition rules, is available from the NeuralWare Corporation of Pittsburgh, Pa. and another from International Scientific Research in Panama City, Panama. Numerous books and articles, including more than 500 U.S. patents, describe neural networks in great detail and thus the theory and application of this technology is well known and will not be repeated here. Neural networks are now beginning to gain more widespread use in the automotive industry including their use for engine control, occupant spatial sensing for the control of airbags, side and frontal crash sensor algorithms and vehicle diagnostic systems.

The system generally used in this invention for the determination of the presence of an object in the blind spot is the artificial neural network or a neural-fuzzy system. In this case, the network operates on the returned signals from the CCD or CMOS array as sensed by transducer assemblies such as 5, 6, 7, 8 and 9 in FIG. 1, for example. For the case of the left blind spot, through a training session, the system is taught to differentiate between many cases including automobiles, pedestrians, bicycles, trucks, animals, motorcycles, fences, guard rails, parked vehicles etc. This is done by conducting a large number of experiments where data from each of these objects is captured in a variety of positions, velocities and vehicle operating conditions (rain, night, bright sunlight, rural roads, interstate highways, etc.). As many as 1,000,000 such experiments can be run before the neural network is sufficiently trained and validated so that it can differentiate among the various cases and output the correct decision with a very high accuracy.

Once the network is determined, it is possible to examine the result to determine, from the algorithm created by the neural network algorithm generating software, the rules that were finally arrived at by the trial and error training technique. In that case, the rules can then be programmed into a microprocessor. Alternately, a neural computer can be used to implement the network directly. In either case, the implementation can be carried out by those skilled in the art of pattern recognition using neural networks.

Many systems are now on the market that monitor obstructions in the rear of a vehicle and warn the driver of the existence of such obstructions when the driver is backing a vehicle. The technologies currently used include radar, ultrasound and TV cameras. Neither radar nor ultrasound are generally capable of identifying the object and most such systems cannot locate the object which might allow the driver to slightly change his or her direction and avoid a curb or pole, for example. The television camera systems typically do not have illumination sources and at best produce a poor television image to the driver that is difficult to see in sunlight.

Figure 13A:
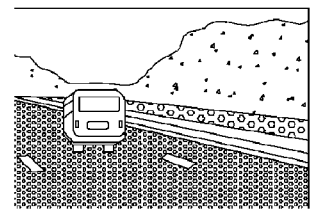
FIG. 13A illustrates a view of the image as seen by a side rear view camera of FIG. 1.
Figure 13B:
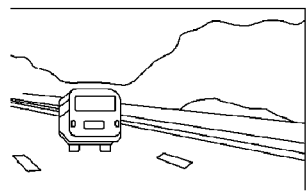
FIG. 13B illustrates a view of the image of FIG. 13A after a stage of image processing.
Figure 13C:
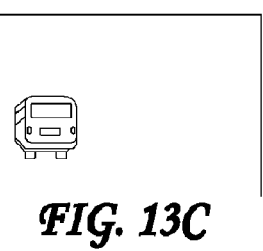
FIG. 13C illustrates a view of the image as FIG. 13B after the vehicle has been abstracted.

FIGS. 13A, 13B and 13C illustrate one preferred method of separating an object in the blind spot from other objects in preparation for input into a neural network for identification and/or position determination. FIG. 13A illustrates a view of the image as seen by a side rear view transducer assembly 7 of FIG. 1.

Various filters are employed to simplify and idealize the view the output of which is shown in FIG. 13B. A variety of technologies, such as discussed above, exist to eliminate remaining background objects and isolate the vehicle to arrive at the image as shown in FIG. 13C.

In one preferred method, the distance to the objects to the left and right of the vehicle can determined by the laser radar system described above. This permits the elimination of objects that are not in the same plane as the blind spot vehicle. Any of the distance measuring schemes described above along with pattern matching or pattern linking techniques can be used to extract the vehicle. Other techniques involve the use of relative motion of the object in the blind spot that may involve the use of optical flow calculations. A preferred method is through the use of range gating as discussed above. The goal is a full three-dimensional representation of entire scene or region on interest (ROI) has been achieved. Therefore, a variety of techniques can be used depending on particular problem at hand.

Figure 14:
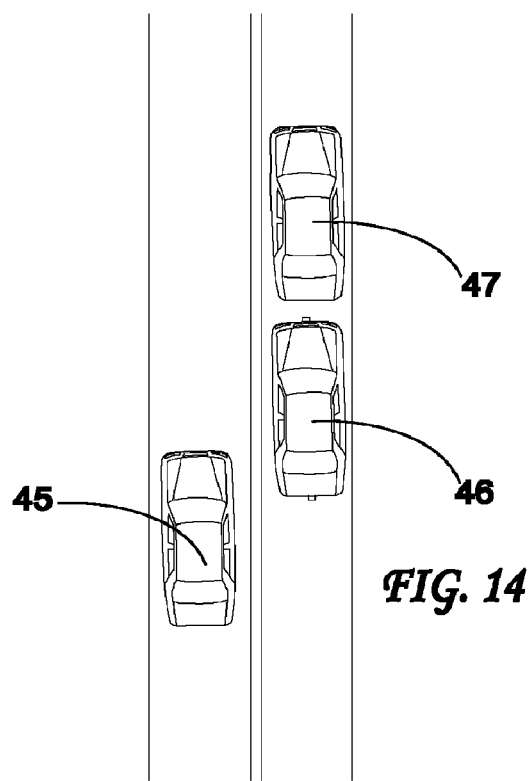
FIG. 14 illustrates a lane change problem in congested traffic.

FIG. 14 illustrates a lane-changing problem in congested traffic. In this illustration, the driver of vehicle 46 wants to change lanes to pass vehicle 47. However, vehicle 45 is in the blind spot and if vehicle 46 attempts this lane change, an accident may result. Using the teachings herein, the driver of vehicle 46 will be made aware either through a visual display or through warning signals, optical, audio and/or haptic, should the driver attempt to execute such a lane change. The driver may be made aware of the presence of the vehicle 45 in the blind spot upon activation of the turn signal, upon detection of the beginning of the lane change as reflected in the turning of the steering wheel or front wheels of the vehicle and/or by the presence of an icon showing the vehicle 45 in the display 30, 31.

A detailed discussion of pattern recognition technology as applied to the monitoring and identification of occupants and objects within a vehicle is discussed in U.S. Pat. No. 5,829,782. Although the application herein is for the identification of objects exterior to the vehicle, many of the same technologies, principles and techniques are applicable. For example, methods that make use of edge detection are usually central to most neural network-based object classifiers.

An example of such a pattern recognition system using neural networks using sonar is discussed in two papers by Gorman, R. P. and Sejnowski, T. J. "Analysis of Hidden Units in a Layered Network Trained to Classify Sonar Targets", *Neural Networks*, Vol. 1. pp 75-89, 1988, and "Learned Classification of Sonar Targets Using a Massively Parallel Network", IEEE Transactions on Acoustics, Speech, and Signal Processing, Vol. 36, No. 7, July 1988.

Pattern recognition techniques as applied to pedestrian recognition are discussed below.

Another method of identifying a moving vehicle is through the use of laser vibrometry. This can be done by impinging a laser beam on an object and analyzing the reflected light using frequency analysis by any method such as using a Fourier transform. Different vehicles have different characteristic frequencies.

Another area where pattern recognition is useful relates to determining information about a particular geographic location. U.S. Pat. No. 6,604,049 discusses a system that is cumbersome and impractical for application on normal as opposed to special purpose vehicles. The '049 patent solves the problem where an operator wishes to obtain information about a building within its vicinity. The operator takes a picture and sends that picture along with the operator's GPS coordinates and viewing direction to a central server and then requests information about the building. The central server attempts to match the sent image with images that it has stored in its database to determine what building the operator is looking at. Of course to cover all buildings and all other points of interest in the United States would require a massive database that would require billions of dollars to obtain and maintain rendering this approach impractical. On the other hand, only one building can occupy a particular physical location on the earth and thus, if instead of sending an image the operator sent the GPS-based location of the building, or other point on interest, the required database would be orders of magnitude smaller and manageable on a city server, for example.

To implement this feature, an observer would measure the location of the point of interest relative to the vehicle (or other device for a walking operator, for example) and send the coordinates of the point of interest over an appropriate network such as the internet to the appropriate server along with a request for particular or general information. This approach has many other advantages. A picture of a point of interest can change based on lighting conditions, time of the year, etc. The location of the object will not in general change and if it does, the server database can be updated accordingly. In many cases, the vehicle resident database can have the identification information and additional information may not be needed or if it is the character of that additional information needed can be accurately specified and therefore accurately answered. For example, what time does that museum close? Such a system can be used by tourists as well as any other professionals desiring information of any nature relative to a particular location.

4. Anticipatory Sensors

FIG. 15 is an angular perspective overhead view of a vehicle 50 about to be impacted in the side by an approaching vehicle 51, where vehicle 50 is equipped with a blind spot monitor or anticipatory sensor system showing a transmitter 52 transmitting electromagnetic, such as infrared, waves toward vehicle 51. This is one example of many of the uses of this invention for exterior monitoring.

The transmitter 52 is connected to an electronic module 56. Module 56 contains circuitry 57 to drive transmitter 52 and circuitry 58 to process the returned signals from receivers 53 and 54. Circuitry 58 contains a neural computer 59 or a microprocessor with a pattern recognition algorithm or equivalent, which performs the pattern recognition determination based on signals from receivers 53 and 54 (FIG. 15A). Receivers 53 and 54 are mounted onto the B-Pillar of the vehicle and are covered with a protective transparent cover. An alternate mounting location is shown as 55 which is in the door window trim panel where the rear view mirror (not shown) is frequently attached. This dual monitoring of an external space is an example of stereo vision.

One additional advantage of this system is the ability of infrared to penetrate fog and snow better than visible light, which makes this technology particularly applicable for blind spot detection and anticipatory sensing applications. Although it is well known that infrared can be significantly attenuated by both fog and snow, it is less so than visual light depending on the frequency selected. (See for example L. A. Klein, *Millimeter-Wave and Infrared Multisensor Design and Signal Processing*, Artech House, Inc, Boston 1997, ISBN 0-89006-764-3). Additionally, much of the reflection from fog, smoke, rain or snow can be filtered out using range gating, which masks reflections that come from certain distance ranges from the sensor as discussed above. Also, if the eye-safe part of the spectrum is selected, particularly frequencies can be selected to minimize the effect of the sun's radiation, In the eye-safe region, much higher power can be used and coupled with range gating, the visibility through fog etc. can be substantially increased.

Radar systems, which may not be acceptable for use in the interior of the vehicle, are now commonly used in sensing applications exterior to the vehicle, police radar being one well-known example. Miniature radar systems are now available which are inexpensive and fit within the available space. Such systems are disclosed in the McEwan patents described above. One particularly advantageous mode of practicing the invention for these cases, therefore, is to use a pulsed or CW radar or pulsed laser radar system, along with a CCD array. In this case, the radar is used to determine distance and the CCD for identification.

In a preferred implementation, transmitter 52 is an infrared transmitter and receivers 53, 54 and 55 are CCD transducers that receive the reflected infrared waves from vehicle 51. In the embodiment shown in FIG. 15, an exterior-deployed airbag 60 is shown which deploys in the event that a side impact is about to occur as described in U.S. Pat. No. 6,343,810 and elsewhere herein. Note, this can be considered a stereo camera implementation if only two receivers are used.

In most of the applications above, the assumption has been made that either a scanning spot, beam or a line of light will be provided. This need not be the case. The light that is emitted to illuminate the object can be structured light. Structured light can take many forms starting with, for example, a rectangular or other macroscopic pattern of light and dark can be superimposed on the light by passing it through a filter. If a similar pattern is interposed between the reflections and the camera, a sort of pseudo-interference pattern can result sometimes known as Moiré patterns. A similar effect can be achieved by polarizing transmitted light so that different parts of the object that is being illuminated are illuminated with light of different polarization. Once again, by viewing the reflections through a similarly polarized array, information can be obtained as to where the source of light came from which is illuminating a particular object. Different modulation schemes can also be used to create different patterns and the modulation can be varied in time for particular applications. These are among the many methods that can be used to obtain three-dimensional information from a two-dimensional image. Other techniques based on range gating or camera focus are described in U.S. patent application Pub. No. 20030209893 and its related predecessors.

As disclosed in U.S. Pat. No. 5,653,462 for interior vehicle monitoring and U.S. Pat. No. 6,343,810 for exterior monitoring, a modulated light source can be used to determine the distance to an object either interior or exterior of the vehicle. The basic principle is that the phase of the reflected light is compared to the phase of the transmitted light and the distance to the reflecting object is determined by the phase difference. There are many ways of implementing this principle. One that has been disclosed is called the photonic mixing device or PMD. In this device, an optical filter is modulated with the same frequency and the phase that is used to modulate the transmitted light beam. In the PMD, this principle is executed on a pixel by pixel basis and incorporated into the CMOS array structure. Although still falling within the teachings of this invention, this results in an unnecessarily complicated structure. An alternate method will now be described.

An object in the blind spot or inside a vehicle is illuminated by modulated light and reflects this light back to a receiver wherein the phase relationship between the reflected light and the transmitted light is a function of the distance to the reflecting surface. For every pixel, the comparison will be made to the same frequency and phase since only one source of illuminating modulated light has been used to illuminate the entire object. Therefore, there is no advantage in attempting to influence each pixel separately with the modulation frequency and phase. A similar and preferable approach is to use a single light valve, electronic shutter or range gate to modulate all of the light coming back from the illuminated object.

The technology for modulating a light valve or electronic shutter has been known for many years and is sometimes referred to as a Kerr cell or a Pockel cell. More recent implementations are provided by the technology of 3DV discussed above. These devices are capable of being modulated at up to 10 billion cycles per second. For determining the distance to a vehicle in the blind spot, modulations between 5 and 100 MHz are needed. The higher the modulation frequency, the more accurate the distance to the object can be determined. However, if more than one wavelength, or better one-quarter wavelength, exists between the host vehicle and the object, then ambiguities result. On the other hand, once a longer wavelength has ascertained the approximate location of the vehicle, then more accurate determinations can be made by increasing the modulation frequency since the ambiguity will now have been removed.

In one preferred embodiment of this invention, therefore, an infrared floodlight, which can be from a high power laser diode and can operate in the eye-safe part of the spectrum, is modulated at a frequency between 5 and 100 MHz and the returning light passes through a light valve such that amount of light that impinges on the CMOS array pixels is determined by a phase difference between the light valve and the reflected light. By modulating a light valve for one frame and leaving the light valve transparent for a subsequent frame, the range to every point in the camera field of view can be determined based on the relative brightness of the corresponding pixels. Pulse or noise or pseudo noise modulation can also be used which has the advantage that the return signal can be more easily differentiated from transmissions from other vehicles.

Other differentiation schemes are based on synchronizing the transmissions to the vehicle GPS location, direction of travel or some other such scheme.

Once the range to all of the pixels in the camera view has been determined, range gating becomes a simple mathematical exercise and permits objects in the image to be easily separated for feature extraction processing. In this manner, many objects in the blind spot can be separated and identified independently.

As mentioned above, it is frequently not possible to separate light from a broad illumination source from reflected sunlight, for example. It has been determined, however, that even in the presence of bright sunlight a reflection from a narrow beam of infrared laser light, or a broader beam from a high power laser diode, can be observed providing a narrow notch frequency filter is used on the light entering the receiver. The principles described above, however, are still applicable since a sampling of pixels that have been significantly illuminated by the narrow laser beam can be observed and used for ranging.

The technique of using a wide-angle infrared floodlight is particularly useful at night when objects, especially those without self-contained lights, are difficult to observe. During bright sunlight, there is considerable information from the visual view taken by the cameras to perform feature extraction, identification, ranging etc. utilizing other techniques such as relative motion. Thus, a superior blind spot monitoring system will make use of different techniques depending on the environmental conditions.

In more sophisticated implementations of the present invention, there can be a complementary interaction between the imaging system and the aiming direction of the infrared laser beam. For example, a particular limited area of the image can be scanned by the infrared system when the imaging system is having difficulty separating one object from another. It is expected, as the various technologies described above evolve, that very smart blind spot, anticipatory sensors and general exterior monitoring systems based on the teachings of this invention will also evolve.

In one implementation, the goal is to determine the direction that a particular ray of light had when it was transmitted from the source. Then, by knowing which pixels were illuminated by the reflected light ray along with the geometry of the transducer mountings, the distance to the point of reflection off of the object can be determined. This requires that the light source not be collocated with the CCD or CMOS array. If a particular light ray, for example, illuminates an object surface that is near to the source, then the reflection off of that surface will illuminate a pixel at a particular point on the CCD or CMOS array. If the reflection of the same ray however occurs from a more distant surface, then a different pixel will be illuminated in the CCD array. In this manner, the distance from the surface of the object to the CCD can be determined by triangulation formulas.

Similarly, if a given pixel is illuminated in the CCD from a reflection of a particular ray of light from the transmitter, and the direction in which that ray of light was sent from the transmitter is known, then the distance to the object at the point of reflection can be determined. If each ray of light is individually recognizable and therefore can be correlated to the angle at which it was transmitted, then the object can be easily segmented from the background and other objects and a full three-dimensional image can be obtained of the object that simplifies the identification problem.

The coding of the light rays coming from the transmitter can be accomplished in many ways. One method is to polarize the light by passing the light through a filter whereby the polarization is a combination of the amount and angle of the polarization. This gives two dimensions that can therefore be used to fix the angle that the light was sent. Another method is to superimpose an analog or digital signal onto the light that could be done, for example, by using an addressable light valve, such as a liquid crystal filter, electrochromic filter, or, preferably, a garnet crystal array. Each pixel in this array would be coded such that it could be identified at the CCD. Alternately, the transmitted radiation can be AM or FM modulated to also provide source identification.

The technique described above is dependent upon either changing the polarization or using the time or frequency domain, or a combination thereof, to identify particular transmission angles with particular reflections. Spatial patterns can also be imposed on the transmitted light that generally goes under the heading of structured light, as discussed above. The concept is that if a pattern is identifiable, then either the distance can be determined by the displacement of the pattern in the field of view if the light source is laterally displaced from the receiver or, if the transmission source is located on the same axis but axially displaced with the receiver, then the pattern expands at a different rate as it travels toward the object and then, by determining the size of the received pattern, the distance to the object can be determined. In some cases, Moiré pattern techniques are utilized. One method of augmenting this in line effect is to have the light pass though a lens that places the focal point of the light in front of the imager, for example, so that it is equivalent to having the light source at the focal point. Many other methods of varying the focal point of the illumination source relative to the focal point of the imager are also possible such as varying the focal length of the imager and illumination source, or having two imagers with different focal lengths.

A further consideration to this invention is to use the motion of the object, as determined from successive differential arrays, for example, to help identify that there is in fact an object in the blind spot. Differential motion can be used to separate various objects in the field of view and absolute motion can be used to eliminate the background, if desired.

In another preferred implementation, transmitter 52 is an ultrasonic transmitter operating at a frequency of approximately 40 kHz, although other frequencies could be used. Similarly, receivers 53 and 54 are ultrasonic receivers or transducers and receive the reflected ultrasonic waves from vehicle 51.

A "trained" pattern recognition system as used herein is a pattern recognition system that is trained on data representing different operating possibilities. For example, the training data may constitute a number of sets of a signal from receiver 53 represented the returned waves received thereby, a signal from receiver 54 representing the returned waves received thereby and one or more properties of the approaching object, e.g., its form or shape, size or weight, identity, velocity, breadth and relative distance. Once trained, the trained pattern recognition system will be provided with the signals from receivers 53, 54 and categorize the signals that would lead to a determination by the system of the property or properties of the approaching object, e.g., its size or identity.

Some examples of anticipatory sensing technologies follow:

In a passive infrared system, a detector receives infrared radiation from an object in its field of view, in this case the approaching object is most likely another vehicle, and processes the received infrared radiation radiating from the vehicle's engine compartment. The anticipatory sensor system then processes the received radiation pattern to determine the class of vehicle, and, along with velocity information from another source, makes an assessment of the probable severity of the pending accident and determines if deployment of an airbag is required. This technology can provide input data to a pattern recognition system but it has limitations related to temperature. The sensing of a non-vehicle object such as a tree, for example, poses a particular problem. The technology may also fail to detect a vehicle that has just been started especially if the ambient temperature is high. It also has difficulty with the case of a host vehicle sliding into a parked vehicle, for example. Nevertheless, for use in the identification of approaching vehicles the technology can provide important information especially if it is used to confirm the results from another sensor system.

In a passive audio system one or more directional microphones can be aimed from the rear of the vehicle can determine from tire-produced audio signals, for example, that a vehicle is approaching and might impact the target vehicle, or host vehicle, which contains the system. The target vehicle's tires as well as those to the side of the target vehicle will also produce sounds which need to be cancelled out of the sound from the directional microphones using well-known noise cancellation techniques. By monitoring the intensity of the sound in comparison with the intensity of the sound from the target vehicle's own tires, a determination of the approximate distance between the two vehicles can be made. This process is aided when a correlation is performed between the sound of the host tires as modified by the road (cracks, bumps, etc.) and the sound of a vehicle approaching from the rear or front on the same lane. Finally, a measurement of the rate of change in sound intensity can be used to estimate the time to collision. This information can then be used to pre-position the headrest, for example, or other restraint device to prepare the occupants of the target vehicle for the rear end impact and thus reduce the injuries therefrom. A similar system can be used to forecast impacts from other directions. In some cases, the microphones will need to be protected in a manner so as to reduce noise from the wind such as with a foam protection layer. This system provides a very inexpensive anticipatory crash system.

The sensing of sound around a vehicle can also be used as an attention getting mechanism to direct other systems to search for the presence of potential threats. Thus sensed sound can be used to direct a video camera, laser spotlight with distance and velocity measuring capabilities system, radar etc. Naturally, the attention getting mechanism can also use radar, lasers, ultrasound or other mechanisms.

In a laser optical system design, the transmitter 52 comprises an infrared laser beam which is used to momentarily illuminate an object as illustrated in FIG. 15 where transmitter 52 is such a laser beam transmitter. In some cases, a charge coupled device (a type of TV camera), or a CMOS optical sensor array, is used to receive the reflected light and would be used as one or both of the receivers 53 and 54. The laser can either be used in a scanning mode, or, through the use of a lens, a cone of light or a large diameter beam can be created which covers a large portion of the object. When the light covers a significant area a high powered laser diode can be used. When such a high powered laser diode is used the distance to the closest reflecting object can be measured and the intensity of the radiation at that distance controlled so as to maintain eye safety conditions or an eyesafe wavelength can be used. If the atmospheric conditions are also known so that the dissipation of the transmitted light can be determined then added power can be used to compensate for the losses in the atmosphere still maintaining eye safety conditions. Additionally, the beam can be made to converge at just the rate to keep the illumination intensity constant at different distances from the source. To implement some of these concepts, appropriate lens systems may be required. In some cases the lenses must respond more rapidly then possible with conventional lenses. Solid state acousto-optical based or liquid based lenses or MEMS mirrors offer the potential to operate at the required speed.

In each case, a pattern recognition system, as defined above, is used to identify and classify the illuminated object and its constituent parts. The scanning implementation of the laser system has an advantage that the displacement of the object can be calculated by triangulation of the direction of the return light from the transmitted light providing the sensor and transmitter are displaced from one another. This system provides the most information about the object and at a rapid data rate. Its main drawback is cost which is above that of ultrasonic or passive infrared systems and the attenuation that results in bad weather conditions such as heavy rain, fog or snow storms. As the cost of lasers comes down, this system will become more competitive. The attenuation problem is not as severe as might be expected since the primary distance of concern for anticipatory sensors as described here is usually less than three meters and it is unlikely that a vehicle will be operated with a visibility of only a few meters. If the laser operates in the infrared region of the spectrum, the attenuation from fog is less than if it is operated in the visible part of the spectrum. As mentioned above, any remaining atmosphere scattering or absorption problems can be alleviated with range gating.

Radar systems have similar properties to the laser system discussed above with the advantage that there is less attenuation in bad weather. The wavelength of a particular radar system can limit the ability of the pattern recognition system to detect object features smaller than a certain size relative to the radar wavelength. This can have an effect in the ability of the system to identify different objects and particularly to differentiate between different truck and automobile models. It is also more difficult to use radar in a triangulation system to obtain a surface map of the illuminated object as can be done with an infrared laser. However, for anticipatory sensing the object of interest is close to the host vehicle and therefore there is substantial information from which to create an image for analysis by a pattern recognition system providing a narrow beam radar is used. Radar remains a high price option at this time but prices are dropping.

The portion of the electromagnetic spectrum between IR and mm wave radar is called the Terahertz portion of the spectrum. It has the advantage over radar in that optical methods may be able to be used thus reducing the cost and the advantage over IR in that it is absorbed or scattered less by the atmosphere. Systems are now being developed which should permit widespread use of this portion of the spectrum.

A focusing system, such as used on some camera systems, could be used to determine the position of an approaching vehicle when it is at a significant distance away but may be too slow to monitor this position just prior to a crash unless a liquid or other fast focusing lens is available. This is a result of the mechanical motions required to operate the lens focusing system. By itself, it cannot determine the class of the approaching object but when used with a charge coupled, or CMOS, device plus infrared illumination for night vision, and an appropriate pattern recognition system, this becomes possible. Systems based on focusing theory have been discussed above and in the referenced patents which permit a crude distance determination from two camera settings that can be preset. In some cases two imagers can be used for this purpose. A stereo camera-based system is another method of getting the distance to the object of interest as discussed above and in the referenced patents and patent applications.

From the above discussion, it can be seen that the addition of sophisticated pattern recognition techniques to any of the standard illumination and/or reception technologies for use in a motor vehicle permits the development of an anticipatory sensor system which can identify and classify an object prior to the actual impact with the vehicle, and thus provide an output of one of a number of pre-determined identities of the object from which waves have been received. Such a system can be used to deploy external airbags, external nets and/or interior occupant restraint systems prior to and/or during the accident. Even with a simple imager system using visible or infrared illumination, or no artificial illumination, an estimate of the distance to a vehicle can be made from a two-dimensional image since the width and sometimes the height of an identified vehicle is known and its distance can be determined by scaling based on its size in the image. This of course does not require the assumption that the road is flat.

FIG. 16 is an exemplary flow diagram of one embodiment of this invention. The blind spot monitor begins by acquiring an image of the blind spot that contains an object to be identified (step 159) and by determining the range to the object (step 160) and outputs range information and image information to a feature extraction routine (step 161). The output from the feature extraction routine is fed into the neural network or other pattern recognition algorithm. The algorithm determines the identity of object (step 162). Once the identity and range of the object is known then the display can be updated (step 163). Using current and recent information, the relative velocity algorithm determines the relative velocity of the object to the host vehicle by differencing or by Doppler or other techniques (step 164). With the position, velocity and identity of the object in the blind spot known, an appropriate algorithm determines whether it is safe for a lane-changing maneuver (step 165). If the determination is yes, then control is returned to the image collection and ranging activities and a new image and range is determined. If the lane change determination is no, then a determination is made if the turn signal is activated (which would be indicative of the driver's intention to change lanes) (step 166). If yes, then audio and/or visual warnings are activated (step 167). If no, then a determination is made if the operator has begun to change the direction of the vehicle to begin executing a lane change (and simply failed to activate the turn signal) (step 168). If map data is present road curvature can also be taken into account. If the vehicle has begun executing a lane change, then the audio and/or visual warnings are again activated (step 167) and a haptic system begins to exert a torque on the steering wheel to oppose the turning motion of the driver (step 169). Alternately, a vibration can be induced into the steering wheel, or audio sound, as a further warning to the operator not to execute a lane change. Following these activities, control is returned to the image acquisition and range determination activities and the process repeats.

Using the haptic system, the steering of the vehicle is controlled. The manner in which the steering can be controlled, e.g., via control of the rotation of the steering wheel, is known to those skilled in the art. The steering control system is an example of a reactive system which reacts to the determination of an object having a determined identity in the blind spot. Other reactive systems include a system which controls the brakes of the vehicle as well as a system which controls the throttle of the vehicle. As an example, if the object is determined to be a truck, then the steering control may be significantly different than if the object is determined to be a deer. Moreover, the braking control system may, in particular, be controlled based on an identified object when the rear of the vehicle is being monitored.

The application of anticipatory sensors to frontal impact protection systems is shown in FIG. 17 which is an overhead view of a vehicle 70 about to be impacted in the front by an approaching vehicle 71. In a similar manner as in FIG. 15, a transmitter 72 transmits waves 73 toward vehicle 71. These waves are reflected off of vehicle 71 and received by receiving transducers 74 and 75 positioned on either side of transmitter 72.

Figure 18B:
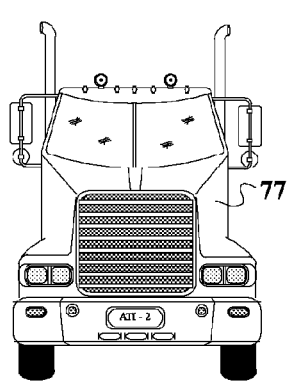
FIG. 18B is a plan front view of the front of a truck showing the headlights, radiator grill, bumper, fenders, windshield, roof and hood.

FIG. 18A illustrates the front of an automobile 76 and shows preferred locations for transmitting transducer 72 and receiving transducers 74 and 75, i.e., the transmitter 72 below the grill and the receivers 74,75 on each side of the grill. FIG. 18A also illustrates the distinctive features of the vehicle which cause a distinct pattern of reflected waves which will differ from that of a truck 77, for example, as shown in FIG. 18B. In some pattern recognition technologies, the researcher must determine the distinctive features of each object to be recognized and form rules that permit the system to recognize one object from another of a different class. An alternative method is to use artificial neural network technology wherein the identification system is trained to recognize different classes of objects. In this case, a training session is conducted where the network is presented with a variety of objects and told to which class each object belongs. The network then learns from the training session and, providing a sufficient number and diversity of training examples are available, the network is able to categorize other objects which have some differences from those making up the training set of objects. The system is quite robust in that it can still recognize objects as belonging to a particular class even when there are significant differences between the object to be recognized and the objects on which the system was trained.

Once a neural network, or combination neural network, has been sufficiently trained, it is possible to analyze the network and determine the "rules" which the network evolved. These rules can then sometimes be simplified or generalized and programmed as a fuzzy logic or neural-fuzzy algorithm. Alternately, a neural computer can be programmed and the system implemented on a semiconductor chip as available from Motorola.

A goal of an anticipatory frontal crash sensor system is to accurately predict the frontal crash severity when an auto accident is about to happen. The system can be thought of as consisting of two parts: Part 1 can use a scanning IR laser, or laser floodlight or spotlight, to detect the presence of any object within the range of interest and to measure the distance and speed of the object; and Part 2 can use a camera to classify the oncoming object (such as car, truck, motorcycle, pedestrian, barrier, pole, etc.). Classification may entail determining which one of a pre-determined identity the object most resembles.

The task of object classification can be divided into the following three subtasks based on the increasing complexity:

1) Static Case—stationary camera vs. moving targets.

2) Half Dynamic Case—moving camera vs. stationary targets.

3) Fully Dynamic Case—moving camera vs. moving targets.

Efficient algorithms are being designed specifically for handling dynamic motion sequences where both the camera and the targets are moving. The algorithms include the following:

Algorithm for calculating motion vector with sub-pixel resolution.

Algorithm for estimating background motion due to motion of the camera.

Fast algorithm for obtaining motion vector field for the entire image.

Algorithm for image segmentation based on motion information alone.

Algorithm for finding the region of sky.

Algorithm for measuring distance of an object with a single camera.

Algorithm for high-speed lane detection.

The anticipatory sensor system preferably should also be able to determine the distance, approach velocity and trajectory of the impacting object in addition to the class of objects to which it belongs. This can be done with acoustic systems since the time required for the acoustic waves to travel to the object and back determines its distance based on the speed of sound. With radar and laser systems, the waves usually need to be modulated, for example, and the phase change of the modulation determined in order to determine the distance to the object as discussed in U.S. Pat. No. 5,653,462. Since the same distance measurement techniques are used here as in above-referenced patent applications, they will not be repeated.

A radar chip is now available that permits the distance determination based on the time required for the radar waves to travel to the object and back. This technology was developed by Amerigon Inc. of Burbank, Calif. and is being considered for other automotive applications such as constant distance cruise control systems and backing-up warning systems.

FIG. 18A is a plan front view of the front of a car showing the headlights, radiator grill, bumper, fenders, windshield, roof and hood and other objects which reflect a particular pattern of waves whether acoustic or electromagnetic. Similarly, FIG. 18B is a plane frontal view of the front of a truck showing the headlights, radiator grill, bumper, fenders, windshield, roof and hood illustrating a significantly different pattern. Neural network pattern recognition techniques using software available from International Scientific Research. of Panama City, Panama can be used to positively classify trucks as a different class of objects from automobiles and further to classify different types of trucks giving the ability to predict accident severity based on truck type and therefore likely mass, as well as velocity. Other software tools are also commercially available for creating neural networks and fuzzy logic systems capable of recognizing patterns of this type.

Figure 19:
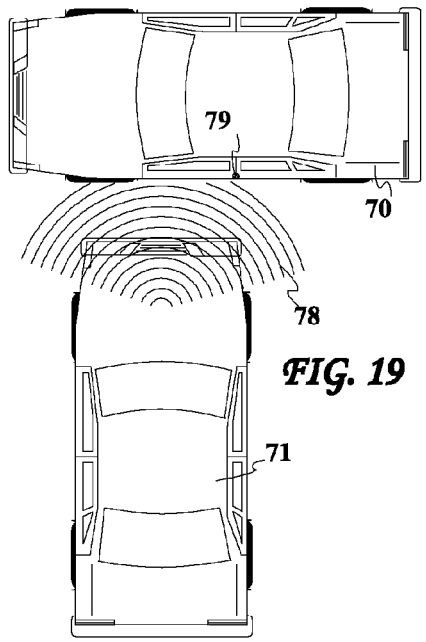
FIG. 19 is an overhead view of a vehicle about to be impacted in the side by an approaching vehicle showing an infrared radiation emanating from the front of the striking vehicle and an infrared receiver part of the anticipatory sensor system.

In FIG. 19, an overhead view of a vehicle 70 about to be impacted in the side by an approaching vehicle 71 in a perpendicular direction is illustrated where infrared radiation 78 is radiating from the front of the striking vehicle 71. An infrared receiver 79 arranged on the side of vehicle 70 receives this radiation for processing as described above.

Figure 20:
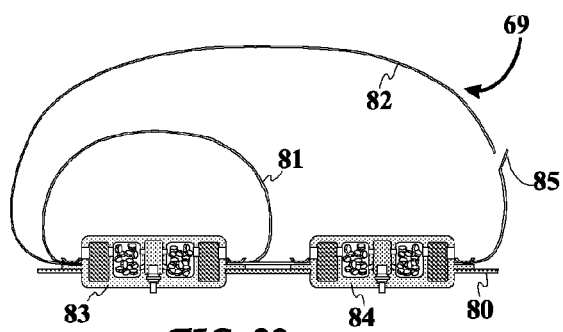
FIG. 20 is a side view with portions cutaway and removed of a dual inflator airbag system with two airbags with one airbag lying inside the other.

The anticipatory sensor system described and illustrated herein is mainly used when the pending accident will cause death or serious injury to the occupant. Since the driver will no longer be able to steer or apply the brakes to the vehicle after deployment of an airbag which is sufficiently large to protect him in serious accidents, it is important that this large airbag not be deployed in less serious accidents where the driver's injuries are not severe. Nevertheless, it is still desirable in many cases to provide some airbag protection to the driver. This can be accomplished as shown in FIG. 20 which is a side view with portions cutaway and removed of a dual inflator airbag system, shown generally as 80, with an airbag 69 which in essence comprises two separate airbags 81 and 82 with one airbag 81 lying inside the other airbag 82. An optional variable outflow port or vent 85 is provided in connection with airbag 520 in a manner known in the art. Although a single inflator having a variable inflation rate capability can be used, FIG. 20 illustrates the system using two discrete inflators 83 and 84 which may be triggered independently or together to thereby provide a variable inflation rate of the airbag 69. Inflator 84 and associated airbag 82 are controlled by the anticipatory sensor system described herein and the inflator 83 and associated airbag 81 could also be initiated by the same system. In a less severe accident, inflator 83 can be initiated also by the anticipatory sensor without initiating inflator 84 or, alternately, inflator 83 could be initiated by another sensor system such as described in U.S. Pat. No. 5,231,253. Each inflator 83, 84 contains standard materials therefor, e.g., an initiator, a gas propellant.

Figure 27:
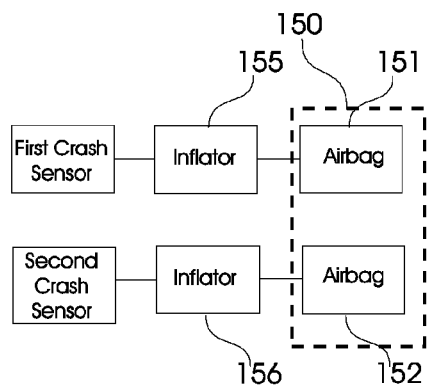
FIG. 27 is a schematic drawing of a variable inflation inflator system in accordance with the invention using two inflators.

Thus, the variable inflation rate inflator system for inflating the airbag 69 comprises inflators 83, 84 for producing a gas and directing the gas into the airbag 69, and crash sensors (as described in any of the embodiments herein or otherwise available) for determining that a crash requiring an airbag will occur or is occurring and, upon the making of such a determination, triggering the inflator(s) 83 and/or 84 to produce gas and direct the gas into the airbag 69 to thereby inflate the same at a variable inflation rate, which depends on whether only inflator 83 is triggered, only inflator 84 is triggered or both inflators 83, 84 are triggered (see FIG. 27).

More particularly, the inflator 84 may be associated with an anticipatory crash sensor to be triggered thereby and the inflator 83 may be associated with the anticipatory crash sensor or another different sensor, such as one which detects the crash only after it has occurred. In this manner, inflator 84 will be triggered prior to inflator 83 and inflator 83, if triggered, will supply an additional amount of gas into the airbag 69.

Figure 28:
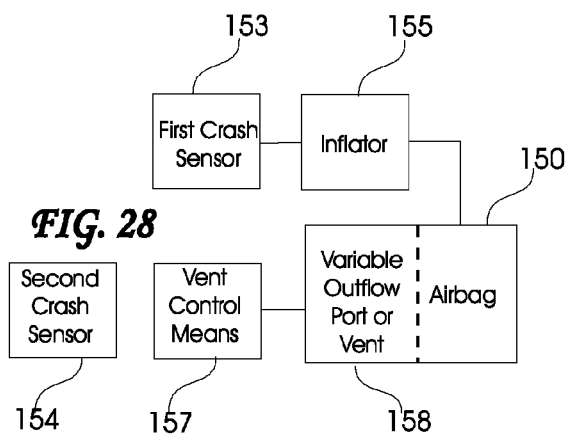
FIG. 28 is a schematic drawing of a variable inflation inflator system in accordance with the invention using a single inflator and a variable outflow port or vent.

Although the description above is based on the use of two inflators, the same result can be obtained through the use of a single inflator and a variable outflow port or vent 158 from the airbag 69 (additional information about a variable outflow port or vent from the airbag 69 is provided in U.S. Pat. No.5,748,473 (FIG. 9)) or a flow control valve controlling the flow into the airbag. Alternatively, a variable gas flow inflator as disclosed in U.S. patent application Ser. No. 11/131,623, now U.S. Pat. No. 7,481,453, can be used. Such an inflator can use a method of controlling the inflator burn rate. A schematic drawing of an embodiment including a single inflator and a variable outflow port or vent from the airbag is shown in FIG. 28. This has the advantage that only a single inflator is required and the decision as to how much gas to leave in the airbag can be postponed.

As shown in FIG. 28, a first crash sensor 153 is an anticipatory sensor and determines that a crash requiring deployment of the airbag 69 is about to occur and initiates deployment prior to the crash or substantially concurrent with the crash. Thereafter, a second crash sensor 154, which may be an anticipatory crash sensor (possibly even the same as crash sensor 153) or a different type of crash sensor, e.g., a crush sensor or acceleration based crash sensor, provides information about the crash before it occurs or during its occurrence and controls vent control mechanism 157 to adjust the pressure in the airbag. The vent control mechanism 157 may be a valve and control system therefor which is situated or associated with a conduit connected to the outflow port or vent 85 at one end and at an opposite end to any location where the pressure is lower than in the airbag whereby opening of the valve causes flow of gas from the airbag through the conduit and valve.

Specifically, the vent control mechanism 157 adjusts the flow of gas through the port or vent 85 in the airbag 69 (FIG. 20) to enable removal of a controlled amount of gas from the airbag 69 and/or enable a controlled flow of gas from the airbag 69. In this manner, the airbag 69 can be inflated with the maximum pressure prior to or substantially concurrent with the crash and thereafter, once the actual crash occurs and additional, possibly better, information is known about the severity of the crash, the pressure in the airbag is lowered to be optimal for the particular crash (and optimally in consideration of the position of the occupant at that moment).

In the alternative, the vent control mechanism 157 can be controlled to enable removal of gas from the airbag 69 concurrent with the generation of gas by the inflator 84 (and optionally 83). In this manner, the rate at which gas accumulates in the airbag 69 is controllable since gas is being generated by inflator 84 (and optionally inflator 83, dependent on the anticipated severity of the crash) and removed in a controlled manner via the outflow port or vent 85.

4.1 Positioning Airbags

Referring again to FIG. 20, when the large airbag 82 is inflated from the driver's door, for example, it will attempt to displace the occupant away from the vehicle door. If the seatbelt attachment points do not also move, the occupant will be prevented from moving by the seatbelt and some method is required to introduce slack into the seatbelt or otherwise permit him to move. Such a system is shown in FIG. 21 which is a perspective view of a seatbelt mechanism where a device releases a controlled amount of slack into seatbelt allowing an occupant to be displaced.

Figure 21:
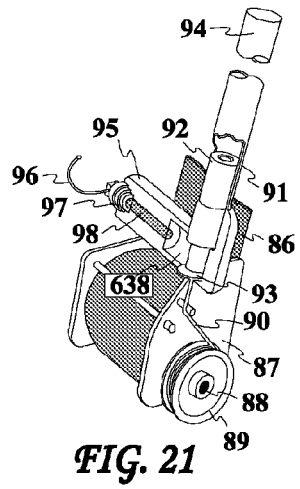
FIG. 21 is a perspective view of a seatbelt mechanism illustrating a device to release a controlled amount of slack into seatbelt allowing an occupant to be displaced.

The seatbelt spool mechanism incorporating the slack inducer is shown generally as 68 in FIG. 21 and includes a seatbelt 86 only a portion of which is shown, a housing 87 for the spool mechanism, a spool 88 containing several wound layers of seatbelt material 86. Also attached to the spool 88 is a sheave 89 upon which a cable 90 can be wound. Cable 90 can be connected to a piston 92 of an actuator 91. Piston 92 is positioned within a cylinder 94 of the actuator 91 so that a space is defined between a bottom of the cylinder 94 and the piston 92 and is able to move within cylinder 94 as described below.

When the anticipatory sensor system decides to deploy the airbag, it can also send a signal to the seatbelt slack inducer system of FIG. 21. This signal is in the form of an electric current which passes through a wire 96 and is of sufficient magnitude to initiate a pressure generating mechanism for generating a pressure in the space between the piston 92 and the cylinder 94 to force the piston 92 in a direction to cause the sheave 89 to rotate and thus the spool 88 to rotate and unwind the seatbelt therefrom. More specifically, the electric current through wire 96 can ignite a squib 97 arranged in connection with a propellant housing 95. Squib 97 in turn ignites propellant 98 situated within housing 95. Propellant 98 burns and produces gas which pressurizes chamber 99 defined in housing 95, which is in fluid communication with the space at a bottom 93 of the cylinder 94 between the cylinder 94 and the piston 92, and pressurizes cylinder 94 below piston 92. When subjected to this pressure, piston 92 is propelled upward within cylinder 94, pulling cable 90 and causing sheave 89 to rotate in the counterclockwise direction as shown in FIG. 21. This rotation causes the spool 88 to also rotate causing the belt 86 to spool off of spool 88 and thereby inducing a controlled amount of slack into the belt and thus permitting the occupant to be displaced to the side.

In some cases, it may not be necessary to control the amount of slack introduced into the seatbelt and a simpler mechanism which releases the seatbelt or prevents it from locking up can be used.

Figure 22A:
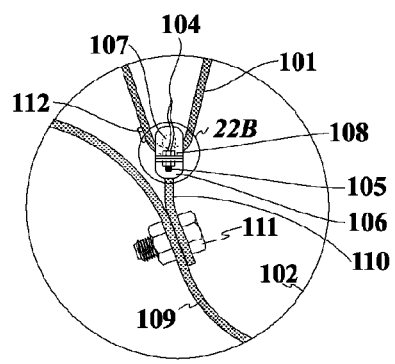
FIG. 22A is an expanded view of the release mechanism within the circle designated 22A in FIG. 22.
Figure 22:
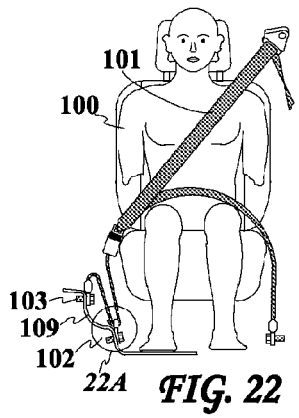
FIG. 22 is a front view of an occupant being restrained by a seatbelt having two anchorage points on the driver's right side where the one is released allowing the occupant to be laterally displaced during the crash.

An alternate system is shown in FIG. 22 which is a frontal view of an occupant 100 being restrained by a seatbelt 101 having two anchorage points 102 and 103 on the right side of the driver where the one 102 holding the belt at a point closest to the occupant 100 is released allowing the occupant 100 to be laterally displaced to the left in the figure during the crash. A detail of the release mechanism 102 taken within the circle 22A is shown in FIG. 22A.

Figure 22B:
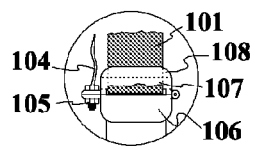
FIG. 22B is a view of the apparatus of FIG. 22A within the circle designated 22B and rotated 90 degrees showing the release mechanism.

The mechanism shown generally as 102 comprises an attachment bolt 111 for attaching the mechanism to the vehicle tunnel sheet-metal 109. Bolt 111 also retains a metal strip 110 connected to member 106. Member 106 is in turn attached to member 108 by means of explosive bolt assembly 105. Member 108 retains the seatbelt 101 by virtue of pin 107 (FIG. 22B). A stop 112 placed on belt 101 prevents the belt from passing through the space between pin 107 and member 108 in the event that the primary anchorage point 103 fails. Upon sensing a side impact crash, a signal is sent through a wire 104 which ignites explosive bolt 105 releasing member 106 from member 108 and thereby inducing a controlled amount of slack into the seatbelt.

Figure 23:
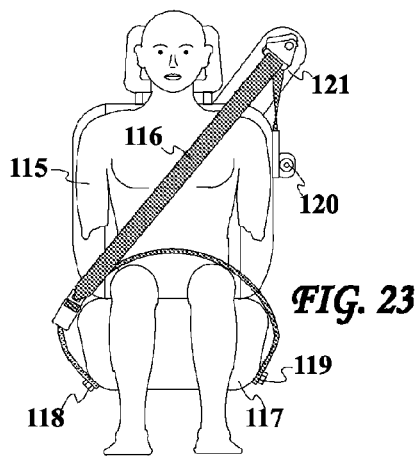
FIG. 23 is a front view of an occupant being restrained by a seatbelt integral with seat so that when seat moves during a crash with the occupant, the belt also moves allowing the occupant to be laterally displaced during the crash.

In some implementations, the vehicle seat is so designed that in a side impact, it can be displaced or rotated so that both the seat and occupant are moved away from the door. In this case, if the seatbelt is attached to the seat, there is no need to induce slack into the belt as shown in FIG. 23. FIG. 23 is a frontal view of an occupant 115 being restrained by a seatbelt 116 integral with seat 117 so that when seat 117 moves during a crash with the occupant 115, the seatbelt 116 and associated attachments 118, 119, 120 and 121 also move with the seat allowing the occupant 115 to be laterally displaced during the crash.

Figure 24A:
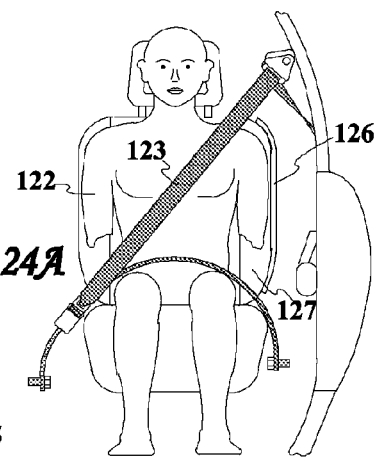
FIG. 24A is a front view of an occupant being restrained by a seatbelt and a linear airbag module attached to the seat back to protect entire occupant from his pelvis to his head.
Figure 24B:
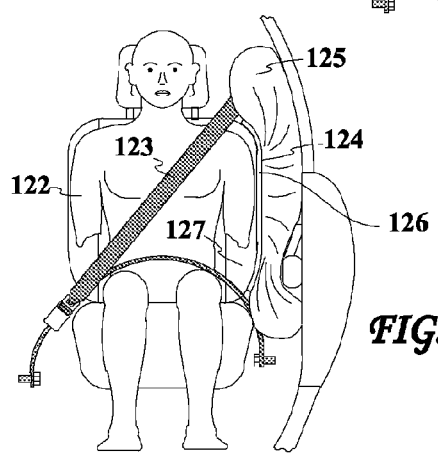
FIG. 24B is a view of the system of FIG. 24A showing the airbag in the inflated condition.

Various airbag systems have been proposed for protecting occupants in side impacts. Some of these systems are mounted within the vehicle seat and consist of a plurality of airbag modules when both the head and torso need to be protected. An illustration of the use of this module is shown in FIGS. 24A and 24B, which is a frontal view of an occupant 122 being restrained by a seatbelt 123 and a linear airbag module 124, of the type described in U.S. Pat. No. 6,905,135, including among other things a housing 126 and an inflatable airbag 125 arranged therein and associated inflator. This linear module is mounted by appropriate mounting devices to the side of seat back 127 to protect the entire occupant 122 from his pelvis to his head. An anticipatory sensor may be provided as described above, i.e., one which detects that a side impact requiring deployment of the airbag is required based on data obtained prior to the crash and initiates inflation of the airbag by the inflator in the event a side impact requiring deployment of the airbag is detected prior to the start of the impact. Airbag module 124 may extend substantially along a vertical length of the seat back 127 as shown, and the airbag 124 in the housing 126 may be attached to the seat-back 127 or integral therewith. A view of the system of FIG. 24A showing the airbag 125 in the inflated condition is shown in FIG. 24B.

Figure 25A:
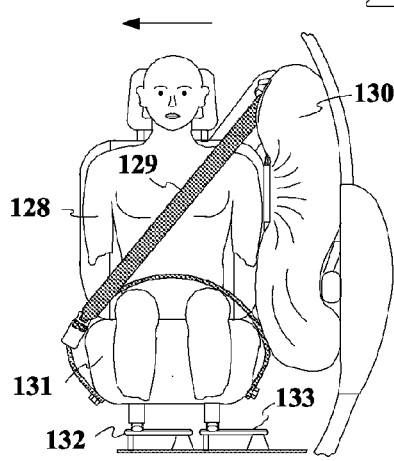
FIG. 25A is a front view of an occupant being restrained by a seatbelt and where the seat is displaced toward vehicle center by the deploying airbag in conjunction with other apparatus.

In FIG. 25A, a frontal view of an occupant 128 being restrained by a seatbelt 129 and wherein the seat 131 is displaced toward vehicle center, i.e., away from the side and side door of the vehicle, by deploying airbag 130 is shown. In this case, the seatbelt 129 is attached to the seat 131 as described above with reference to FIG. 23. In this case, rail mechanisms 132 and 133 permit the seat to be displaced away from the door under the force produced by the deploying airbag 130. Rail mechanisms 132,133 may include a first member having a guide channel and a second member having a projection positioned for movement in the guide channel of the first member.

To enable displacement of the seat 131 and thus the occupant 128 away from the airbag-deploying structure, the door in the illustrated embodiment, by the force exerted on the seat 131 upon inflation of the airbag 130, the rail mechanisms 132,133 are preferably oriented in any direction not perpendicular to the deploying direction of the airbag, i.e., not parallel to the side of the vehicle in the illustrated example. Otherwise, if the orientation of the rails mechanisms 132,133 was parallel to the side of the vehicle and the airbag 130 deployed in a direction perpendicular to the side of the vehicle, the seat 131 would not be moved away from the side door. Obviously, to provide for the fastest possible displacement away from the airbag-deploying structure, the rail mechanisms 132,133 are oriented perpendicular to the airbag-deploying structure, which may also be parallel to the deploying direction of the airbag 130.

Thus, for an airbag mounted in the steering wheel or dashboard and designed to deploy in a frontal impact, the rail mechanisms 132,133 would optimally be oriented in the longitudinal direction of the vehicle. For an airbag mounted in the side as shown in FIG. 25A, the rail mechanisms would optimally be oriented in a direction perpendicular to the longitudinal direction of the vehicle.

Figure 25B:
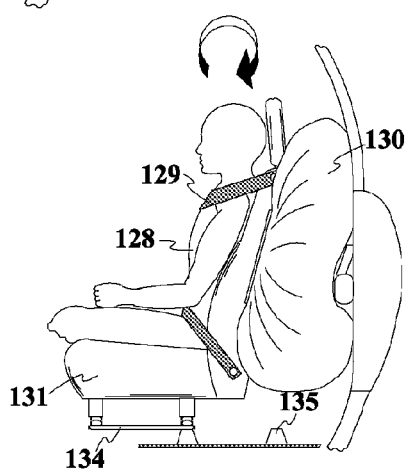
FIG. 25B is a front view of an occupant being restrained by a seatbelt and where the seat is rotated about a vertical axis in conjunction with other apparatus.

In FIG. 25B, a frontal view of an occupant 128 being restrained by a seatbelt 129 and wherein the seat 131 is rotated toward vehicle center, i.e., substantially about an axis perpendicular to a horizontal plane of the vehicle, by deploying airbag 130 is shown. In this case, the seatbelt 12 is attached to the seat 131 as described above with reference to FIG. 23. In this case, rail mechanisms 134 and mounting locations 135 permit the seat to be rotated away from the door under the force produced by the deploying airbag 130. This figure is shown with the occupant rotated 90 degrees from initial position, this amount of rotation may be difficult for all vehicles. However, some degree of rotation about the vertical axis is possible in most vehicles with appropriate redesign of the vehicle seat and passenger compartment. Rail mechanisms 134 may include a first member having a curved guide channel and a second member having a projection positioned for a curving or rotational movement in the guide channel of the first member.

As shown in FIG. 25B, the seat 131 is rotated in a clockwise direction so that the occupant is facing inward during the rotation. The rail mechanism 134 can be designed to rotate the seat 131 counterclockwise as well as along any rotational path. For example, in a frontal impact, it might be desirable to rotate the occupant toward the adjacent side door to enable the occupant to exit the vehicle via the side door and/or be extracted from the vehicle via the side door. Otherwise, if the occupant were to be rotated inward, the seat back would be interposed between the occupant and the side door and might hinder egress from the vehicle and extraction of the occupant from the vehicle after the crash.

Figure 25C:
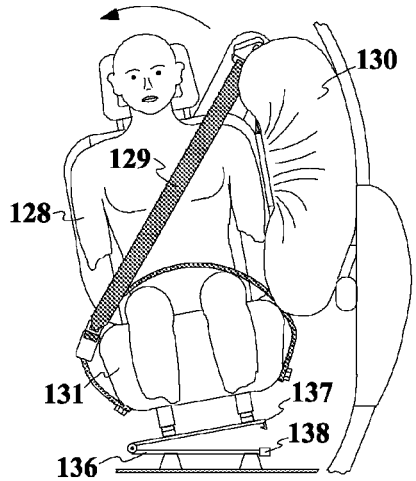
FIG. 25C is a front view of an occupant being restrained by a seatbelt and where the seat is rotated about a longitudinal axis in conjunction with other apparatus.

In an alternate case where there is sufficient space for the occupant's legs and feet, the seat 131 can be rotated as shown in FIG. 25C, i.e., substantially about an axis oriented in a longitudinal direction of the vehicle. The rotating mechanism comprises a hinged assembly of two plates 136 and 137, with plate 136 attached to the vehicle floorpan and plate 137 attached to the vehicle seat 131. The two plates are held together by a suitable clamp 138 which is released by the sensor at the same time the airbag is deployed. Other means for tilting the seat 131 or enabling rotation of the seat 131 about the vehicle yaw axis or roll axis are also envisioned to be within the scope of the invention.

The displacement of the seat 131 by the force exerted by the airbag upon its inflation or deployment is thus very useful for increasing the distance between the occupant and the site of the impact, whether it is a side impact, frontal impact or even a rear-impact.

Displacement of the seat 131 could also be useful in rollover situations where the occupant could benefit from such a rotation or displacement depending on the nature of the rollover. Such a system could aid in preventing the occupant's head or other body part from being partially ejected out of the passenger compartment. Thus, a rollover sensor, which can be one or more gyroscopes and/or accelerometers or even an IMU (inertial measurement unit), could replace the crash sensor for this purpose. Upon detection of a rollover, an action could be taken to inflate an airbag and enable movement of the seat when the force exerted by the inflation of the airbag is effective on the seat. One or more of the seat displacement enabling system could be incorporated into the vehicle so that one or more of these systems can be activated upon the detection of a rollover, depending on which motion of the seat and occupant would best benefit the occupant.

Some of the techniques disclosed above may not work well for some of today's small vehicles. They are more applicable in vans, sport utility vehicles, some small trucks and some minivans with some modifications. For these and other vehicles, an externally deployed airbag may be an alternate solution or both can be used together.

4.2 Exterior Airbags

Once an anticipatory sensor system is in place, it becomes possible to consider deployment of an airbag external to the vehicle. This possibility has appeared in the automobile safety literature in the past but it has not been practical until the impacting object can be identified and/or an assessment of the probable severity of the accident made. For prior art systems, it has not been possible to differentiate between a plastic sand-filled construction barrier or a cardboard box, for example, neither of which would result in a serious accident (and thus airbag deployment would not be required) and a concrete pillar, tree or wall which would likely result in a serious accident (and thus airbag deployment would be required). With the development of the pattern recognition systems described herein, and in the above referenced patents and patent applications, this problem has been solved and the use of an external airbag now becomes feasible. It is important to recognize that the effect of an unwanted deployment of an external airbag is much less severe that for an internal airbag. In the external case, the driver should be able to continue to operate the vehicle which is generally not the case for an internal airbag.

Assessment of the probable severity of the impact is preferably accomplished using one or more of the pattern recognition techniques disclosed herein, whereby the identity, size or another property of the object about to impact the vehicle (or with which the vehicle is about to impact) is determined using the pattern recognition technique and the identification or determination of the object's size is considered before initiating deployment of the airbag. In this manner, upon appropriate training of the pattern recognition algorithm, if the vehicle is about to strike a large cardboard box, it will be identified as such and airbag deployment will not occur. On the other hand, if the vehicle is about to strike a large truck, it will be identified as such and airbag deployment will occur. In the prior art, no such differentiation was made about the object involved in the impact based on remote sensing, i.e., sensing prior to impact.

Figure 26A:
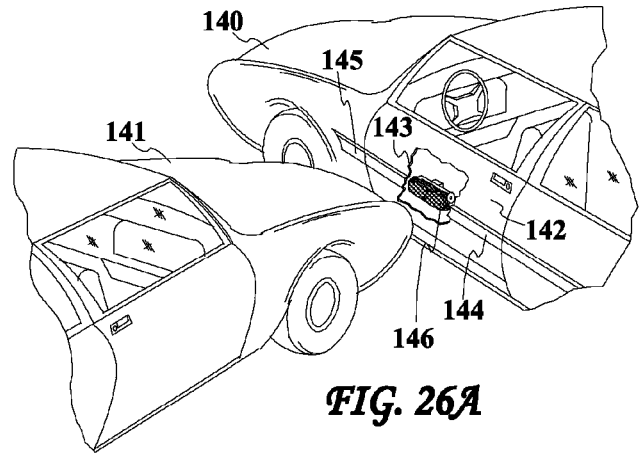
FIG. 26A is a perspective view with portions cutaway and removed of a vehicle about to impact the side of another vehicle showing an airbag stored within the side door of the target vehicle prior to being released to cushion the impact of the two vehicles.

Such a system adapted for side impact protection is shown in FIG. 26A which is a perspective view with portions cutaway and removed of a vehicle 140 about to be impacted in the side by another vehicle 141. An airbag module is shown generally as 146 mounted to the side door of the vehicle 140 prior to inflation of an airbag 147 arranged in the airbag module 146. A portion of the side door of vehicle 140 has been cutaway to permit viewing of the airbag module 146. The vehicle 140 contains a strong support beam 144 arranged in a longitudinal direction of the vehicle at least partially within the side door(s) 142 and which provides a reaction surface along with the vehicle door 142 for the airbag. Upon initiation by the anticipatory sensor, a deployment door, not shown, is opened in an external door panel 143 by any of a number of methods such as pyrotechnically, permitting the airbag 147 to emerge from the vehicle door 142 as shown in FIG. 26B, the airbag 147 being inflated by an inflator responsive to the detection by the anticipatory sensor that a side impact requiring deployment of the airbag is required.

Figure 26B:
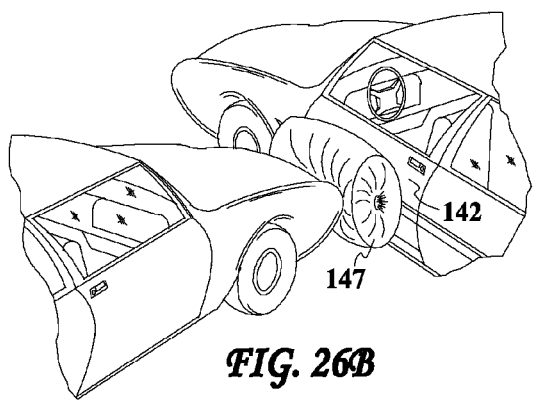
FIG. 26B is a view of the apparatus of FIG. 26A after the airbag has deployed.

Through a system such as illustrated in FIGS. 26A and 26B, the accident can be substantially cushioned prior to engagement between the vehicle and the impacting object. By this technique, an even greater protection can be afforded the occupant especially if an internal airbag is also used. This has the further advantage that the occupant may not have to be displaced from behind the steering wheel and thus the risk to causing an accident is greatly reduced. It also may be the only system which will work with some of today's small vehicles. The anticipatory sensor system could determine whether the impact is one which requires deployment of only the external airbag 147 or one which requires deployment of both the internal airbag and the external airbag 147.

Although the description of FIGS. 26A and 26B relates to side impact protection, it is understood that the same concept can be used for frontal impacts and rear impacts and rollover situations. That is, the location of the airbag 147 is not limited to locations along the side of the vehicle, nor to the side door.

An anticipatory sensor system can thus be installed all around the vehicle, with multiple externally deployable airbags, whereby in use, when a determination is made that an object is about to impact the vehicle, only the airbag(s) which will inflate between the vehicle and the object, and which will cushion the impact, is/are inflated.

Figure 29A:
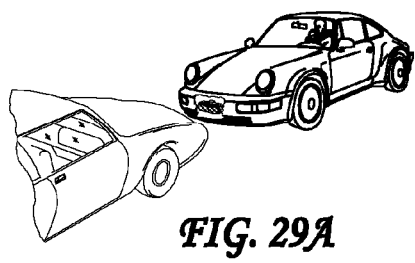
FIG. 29A shows a situation where a vehicle equipped with an externally deployable airbag for frontal impact protection is about to impact another vehicle.
Figure 29B:
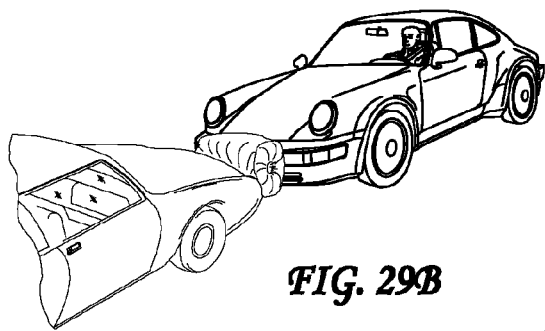
FIG. 29B shows the condition of the vehicles of FIG. 29A at impact.

For example, FIGS. 29A and 29B show an externally deployable airbag mounted at the front of a vehicle so as to provide frontal impact protection. The airbag may be mounted in a housing or module in and/or proximate the bumper, fender, grille, or other part at the front of the vehicle. By using anticipatory sensing and/or exterior object identification as discussed above, the airbag is deployed prior to or at the moment of impact.

Figure 30A:
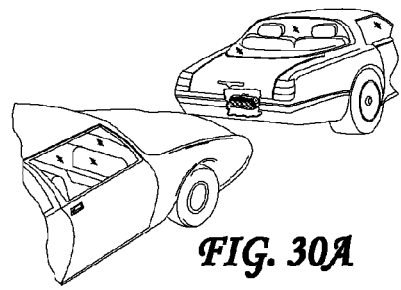
FIG. 30A shows a situation where a vehicle equipped with an externally deployable airbag for rear impact protection is about to be impacted by another vehicle.
Figure 30B:
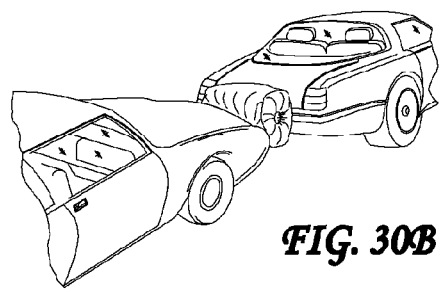
FIG. 30B shows the condition of the vehicles of FIG. 30A at impact.

FIGS. 30A and 30B show an externally deployable airbag mounted at the rear of a vehicle so as to provide rear impact protection. The airbag may be mounted in a housing or module in and/or proximate the bumper or another part at the rear of the vehicle. By using anticipatory sensing and/or exterior object identification as discussed above, the airbag is deployed prior to or at the moment of impact.

4.3 Pedestrian Protection

Figure 31A:
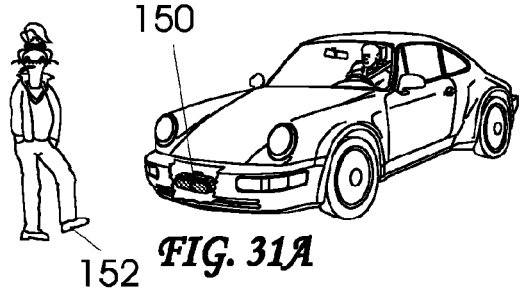
FIG. 31A shows a situation where a vehicle equipped with an externally deployable airbag for frontal impact protection is about to impact a pedestrian.
Figure 31B:
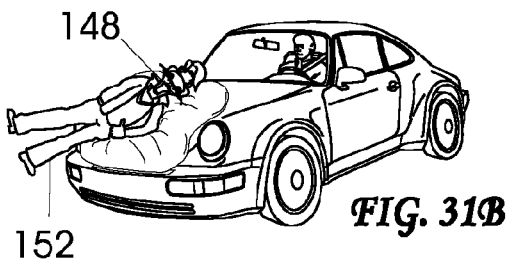
FIG. 31B shows the condition of the vehicle and pedestrian of FIG. 31A at impact.

FIGS. 31A and 31B show an externally deployable airbag mounted at the front of a vehicle for a situation where pedestrian protection is obtained. The airbag 148 may be mounted in a housing or module 150 in and/or proximate the bumper, fender, grille, or other part at the front of the vehicle. By using anticipatory sensing and/or exterior object identification as discussed above, the airbag 148 is deployed prior to or at the moment of impact to protect the pedestrian 152. It can be seen by comparing FIG. 29B and FIG. 31B that the airbag for pedestrian protection deploys over the hood of the vehicle instead of in front of the vehicle. Appropriate positioning and dimensioning of the airbag 148 may allow the trajectory of the struck object, i.e., the pedestrian 152, to be controlled. In a similar manner, an airbag for pedestrian impact protection at the rear of a vehicle would (when the vehicle is backing up) be arranged to deploy over the trunk instead of rearward as shown in FIG. 30B.

In this embodiment, the anticipatory sensor system can be designed to sense an approaching pedestrian or animal and deploy the airbag to cushion the pedestrian's or animal's impact against the vehicle.

In other designs reported in the literature, the hood is raised and/or an airbag is deployed to cushion the impact of a pedestrian with the windshield. In none of these systems is an anticipatory sensor used and thus they are of marginal value especially for higher speed pedestrian impacts. The sensors used are relatively crude contact sensors that, is some cases, attempt to distinguish the legs of a pedestrian from a rigid pole, for example (see WO02098715). An alternate approach uses an ultrasound in a tube design that stretches along the front bumper and/or a fender of the vehicle which is fully resettable and when the ultrasound signal attenuation pulse is used along with a knowledge of the vehicle velocity, the pulse can be normalized based on the vehicle velocity and analyzed by a variety of deterministic or pattern recognition methods such as a neural network. Other sensor technologies are also applicable including a time domain reflectometer and a fiber optic bundle of transmitters and receivers randomly terminating and in a foam matrix such that as the bundle is compressed, the transmitters and receivers get closer together and more light is coupled from the some transmitters to some receivers. Additionally, capacitive and other proximity sensors can also be used.

Of particular interest is what is done with the impacted pedestrian. There has been no attention paid to this critical part of the accident. The inventor herein believes that once a pedestrian has been impacted, all measures need to be taken to protect the pedestrian from further injury without causing the driver of the vehicle to lose control of the vehicle. One method would be to use the change of the hood angle and perhaps an airbag to not only cushion the impact of the upper torso and head of the pedestrian but to also help control his or her trajectory. Additionally, a net should be deployed, anchored forward in a module or housing in the vehicle (which may be a housing in the same location in which the airbag 148 is housed 150 as shown in FIG. 31A, i.e., along the front of the vehicle), and projecting up so as to catch the pedestrian 152 and hold him or her to the vehicle while the vehicle comes to a safe stop. The net should provide sufficient stretch so to gradually bring the pedestrian up to the vehicle speed while causing a minimum of further injuries. Current practice is to toss the pedestrian into the air and leave him or her to impact with the ground and perhaps be run over by another vehicle.

When using a net, the pattern recognition system described above which identifies the object as being one of a plurality of different, pre-determined identities, e.g., as a human pedestrian, as an animal and as a cyclist, may be further arranged in the anticipatory sensor system to control deployment of the net based on the identity of the object. For example, deployment of the net to catch or capture the object would only be initiated when the object is a pedestrian or cyclist but would not be deployed when the object is an animal.

Missing from all of the papers and patents which discuss the pedestrian detection problem is any discussion of why a pedestrian should be sensed and if so what are the requirements for such sensing and what will be the result if a pedestrian is sensed. Based on sensing contact of the pedestrian with some portion of the vehicle, which is clearly too late for many scenarios, two concepts have been disclosed in patents related to pedestrian protection which involve raising hood of the vehicle and deploying an airbag in the vicinity of the windshield.

The raising of the hood is supposed to reduce the head impact forces and thus injury on the pedestrians head and similarly the airbag should do the same. Looking at the reduction in distance that the pedestrian's head would travel between a raised hood and a hood in its normal position, it is difficult to see how much protection is afforded by this concept. A pedestrian probably reaches his maximum rotational velocity soon after being struck and before his head moves very far.

Similarly, an airbag positioned by the windshield where the pedestrian would impact after he or she has impacted the hood similarly raises questions as to how effective this would be. If the hood were raised substantially so that the pedestrians head struck the hood at a lower velocity, the driver would not be able to see the road and it could cause a more serious accident.

An airbag which deployed over the entire hood where the pedestrian is likely to impact would be preferable; however, this would require an anticipatory sensor which has been discussed above. It still might be desirable to raise the hood somewhat so as to minimize the impact of the pedestrian with the windshield. However this probably could be accomplished by a properly designed external airbag. The goal of this airbag would be to cushion the blow of the pedestrian against the vehicle and additionally to affect his or her trajectory, as partially discussed above.

Once the pedestrian has impacted the vehicle and if the vehicle is going at a substantial velocity, the pedestrian is likely to slide up and over the vehicle or possibly slide off to one side or the other. In either case, the pedestrian is now going to be subjected to a second impact with the roadway. Thus even if the pedestrian survives the first impact he or she is likely to be seriously injured by the second impact and possibly even run over by a following vehicle.

To prevent the second impact, the pedestrian must not leave the striking vehicle and therefore the pedestrian must be captured and somehow attached to striking vehicle until the vehicle can come to rest. Thus, the hood-located air bag should try to modify the trajectory of the pedestrian to channel him or her so that he or she goes axially with the vehicle. In order to capture the pedestrian at this point some sort of net, or similar device or structure, can be deployed to catch the pedestrian and prevent him or her from being subjected to a second impact with the roadway. This net should be deployed from as far forward in the vehicle as possible. It also must be designed so that it gets support from a position further back in the vehicle to prevent the net containing the pedestrian to leave the top of the vehicle and slide down a side.

Let us now look at some timing scenarios. It is estimated that to raise the hood of a vehicle would require approximately 100 milliseconds. To deploy an airbag of the type described above would probably take also about 100 milliseconds. To deploy a net similar to that described above would probably take in excess of 250 milliseconds. Of course none of these actions would be taken unless the system was virtually one hundred percent sure that the object that the vehicle is about to strike is a pedestrian. False positives cannot be tolerated as they could cause the vehicle to have an accident. If the system is designed for a worst case scenario, the timing for making a deploy decision should be based on a velocity such as 60 mph. Other philosophies could be selected provided a detailed study shows that the probability of a 60 mph pedestrian impact is close to zero. Let us start with the 60 mph assumption and see what the implications are for timing and accuracy of the system.

Assuming 300 milliseconds are necessary to deploy the net, airbag and hood rise or other appropriate system, a final decision to deploy the system would have to be made when an object is approximately 10 meters away in front of the vehicle for a vehicle traveling approximately 60 mph. This provides 50 milliseconds for an image to be acquired and analyzed. To summarize, the system requirement for a single image system is that there can be no false positives and as high an accuracy of detection as possible for an object 10 meters from the vehicle if a total of 50 milliseconds is provided for acquiring the image and analyzing the data. Detection accuracy under these circumstances, as believed by the inventor, should be higher than 95% and preferably higher than 99%.

Naturally, there is additional information that can be used to improve the accuracy of the system. However, the single frame accuracy requirement cannot be dismissed since there are numerous situations where a pedestrian can seemingly appear out of nowhere such as when a vehicle is making a relatively sharp turn or passing an obstacle to the road that blinds the driver until the object is quite close to the host vehicle. Another example is a car which suddenly swerves out of a lane because of a pedestrian standing in the lane.

Other information is of course available to the system much of the time. For example if a pedestrian is detected even with low probability of classification at one hundred meters from the vehicle, then the vehicle can begin slowing down. This will permit a larger number of images to be acquired before the pedestrian time-to-contact is less than 300 milliseconds. This extra information certainly should be used to improve the detection accuracy. However, there are many situations where a car is turning and a pedestrian comes in view which temporarily is in the path of the vehicle but soon is not. This pedestrian protection system would become very unpopular if the vehicle began breaking in every such situation. Of course if the vehicle had an accurate map onboard and knew precisely its location, then it would know that as long as it stayed on the road that it would not impact the pedestrian. Early detection of a pedestrian also can give the driver or an appropriate system time to change the course of the vehicle and, if this is done by a vehicle control system, knowledge of the road geometry and the obstacles in the vicinity of the pedestrian and the vehicle would have to be accurately known.

Two other issues must be considered. The first relates to where the vehicle is being driven. Most of the related art papers assume that the vehicle would be driving in an urban area and thus generally at lower speeds where there is a large number of opportunities to impact pedestrians. Under such driving conditions, there should be a lower impact velocity at which the hood rising, airbag and/or net would not be deployed. A five mile per hour impact with a pedestrian can still cause serious injury to the pedestrian but the pedestrian's velocity may not be sufficient to require deployment of the pedestrian catching net.

In rural settings however, many types of animals can appear in the path of a vehicle and these must not be confused as being pedestrians. Certainly, no driver would want to catch a large deer in a net on top of his or her car. Thus, the imaging system used must be able to distinguish animals from humans. This can be especially difficult for a deer which is facing the vehicle on a road since it can have a similar shape and thermal emission as a human. Pre-crash maneuvering and breaking would be appropriate in rural settings when there is any object in the path of the vehicle. Once again however this situation can be significantly improved if the path of the vehicle is known. This would avoid the problem of a deer on the side of curving road.

There are many methods of detecting pedestrians as discussed above and all are contemplated by the inventor herein. Among others these include the use of radar, terahertz, or any frequencies in the IR portion of the spectrum as well as the visual portion. One preferred solution is to use a near infrared frequency such as SWIR (above 1.4 microns) in the form of a laser spotlight which would pass eye safety requirements as discussed above and in the referenced patents. This laser spotlight coupled with range gating permits the easy segmentation of objects in the scene and thus the rapid classification using the modular neural network or combination neural network system available from International Scientific Research.

When the entire scene is being observed or where the range gate is set for maximum-to-minimum range, then an image containing multiple objects can occur and the objects to be analyzed first can be segmented by reducing the maximum range gate until a single object is left. In contrast to the Shashua paper referenced above, a preferred approach herein could be to feed the entire image in the region of interest into an edge detection algorithm and then into a first neural network for rough classification followed by other neural networks for more precise classification. Alternatively, the entire image containing multiple objects of interest can be fed to an edge detection algorithm and then to a neural network having multiple outputs which would return approximate identities of all of the objects in the image into different outputs slots. The neural network would output that there is a likely pedestrian centered at pixel 32,128 and a vehicle at pixel 200,100 or some other such output. The system can then concentrate on the object which would be the most threatening to human life until that object has been positively identified and eliminated as a threat, or all objects can be treated simultaneously depending on the computational power of the system.

It is envisioned that the features of the side impact protection systems, rear impact protection systems, frontal impact protection systems, and pedestrian impact protection systems can be used interchangeably to the extent possible. Thus, features of the side impact protection systems can be used for rear, frontal and pedestrian impact protection.

4.4 Rear Impacts

The impact of a vehicle into another resulting in whiplash injuries, although rarely fatal, is the most expensive accident. This problem and methods of solving it are discussed in U.S. Pat. No. 6,784,379 and its related applications, all of which are incorporated herein by reference. For anticipatory sensors disclosed herein and used for rear impacts, since the severity of an impact can be predicted, they can initiate deployment of resettable systems for lower severity accidents and of non-resettable systems such as airbags in higher severity accidents. Resettable systems include, for example, seatbelt tensioners and headrest movement systems such as described in JP2003-112545 and U.S. Pat. No. 5,580,124, and elsewhere.

4.5 Positioning of Out-of-Position Occupants

In another embodiment of the invention using an anticipatory sensor system, a deploying airbag is used to position the occupant. That is, an airbag is arranged and designed to move only a part of the occupant, not necessarily the seat, so as to make room for deployment of another airbag. For example, a shoulder or thorax airbag could be deployed based on a determination from an anticipatory sensor system that a crash is imminent and a determination from an interior monitoring system that the occupant's head is resting against the window. The deploying shoulder or thorax airbag would serve to push the occupant's head away from the window, making room for the deployment of a side curtain airbag between the window and the person's head. Such positioning airbags could be strategically arranged in the vehicle to move different parts of an occupant in a specific direction and then deployed based on the position the occupant is in prior to the impact to change the occupant's status of "out-of-position" vis-à-vis airbag deployment to "in-position".

Figure 32A:
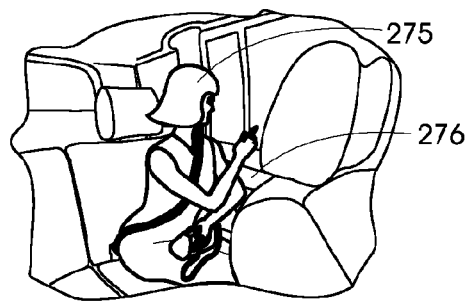
FIGS. 32A, 32B and 32C show one use of positioning airbags in accordance with the invention wherein a passenger is shown leaning against a door in FIG. 32A, a positioning airbag deploys to move the passenger away from the door as shown in FIG. 32B and a side curtain airbag is deployed when the passenger has been moved away from the door as shown in FIG. 32C.
Figure 32B:
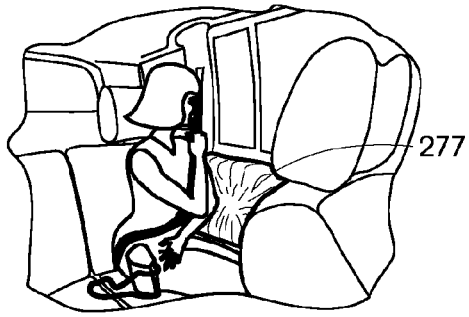
Figure 32C:
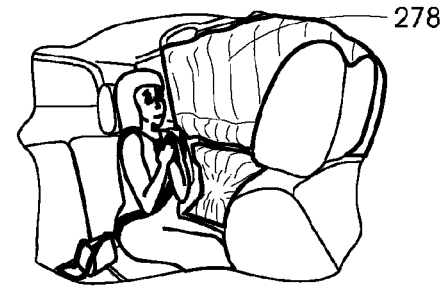

An example of the use of positioning airbags in accordance with the invention is shown in FIGS. 32A, 32B and 32C wherein a passenger 275 is shown leaning against a door 276 in FIG. 32A, a positioning airbag 277 deploys from the door 276 to move the passenger 275 away from the door 276 as shown in FIG. 32B and a side curtain airbag 278 is deployed, e.g., from a location above the window, when the passenger 275 has been moved away from the door 276 as shown in FIG. 32C. Ideally, the passenger 275 or a part thereof would be moved a sufficient distance to enable effective deployment of the side curtain airbag while preventing injury. Such a positioning airbag can be initiated by an anticipatory sensor as taught herein.

Using a positioning airbag, the positioning airbag is preferably deployed before the main airbag or side curtain airbag. Deployment of the positioning airbag could be initiated based on anticipatory sensing of an object about to impact the vehicle, and/or in conjunction with an interior monitoring system or occupant position sensor which would sense the position of the occupant or a part thereof and determine the need to move the occupant or a part thereof to enable deployment of the main airbag or side curtain airbag, or at least to make the deployment more effective. Deployment of the positioning airbag(s) could also be based on an actual detection of a crash involving the vehicle by crush-based sensors or acceleration-based sensors and the like. Determination of the position of the occupant can lead to assessment of a situation when the occupant is out-of-position for deployment and must be moved into a better position for deployment of the main or side curtain airbag. A "better" position for deployment being a position in which the occupant is able to receive more of the benefits of the protective cushion and/or movement prevention provided by the main or side curtain airbag. Positioning airbags can be especially useful for cases where a relatively slow rollover event is taking place in order to position an occupant for a side curtain airbag deployment.

The use of positioning airbags is also particularly suited for rollovers. In a rollover situation, a vehicle 170 can move sideways toward a curb or highway barrier 171 (FIG. 33A) and then strike the barrier 171 (FIG. 33B). Upon impact with the barrier 171, the driver 172 is forced toward the driver-side window 173 while the vehicle 170 begins to rollover. At this time, as shown in FIG. 33C, the side curtain airbag 174 deploys downward. However, since the driver 172 is against the window 173, the side curtain airbag 174 may actually deploy inward of the driver 172 thereby can trap the driver 172 between the side curtain airbag 174 and the window 173. Typically the window 173 breaks so that the head of the driver 172 may actually be forced through the broken window. When the vehicle 170 completes the rollover, the driver 172 is forced against the ground and may be seriously injured if not killed (FIG. 33D).

To remedy this situation, the invention contemplates the use of one or more positioning airbags. As such, as shown in FIG. 34B, when the driver 172 is detected to be against the window 173 or simply displaced from a position in which the side curtain airbag 174 will be properly deployed, a positioning airbag 175 is deployed. Such detection of the position of the occupant may be made by any type of occupant sensor including but not limited to a proximity sensor arranged in the door. As shown in FIG. 34B, the positioning airbag 175 is arranged in a door of the vehicle 170 and deploys inward. The positioning airbag 175 may also be arranged in the side of the seat or in the side of the vehicle other than in a door. Also, the positioning airbag 175 can be controlled to deploy whenever deployment of the side curtain airbag 174 is initiated. That is, it is possible to provide a sensor for detecting when side curtain airbag 174 will deploy (for example a rollover sensor) and once such deployment is authorized, the positioning airbag 175 will be deployed prior to deployment of the side curtain airbag 174 to ensure that the driver is properly positioned (See FIGS. 34C and 34D). In this case, the activation mechanism of the positioning airbag 175 is coupled to the control device of the side curtain airbag 174.

Although a side curtain airbag has been illustrated in the various figures herein, this same invention applies when an inflatable tube or tubular airbag, such as manufactured by Simula Inc. of Arizona, is used for retention of an occupants head within the vehicle. Thus, for the purposes herein, a side curtain airbag will encompass such inflatable tube or tubular airbags or equivalent. Similarly, although they have not been widely used up until now, other systems employing nets have been proposed for this purpose and they are also contemplated by this invention.

In one typical embodiment, the positioning airbag will always be deployed in rollover accidents when the curtain or tubular airbag is deployed and an occupant position sensor is not used. Similarly, the side curtain or tubular airbag is also usually deployed even in side impacts where there is no rollover as it provides protection against the occupant's head striking the intruding vehicle. There is even a strong motivation for deploying both side positioning and curtain or tubular airbags for frontal impacts as control over the position and motion of the occupant is improved.

Finally, although it is desirable to deploy the positioning airbag first, in many cases both airbags are deployed at the same time and the fact that the positioning airbag will deploy more rapidly is relied on to prevent the entrapment of the occupant's head outside of the window. The flow of gas into the curtain airbag can be controlled to facilitate this effect.

In a frontal crash when a frontal protection airbag is used, the direction of deployment of the positioning airbag would be substantially perpendicular to the direction of deployment of the frontal airbag. That is, the positioning airbag would deploy in a direction away from the door laterally across the vehicle whereas the main airbag would deployed in a longitudinal direction of the vehicle. The positioning airbag would thus move the occupant laterally to obtain the benefits of the deployment of the frontal airbag. However, the angle between the deployment direction of the positioning airbag and the deployment direction of main or side curtain airbag can vary. In fact, it is conceivable that the deployment directions are the same whereby if an occupant is too close to the deployment door or location of the main airbag, then a smaller positioning airbag is deployed to push the occupant away from the deployment door and only once the occupant is sufficiently distant from the deployment location is the main airbag deployed. Monitoring of the position of the occupant is useful to determine when the positioning airbag need to be deployed and if and when the occupant is moved a sufficient distance by the deployment of the positioning airbag so as to be positioned in a proper position for deployment of the main or side curtain airbag. The rate of deployment of the positioning airbag and the amount of inflation gas used to deploy the airbag can be varied depending on the size and position of the occupant (as determined by occupant sensors for example) and the severity of the crash.

The timing of the deployments of the positioning airbag and main airbag, or the positioning airbag and side curtain airbag, can take into account the distance the occupant must be moved, i.e., the position of the occupant. This can ensure that the occupant is not moved too far by the positioning airbag out of the range of protection provided by the main airbag. The timing can thus be based on the position and/or weight of the occupant. The timing of the deployments can also or alternatively be based on the characteristics or properties of the occupant, i.e., the morphology of the occupant. For example, different deployment scenarios can be used depending on the weight of the occupant since a lighter occupant would move faster than a heavier occupant.

The rate of deployment of the main or side curtain airbag can also be varied so that it deploys more slowly than the positioning airbag. As such, the positioning airbag will have its positioning effect first and only thereafter will the main or side curtain airbag have its protective effect. The rate of deployment of the airbags can be varied in addition to the timing of the deployments.

Although the use of positioning airbags is described above with reference to FIGS. 34A-34D for a driver, it is understood that such positioning airbag can be used for each seating location in the vehicle. Also, one airbag can be used for multiple seating locations, for example, seating locations on the same side of the vehicle.

The manner in which the positioning airbag is deployed is illustrated in FIG. 35 wherein the first step is to detect a rollover or other crash situation at 240. Such detection may be based on anticipatory crash sensing. The occupant's position (present or future) may then be determined or monitored at 241. For multiple occupants, the position of each occupant can be determined at that time or it is conceivable that the occupant's position at a set time in the future is extrapolated, for example, based on the occupant's current position and velocity, the occupant's position in the immediate future can be calculated using the equation that the future position equals the current position plus the velocity times the time differential. A determination is made at 242 whether the occupant is "out-of-position" which in the rollover situation would be too close to the window. If not, then the side curtain airbag is deployed at 243. If yes, a positioning airbag is deployed at 244 to move the occupant into an appropriate position for deployment of the side curtain airbag. Optionally, the occupant's position can be determined after deployment of the positioning airbag at 245 or extrapolated based on the imparted velocity to the occupant from the deploying positioning airbag. If the position of the occupant is proper for deployment of the side curtain airbag or will be proper for the deployment of the side curtain airbag, then the side curtain airbag is deployed at 243.

Positioning airbags can be arranged at different locations throughout the vehicle with each one designed to move one or more occupants in a desired direction. A control unit for the positioning airbags, which may be a processor coupled to a crash sensor system (anticipatory or other) and occupant position determining system, determines which positioning airbag(s) are to be deployed based on the position of the occupant(s).

The general components of an apparatus for deploying multiple airbags in accordance with the invention are shown schematically in FIG. 36. A crash and/or rollover sensor system 180 is arranged on the vehicle and may include one or more anticipatory crash sensors, crush crash sensors, acceleration-based crash sensors or rollover sensors based on gyroscope(s), an IMU or angle sensors. An occupant position/velocity sensor system 181 is arranged on the vehicle to monitor the presence and position of the occupants and optionally determine the velocity of the occupants. The sensor system 181 can be any known system in the prior art including those disclosed in the assignee's U.S. patents reference above. Sensor system 181 can also include sensors which measure a morphological characteristic or property of the occupant such as the occupant's weight. The crash sensor system 180 and occupant sensor system 181 are coupled to a processor/control unit 182. Control unit 182 receives input from the crash sensor system 180 as to an expected crash involving the vehicle (when the crash sensor system 180 includes an anticipatory sensor) or an actual crash or rollover involving the vehicle. Control unit 182 determines which protective airbags need to be deployed, if any, to protect the occupants. Such protective airbags include the side curtain airbag on the left side of the vehicle 183, the side curtain airbag on the right side of the vehicle 184, the front airbag on the left side of the vehicle 185, the front airbag on the right side of the vehicle 186, and others. Control unit 182 also determines whether any of the positioning airbags 1-4 (elements 187A-187D) need to be deployed prior to and/or in conjunction with the deployment of the protective airbags. Although generally the positioning airbags are deployed prior to the deployment of the protective airbags in order to properly position an occupant, the positioning airbags could be deployed whenever the vehicle experiences a crash or rollover to provide some added cushioning. Positioning airbag 1 could be associated with the side curtain airbag on the left side of the vehicle and effective to move the occupant(s) away from the left side of the vehicle. Positioning airbag 2 could be associated with the side curtain airbag on the right side of the vehicle and effective to move the occupant(s) away from the right side of the vehicle. Positioning airbags 3 and 4 would serve to deploy to position the occupants for deployment of the respective frontal airbags.

Control unit 182 can determine the timing of the deployment of the positioning airbag and associated protective airbag, i.e., the time differential between the initiation of the inflation which will be optimum to allow the occupant time to be moved by the positioning airbag into position to be protected by the protective airbag. Control unit 182 can also determine the rate of inflation of the positioning and protective airbags, when such airbags are provided with the capability of variable inflation rates. In this case, the protective airbag may be deployed at the same time as the positioning airbag (or possibly even before) but the protective airbag inflates more slowly than the positioning airbag. Control unit 182 can also factor in the morphology of the occupant to be protected when determining the inflation parameters, i.e., the timing difference and rate of inflation. This is useful since weight of the occupant affects the occupant's movement, i.e., a heavier occupant will be moved more slowly than a lighter occupant. In some cases more gas will be allowed to flow into the airbag for heavier people than for lighter people.

5. Agricultural Product Distribution Machines

Referring now to FIGS. 37-46, embodiments of vehicles in accordance with an invention herein including a new ground speed sensor will be described. The ground speed sensor is designed to more accurately detect the speed of travel of the vehicle on the ground than in prior art constructions discussed above. Specifically, the ground speed sensor in accordance with the invention accounts and compensates for pitching of the vehicle and/or slipping of the wheels which would provide an incorrect ground speed using prior art constructions.

Generally, the ground speed sensor is mounted on a frame of the vehicle and includes a wave transmitter or emitter and wave receiver. The wave transmitter or emitter directs waves at an angle from the vertical plane so that the waves impact the ground and reflect from the ground back to the wave receiver. A processor or other type of computational device considers the information about the transmission or emission of the waves and the reception of the waves and calculates the speed of travel of the vehicle on the ground based on the information. The information may be the frequency of the transmitted and received waves, the time of transmission and the time of reception of the waves and other similar parameters. The speed of travel of the vehicle on the ground may be determined based on a plurality of time intervals between transmission of waves and reception of waves. The processor can also be designed to determine the speed of travel of the vehicle on the ground based on a measurement of the Doppler frequency.

The ground speed sensor may be used with various agricultural machinery and construction equipment as described below. Once the ground speed is determined, the agricultural machinery can be controlled to distribute product based in part on the ground speed or the construction machinery can be operated based in part on the ground speed.

Compensation for pitching of the vehicle may involve mounting collocated transmitter and receiver on the frame to move in a curve about a center of rotation of the vehicle upon pitching of the vehicle. The absolute pitching angle of the vehicle is measured and a reference angle is also measured with the pitching angle of the vehicle relative to the ground being the difference between the absolute pitching angle and the reference angle. The reference angle may be measured using a gravity or tilt sensor. The absolute pitching angle of the vehicle may be measured by a two antenna GPS receiver.

Various constructions of the wave transmitter and receiver may be used including those discussed above. For example, the wave transmitter may comprise one or more laser diodes, a pulsed laser and a continuous laser beam directing infrared light to scan in a line. In the latter case, a transmitter control unit controls the scanning laser beam of infrared light such that the infrared light traverses an area of the ground near the vehicle. The wave receiver may comprise a single pixel receptor, a CCD array, a CMOS array, an HDRC camera, a dynamic pixel camera and/or an active pixel camera.

The wave transmitter and receiver can be designed to transmit ultrasonic waves, radar waves and infrared waves among others. In the latter case, a notch filter may be used for filtering light other than infrared light emitted by the wave transmitter. A light valve can also be used as the wave receiver.

Referring now to FIG. 37, a known product distribution machine 190 generally includes a frame, at least one tank, bin or other storage compartment 191 for holding product to be distributed, and a distribution system or other conveying mechanism 193 to transmit the product to a desired location such as the field. A driving mechanism 192 passes the product from the storage compartment 191 to the conveying mechanism 193. The storage compartment 191, driving mechanism 192 and conveying mechanism 193 may be mounted on the frame or may constitute the frame.

Referring now to FIGS. 38 and 39, the control unit of the product distribution machine 190 generally includes a microprocessor 194, which enables the driving mechanism 192 to run automatically. The agricultural product distribution machine 190 is towed by a vehicle (not shown) in a field onto which product must be applied. In one embodiment of the invention, the microprocessor 194 receives command signals from a ground speed sensor 195 and from a user interface 196. The ground speed sensor 195 detects the ground speed or forward speed of the tractor, not shown, that is towing the agricultural product distribution machine 190 across the field.

The user interface 196 allows the operator to monitor and set various parameters relating to the process, such as application rate, location in the field, implement widths, calibration numbers, and the like. Some of the process parameters can be changed through controls or operator settings 197.

The operator settings 197 on the user interface 196 may be buttons or any other input device, such as keys on a keypad, switches, levers, or the like, mouse pad or even voice input. The user interface 196 is positioned in such a way that an operator can control the system while the agricultural product distribution machine 190 is traveling on the field. The user interface 196 can comprise a display and a console situated in the cab of the tractor towing the agricultural product distribution machine 190.

The ground speed and the data from the user interface 196 are processed by the microprocessor 194. Upon processing, the microprocessor 194 activates the driving mechanism 192 that, in turn, drives product from the storage compartment 191 into the conveying mechanism 193 at a controlled rate output 198.

During operation, the driving mechanism 192 runs automatically at a dispensing rate calculated based on the detected ground speed, on the operator settings, and on other process specific parameters. Therefore, the controlled rate output 198 varies with the rate data input to compensate for ground speed fluctuations and to produce a consistent application of the product onto the field.

The system in accordance with the invention assumes that detailed meter-by-meter variation in the distribution of the product onto the field is not required. Instead, the goal is the most even distribution of product as possible. Under these assumptions, normally the farmer will try to be certain that every part receives the optimum amount of product and thus he will tend to slightly over apply product in order to account for the inaccuracy in the ground speed sensor 195 for the case where it over calculates the true ground speed. On the other hand, when the wheels are slipping, even more product will be dispensed per linear meter. Thus, in normal operation there will be an uneven distribution of product and it will tend to result in the consumption of an excess of product. Under these assumptions, by practicing the invention, the farmer will save money as now he will not have to over-dispense product on average and in particular when the wheels are slipping. In the other case where the farmer truly dispenses the right amount of product on average but the distribution is uneven under the prior art system, he will be penalized with inferior yield and thus lose money at harvest time compared with what he will receive when practicing this invention.

The invention will be described next in the context of three preferred embodiments: air seeding systems, precision planters, and sprayers. The person skilled in the art will recognize that the present invention may be embodied in other types of product distribution machines.

Air Seeders

FIGS. 39 and 40 depict an air seeder or air cart 200 (which is an agricultural product distribution machine 190) embodying the present invention. The air cart 200 includes an air distribution system 203 (which is a conveying mechanism 193). The air cart 200 also includes a seeding tool 210, which may be a series of ground openers. The air distribution system 203 includes a manifold 204, and in some embodiments, a series of hoses. The air cart 200 can be attached to a vehicle, such as a tractor, or it can be built as an integral part of a vehicle. The air cart 200 includes one or more tanks 202 (which constitute a storage compartment) to hold products like seed and fertilizer. The air cart 200 also includes a driving mechanism 192. The driving mechanism 192 includes a metering system 207 to deliver the appropriate amount of product to the air distribution system 203, and a fan 205.

The metering system 207 controls the dispensing rate of product from the tanks 202 into the air distribution system 203. The dispensing rate of the metering system 207 determines the application rate of product onto the field.

Referring now to FIG. 40, the metering system 207 includes a metering wheel 208 designed to dispense product at a predetermined rate. As product passes through the metering system 207, it is carried by airflow provided by the fan 205 through the manifold to headers 206, where the product is split into several runs and then passes through the ground opener or seeding tool 201 and into the furrow created by the ground opener or seeding tool 201.

The metering system 207 is driven automatically by a variable rate drive mechanism. In the case of a metering wheel 208, the variable rate drive mechanism will rotate the metering wheel 208 at various rates. Many designs of variable rate drive mechanisms are known in the art and can be used in embodiments of the present invention.

The air cart 200 also comprises sensing equipment, including a ground speed sensor 212 for detection of the ground speed of the air cart 200. Thus, variations in the ground speed of the air cart 200 may be taken into account when calculating the application rate, so that seeds can be dispensed evenly. The accuracy with which the seeds are distributed depends on the accuracy of the ground speed sensor 212 as discussed above.

FIG. 41 is a block diagram of a system in accordance with the present invention as it applies to seeders and planters. The microprocessor 211 receives signals from the ground speed sensor 212 and the user interface 213, such as the desired rate, the implement width and the calibration value. A feedback loop returns to the microprocessor 211 the rotation rate of the metering wheel 208 at any moment (the RPM from the meter/singulator 214 which is comparable to the metering wheel 208). Based on this information, the microprocessor 211 calculates the desired rate at any moment and commands the metering wheel 208 to rotate at the desired rate. As previously indicated, the user interface 213 comprises operator setting buttons 197.

Planters

Like the air seeders, planters have several tanks for holding seed or fertilizer, and an air distribution system comprising a series of hoses. Product travels through the hoses, entering through a series of inlets into several chambers for storing the product. In one embodiment, each chamber has joined to it a fingered singulator disk. Each chamber is located just above a corresponding ground opener. The singulator disk rotates such that as each finger passes the place where product puddles into the chamber, a single seed/fertilizer falls into the finger. The disk continues to rotate such that each subsequent finger can pick up product. The filled fingers pass a brush that eliminates the chance of multiple seeds being in a single finger. The filled fingers pass another opening in the disk when the product is dropped onto an elevator opening that carries the product to the ground opener.

The driving mechanism 192 of the planters can operate in a mode as previously discussed. FIG. 41 applies to planters, as well as, seeders.

The driving mechanism 192 of the planter is activated into rotating the singulator disk 214 at the controlled rate output 370. In this mode, the controlled rate output 198 is a function of the operator settings and of the detected ground speed.

Sprayers

Referring now to FIG. 42, a basic sprayer is depicted. Generally, a sprayer has at least one storage compartment 221 for chemicals. In an embodiment of the invention, the compartment 221 contains a pre-mixed chemical ready for distribution. In an alternative embodiment, the compartments 221 store only water and, as the water travels through the distribution lines 223, the water is injected with the correct amount of chemical. The required gallons/acre ratio is known and programmed into a microprocessor 211, connected to the user interface 213 in the cab of the tractor towing the sprayer. The gallons/acre ratio is dependent upon the type of crop, the type of chemical, the position in the field, and the like. A pump 224 pushes the product into the distribution lines 223. As product is pushed into the distribution lines 223, it travels down at the flow rate necessary to dispense the required gallons/acre out of the nozzle on the spray bar. During this process, the entire system automatically remains pressurized at the appropriate level. The flow rate is dependent upon the ground speed of the sprayer.

In FIG. 43, the invention is shown applied to a vehicle speed detection system incorporated in a tracklaying vehicle such as a bulldozer. This vehicle speed detection system comprises a Doppler and displacement-measuring sensor 226 mounted on a rear part (e.g., ripper frame) of the vehicle body of a bulldozer 225 at a level h. The Doppler and displacement-measuring sensor 226 transmits an electromagnetic or ultrasonic wave beam 228 toward the ground 227 at a specified beam depression angle θ and receives a reflected wave from the ground 227. The ground speed of the bulldozer 225 is calculated based on these transmitted and received waves. The normal variation in the mounting angle is normally around φ=±5 degrees.

Referring now to FIGS. 44A and 44B which illustrate the logic of the correction executed in the vehicle speed detection system to eliminate the influence of the pitching angle of the vehicle.

FIG. 44A shown the relationship between the horizontal speed (v) of the vehicle 225 and the speed of the vehicle 225 in the direction that the waves are transmitted and is described by v cos(θ). Therefore, the relationship between Doppler shift frequency Δf and the vehicle speed v is described by the following equation (2), which is basically the same equation as (1).

$$\Delta f = 2fV\cos(\theta)/C \qquad (2)$$

where:

f is transmission frequency, and

C is electromagnetic wave propagation velocity.

In this embodiment, the sensor 226 moves in a curve about the center of rotation of the vehicle 225 when the vehicle 225 pitches. To this end, the sensor 226 is movably mounted to a frame of the vehicle 225.

The pitching movement rotates the sensor 226 changing its effective transmission angle relative to the ground 227. If the angle of the vehicle 225 relative to the ground 227 is known due to pitching, then the angle θ can be corrected and the Doppler velocity determined. This can be accomplished using an angular rate sensor as described in U.S. Pat. No. 6,230,107 or by using a tilt sensor such as manufactured by Frederick.

However, an angular rate sensor only measures the change in the pitch angle and therefore it requires that a reference be provided such as by a gravity or tilt sensor, otherwise the results are inaccurate. Even using the tilt sensor poses problems as to when the sensor is giving an accurate reading in the presence of frequent and rapid angular motions. Pitch can also be accurately measured if a two antenna GPS receiver is present but then the system begins to get expensive. This is not a totally illogical solution, however, since GPS receivers are rapidly becoming less expensive as they are put in cell phones to satisfy federal 911 mandates. Of course, all of these solutions fail if the vehicle is operating on a hill unless an accurate map is available. What is desired is the velocity of the vehicle relative to the ground even if the ground is sloping.

The present invention solves this problem by measuring both the Doppler velocity and the distance that the transmitted waves travel to the ground 227 and return. By knowing this distance, which is the hypotenuse of the measurement triangle and by knowing the angle that the sensor transmits relative to the vertical axis of the vehicle 225, the measurement triangle is determined and the pitching angle of the vehicle 225 can be determined, assuming that the rear portion of the track or the rear wheels are touching the ground, and the transmission angle corrected to give an accurate velocity of the vehicle 225 independently of whether the vehicle 225 is traveling on level ground or a hill.

FIG. 44B illustrates the case of a counterclockwise pitch of the vehicle and where the vehicle is traveling up a hill. The distance X to the reflecting ground 227 is measured based on time-of-flight or phase relationships as discussed above and the measurement triangle determined. The base altitude of the triangle can be calculated as $X \sin(\theta)$ and the altitude as $X \cos(\theta)$ and then the pitch angle $\theta$ from $\tan(\theta)=(X \cos(\theta)-h)/X \sin(\theta)$. The new transmission angle $\theta'$ then is $\theta+\phi$ (for angles positive clockwise) permitting a corrected calculation of the velocity of the vehicle 225.

In some cases, it is desirable to add a compass such as a fluxgate compass or a Honeywell HMR3000 magnetic compass manufactured by Honeywell. This addition makes it possible to also accurately know the heading of the agricultural vehicle and can allow some location information of where the vehicle is on the field. This then permits control of product distribution by location on the field in a much less expensive, although not as accurate, method as the Beeline system discussed above. The device is not shown in the figures but can be added as a component on a printed circuit board that contains other related components. In some cases, it would be mounted elsewhere to minimize the effects of metallic parts of the vehicles.

Although pitch has been the main focus herein, a similar system can also be used to measure roll of the vehicle if it sends and receives radiation to the side of the vehicle. When the compass as discussed above and a dual system as described here is used, all of the angles, pitch, yaw and roll as well as the vehicle displacements (and thus velocities and accelerations) can be determined and a sort of low cost inertial measurement unit has been created.

The speed sensing system or sensors 231 and 232 in accordance with the present invention is shown installed on an agricultural vehicle 230 in FIG. 45. The sensors 231 and 232 are installed high on the tractor so as to keep them away from contaminating dirt and other contaminants. The sensors 231 and 232 include transducers and are built such that their transducers emit signals along a respective path 233 and 234 that are nominally each at an angle $\theta$ with the ground of approximately 35 degrees. The vehicle is moving at a velocity V.

The sensors 231,232 may be installed on a frame of the agricultural vehicle 230 or on any of the parts of the agricultural vehicle 230 which may thus constitute the frame. That is, the agricultural vehicle 230 may include a storage compartment for storing product to be distributed, a conveying or distribution mechanism for dispensing the product to a field and a driving mechanism for conveying the product from the storage compartment to the distribution mechanism at a controlled rate. The sensors 231,232 may be mounted on the storage compartment, on the distribution mechanism and on the driving mechanism so that all of these could constitute the frame of the vehicle 230.

Figure 46:
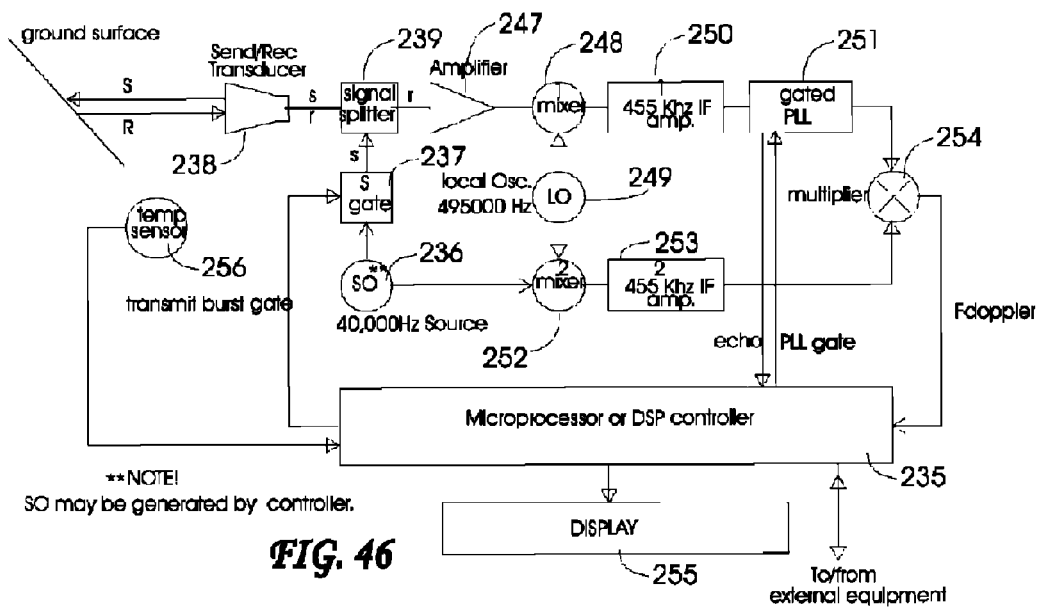
FIG. 46 is a block diagram for an ultrasonic distance and speed detector.

FIG. 46 shows a block diagram of an ultrasonic velocity and distance to ground sensor 231,232 in accordance with one embodiment of the invention. The microprocessor or DSP, the processor 235, generates a 40 KHz continuous signal (SO) from source 236 that is gated for a burst by gate 237 controlled by the processor 235. The burst is typically 16 cycles to allow the transducer 238 to reach full output in amplitude. The output of the gate 237 is fed through a signal splitter 239 to the Send/Receive transducer 238. The echo signal R from the ground is converted to a voltage by the Send/Receive transducer 238. This R signal is sent to the signal splitter 239 and then to an amplifier 247. The amplifier 247 drives a mixer 248 which mixes the LO (local oscillator) 249. The output of the mixer 248 goes to a 455 KHz intermediate frequency (IF) amplifier 250. The output of the IF amplifier 250 is connected to a gated PLL (phase locked loop) 251. This loop 251 is gated ON for lock during the received echo time. The output of the PLL 251 contains the IF frequency plus the Doppler frequency and is input to a multiplier 636.

The SO source 236 and the LO 249 are inputs to mixer 252, the reference channel. The output of mixer 252 drives an IF amplifier 253. The output of the amplifier 253 is provided to the multiplier 254 so that the output of the multiplier 254 is the product of IF1 and IF2. The output of the multiplier 254 will be the sum and difference of the two frequencies. The sum is then filtered out and the difference is the Doppler frequency. The Doppler frequency is measured by the microprocessor or DSP 235 and is scaled to indicate the speed in MPH or other convenient units.

The wheel slip of the tractor can be calculated, if desired, by taking the difference of the wheel speed and the ground speed by inputting the wheel speed into the to/from external equipment input of the microprocessor or DSP 235.

The IF amplifiers 250,253 have a narrow bandwidth to filter out noise from the echo signal. The IF signal has more cycles than the burst by the ratio of 455000/40000 or (11.375). This is important so that there are sufficient cycles for the PLL 251 to lock onto. For a 16 cycle 40 KHz burst, the number of cycles for PLL lock is 182 plus the ringing cycles. The PLL 251 filters out and averages the frequency of the echo. The PLL output runs at the frequency of IF1 until the next sample to the PLL 251.

A display 255 is provided coupled to the microprocessor or DSP 235 and displays the information obtained from the sensor.

The frequency of 455 KHz was selected because of the many ceramic filters that are available for this frequency. The IF bandwidth is determined by the IF amplifiers 250, 253. The drive level for the Send/Receive transducer 238 is high to maintain the best signal to noise ratio. Other frequencies of the IF amplifiers 250, 253 can be used in accordance with the invention.

The circuit can be made very compact by using surface mount components. All of the circuitry except the transducer drive operates at 3.3 volts.

The speed of sound varies significantly with air temperature and to a lesser extent with altitude. Compensation for the temperature effect can be achieved through measuring the ambient temperature via temperature sensor 256 coupled to the microprocessor or DSP 235 and calculating the value of the sound velocity, C, as is well known in the art. Similarly, a barometric sensor can be used to measure the atmospheric pressure and its effect on the speed of sound can also be calculated as is also known in the art. Alternately, a second ultrasonic transducer can be placed within the field of the first transducer but at a known displacement and the speed of sound can be measured. The measured or calculated value for C would then be used in the calculations of equations (1) or (2).

Thermal gradients caused by the sun heating the ground can also have a significant effect on the returned waveform. This problem has been solved and is disclosed in U.S. Pat. No. 6,517,107.

Finally, wind can also affect the system by causing density changes in the air and diffracting the sound waves in much the same way as thermal gradients. The techniques for solving the thermal gradient problem such as through the use of a logarithmic compression circuit will also correct for this effect. To the extent that wind shortens the time for the waves to travel to the ground in one direction, it will lengthen that time in the other direction and the two effects cancel. A strong side-wind can deflect the path of the sound waves and create an increased path to and from the ground and thus introduce an error. Normally this is small since the wind velocity is normally small compared with the speed of sound. In rare cases where this effect needs to be considered, an anemometer can also be incorporated into the system, and coupled to the microprocessor or DSP 235, and the wind speed can then be used to correct for the path length of the ultrasound waves.

6. Distance Measurement

Figure 47:
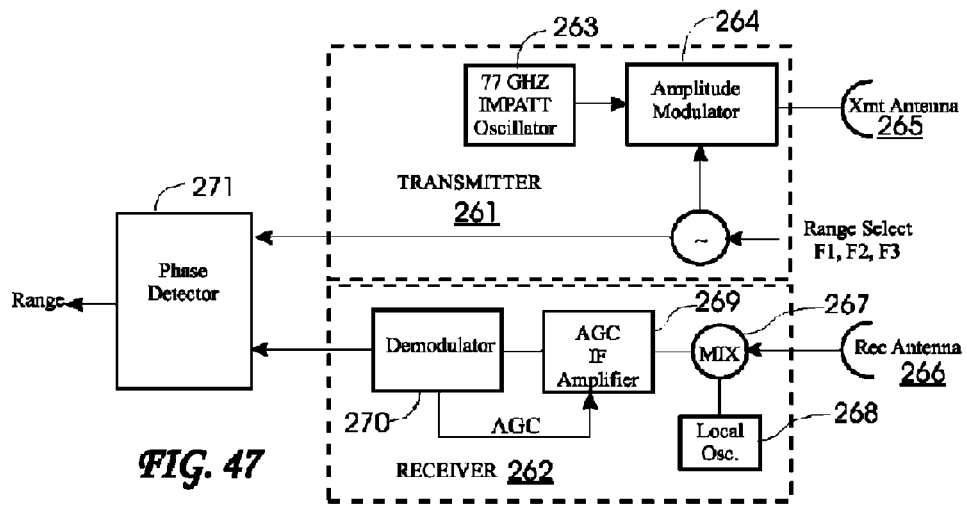
FIG. 47 is a schematic of a circuit for use in determining the distance to object.

What follows is a discussion of a particular distance measuring design. FIG. 47 shows a circuit 260 of a distance sensor which is also capable of use in any of the embodiments disclosed herein for determining the distance between the sensor and an object. For example, with reference to the embodiments disclosed in FIGS. 37-46, the sensor can be used as a distance-to-ground sensor for determining the distance between the mounting location of the sensor and the ground.

The circuit 260 operates on a radar frequency and includes a transmitter 261 and a receiver 262. The transmitter 261 includes a 77 GHz IMPATT oscillator 263 providing a signal to an amplitude modulator 264. The amplitude modulator 264 also receives a signal indicative of a selected range F1, F2 or F3 and then directs a transmission of a signal at a specific frequency from a transmitting antenna 265. The receiver 262 includes a receiving antenna 266 which receives a signal reflected from an object, wherein it is desired to determine the distance between the sensor (in which the transmitting antenna 265 and the receiving antenna 266 are mounted) and the object.

Receiver 262 also includes a mixer 267 provided a signal by a local oscillator 268 which combines the signal from the receiving antenna 266 and the local oscillator 268 and feeds the combined signal to an AGC IF amplifier 269. The amplifier 269 amplifies the signal and feeds the amplified signal to a demodulator 270, with a feedback loop being formed to the amplifier 269. Optionally, the receiver 262 can be set up with an AFC loop for auto-tuning purposes. In this case, the frequency drift of the IMPATT oscillator 263 will have little or no effect on the operation of the circuit 260.

The signal from the demodulator 270 and the selected frequency range are fed to a phase detector 271 which derives the distance between the sensor in which the circuit 260 is embodied and the object based on the detected phase difference. From successive distance measurements, the velocity of the object can be determined.

Advantages of the circuit 260 are that it is a relatively simple circuit which can be constructed from readily available electronic components.

7. Scanners

In addition to rotating and vibrating mirror-based and the acousto-optic-based scanners discussed above, a development by Texas Instruments called Digital Light Processing (DLP®) provides the opportunity for the control of a laser or other light beam for scanning within or outside on a vehicle that is unprecedented. Using DLP technology, a laser beam can be divided into up to 1 million separately addressable and pointable beams each with a two-dimensional scanning angle of plus or minus 12 degrees and a scanning rate of 40 KHz. Using the systems described above for locating ROIs, a group of beams, with each beam just below the eye safety limit, can be directed to monitor a particular object in the field of view. Thus if 10,000 pixels are allocated for each object in the field of view, up to 100 such objects can be tracked with high resolution. Similarly, for internal vehicle applications, the occupants of all vehicle seating positions can be monitored and tracked even during a vehicle crash with few pixels monitoring uninteresting objects. When the window or door is closing, for example, a group of pixels can be aimed at the window or door to see that there are no arms, legs or fingers in the path of the closing door or window. In fact, many of the monitoring operations discussed in U.S. Pat. No. 7,164,117 and its related applications, all of which are incorporated herein by reference, can be effectively accomplished with the DLP technology (see dlp.com for a description of the technology). Although the scanning angles are limited to 24 degrees, this angle can be arbitrarily increased using lenses and/or mirrors as is well known to those skilled in the art. Many additional applications for DPL technology for automotive uses will now become evident to those skilled in the art because of the disclosure herein including vehicle-to-vehicle or vehicle-to-infrastructure communication systems using DLP principles. A key invention herein is thus any use of DLP technology on any vehicle for scanning, pointing, imaging and communication applications.

8. Summary 8.1 Exterior Monitoring

There has thus been shown and described a monitoring system for monitoring the exterior of the vehicle using an optical system with one or more CCD or CMOS arrays and other associated equipment which fulfills all the objects and advantages sought after.

More particularly, described above is a method for determining the identification and position of objects exterior to a vehicle which comprises transmitting optical waves into the space surrounding the vehicle from one or more locations, and comparing the images of the exterior of the vehicle with stored images of objects external to the vehicle to determine which of the stored images match most closely to the images of such objects such that the identification of the objects and their position is obtained based on data associated with the stored images. The optical waves may be transmitted from transmitter/receiver assemblies positioned at one or more locations around the exterior of the vehicle such that each assembly is situated where it has a good view of a particular space near the vehicle. Each assembly may comprise an optical transmitter (such as an infrared LED, an infrared LED with a diverging lens, a laser with a diverging lens and a scanning laser assembly, an infrared floodlight, or other light source) and an optical array (such as a CCD array and a CMOS array). The optical transmitter may operate in the eye-safe part of the electromagnetic spectrum. The optical array is thus arranged to obtain the images of the exterior of the vehicle represented by a matrix of pixels. The output from each array can be compared with a series of stored arrays representing different objects using optical correlation techniques. Preferably, a library of stored images is generated by positioning an object near the vehicle, transmitting optical waves toward the object from one or more locations, obtaining images of the exterior of the vehicle, each from a respective location, associating the images with the identification and position of the object, and repeating the positioning step, transmitting step, image obtaining step and associating step for the same object in different positions and for different objects in different positions. This is similar to the training and adaptation process described in U.S. Pat. No. 6,529,809.

One of the advantages of the invention is that after the identifications and positions of the objects are obtained, one or more systems in the vehicle may be affected based on the obtained identification and position of at least one of the objects. Such systems include a visual and/or audio warning system to alert the driver to the presence, position and/or velocity of objects in the blind spots as well as a system for adjusting the turning resistance of the steering wheel to prevent movement by the driver into the path of an object. Another system could be associated with the turning indicators to provide an alarm if a turning signal is activated when an object is present in the blind spot which would interfere with the intended turn.

The image comparison may entail inputting the images or a part or form thereof into a neural network, combination neural network, or other pattern recognition system that provides for each image, an index of a stored image that most closely matches the inputted image. The index is thus utilized to locate stored information from the matched image including, inter alia, a locus of the center of the front of the object and an appropriate icon for display purposes. To this end, a display could be provided in the passenger compartment or through the use of a heads-up display to provide a visual overview of the environment surrounding the vehicle. The icons could be general icons of objects in general or more specific icons indicative of the type of vehicle, etc. Moreover, the position of the object relative to the vehicle may be determined so that an action by the driver of the vehicle that might result in an accident is prevented. It is also possible to obtain information about the location of the object from the image comparison and adjust the position of one or more of the rear view mirrors based on the location of the object. Also, the location of the object may be obtained such that an external light source may be directed toward the object to permit a better identification thereof.

In addition, the location of the locus of the center of the object exterior to the vehicle may be monitored by the image comparison and one or more systems in the vehicle controlled based on changes in the location of the locus of the center of the object exterior to the vehicle over time. This monitoring may entail subtracting a most recently obtained image, or a part thereof, from an immediately preceding image, or a corresponding part thereof, and analyzing a leading edge of changes in the images or deriving a correlation function which correlates the images with the object in an initial position with the most recently obtained images.

In another method for determining the identification and position of objects external to the vehicle in accordance with the invention, optical waves are transmitted into a space near the vehicle from a plurality of locations, a plurality of images of the exterior of the vehicle are obtained, each from a respective location, a three-dimensional map of the exterior of the vehicle is created from the images, and a pattern recognition technique is applied to the map in order to determine the identification and position of the objects. The pattern recognition technique may be a neural network, fuzzy logic or an optical correlator or combinations thereof. The map may be obtained by utilizing a scanning laser radar system where the laser is operated in a pulse mode or continuous modulated mode and determining the distance from the object being illuminated using time-of-flight, modulated waves and phase measurements with or without range gating. (See for example, H. Kage, W. Freemen, Y Miyke, E. Funstsu, K. Tanaka, K. Kyuma "Artificial retina chips as on-chip image processors and gesture-oriented interfaces", Optical Engineering, December 1999, Vol. 38, Number 12, ISSN 0091-3286.)

In a method for tracking motion of a vehicle in accordance with the invention disclosed above, optical waves are transmitted toward the object from at least one location, a first image of a portion of the space exterior of the vehicle is obtained, the first image being represented by a matrix of pixels, and optical waves are transmitted toward the object from the same location(s) at a subsequent time and an additional image of the particular space exterior of the passenger compartment is obtained, the additional image being represented by a matrix of pixels. The additional image is subtracted from the first image to determine which pixels have changed in value. A leading edge of the changed pixels and a width of a field of the changed pixels is determined to thereby determine relative movement of the object from the time between which the first and additional images were taken. The first image is replaced by the additional image and the steps of obtaining an additional image and subtracting the additional image from the first image are repeated such that progressive relative motion of the object is attained.

Also disclosed above is a method for controlling the steering system of a vehicle which comprises transmitting optical waves (visible, IR or eye-safe IR) toward an object located in the vicinity of the vehicle, obtaining one or more images of an exterior space proximate to the vehicle, analyzing each image to determine the distance between the object and the vehicle, and controlling steering system to prevent the operator from causing a collision with the object based on the determined distance between the object and the vehicle. The image may be analyzed by comparing the image of a portion of the exterior of the vehicle with stored images representing different arrangements of objects in the space proximate to the vehicle to determine which of the stored images match most closely to the image of the exterior of the vehicle, each stored image having associated data relating to the distance between the object in the image and the vehicle. The image comparison step may entail inputting the image or a form or part thereof into a neural network, combination neural network, system of neural networks or other pattern recognition system that provides for each such image, an index of a stored image that most closely matches the image of the exterior of the vehicle. In a particularly advantageous embodiment, the size of the object is measured and a vehicle system is controlled based on the determined distance between the object and the vehicle and the measured size of the object.

In another method disclosed above for determining the identification and position of objects proximate to a vehicle, one or more images of the exterior of the space proximate to the vehicle, or part thereof, of radiation emanating from the objects proximate to the vehicle, and the images of the radiation emanating from the objects are compared with stored images of radiation emanating from different objects proximate to the vehicle to determine which of the stored images match most closely to the images of the exterior objects of the vehicle such that the identification of the objects and their position is obtained based on data associated with the stored images. In this embodiment, there is no illumination of the object with optical waves. Nevertheless, the same processes described above may be applied in conjunction with this method, e.g., affecting another system based on the position and identification of the objects, a library of stored images generated, external light source filtering, noise filtering, occupant restraint system deployment control and the utilization of size of the object for vehicle system control.

Additionally disclosed above, among other things, is an arrangement for obtaining information about objects in an environment around a vehicle which comprises a light emitting device arranged on the vehicle for emitting infrared light into the environment around the vehicle, a receiver system arranged on the vehicle for receiving infrared light from the environment around the vehicle and a measurement device coupled to the light emitting device and the receiver device for measuring time between emission of the infrared light by the light emitting device and reception of the infrared light by the receiver device. The measured time correlates to distance between the vehicle and an object from which the infrared light is reflected. The light emitting device may comprise an array of laser diodes, a pulsed laser or a continuous laser beam directing infrared light in a line and controls the laser beam to change a direction of the infrared light such that infrared light traverses a volume of space alongside the vehicle. In the latter case, the receiver device could comprise a single pixel receptor. Otherwise, the receiver device may comprise a CCD array, a CMOS array, an HDRC camera, a dynamic pixel camera and an active pixel camera.

A processor or control circuitry is usually coupled to the receiver device, by the use of wires or even wirelessly, for providing an identification of the object from which light is reflected. The processor preferably utilizes pattern recognition techniques such as a neural network or even possibly a modular neural network to determine the distance between the vehicle and the object, the position of the object and/or the identity of the object from which light is reflected. The processor can be designed to create a three-dimensional map of a portion of the environment surrounding the vehicle based on the received optical waves or energy, and then extract features from the three-dimensional map. In the latter case, a display is provided in the passenger compartment visible to a driver of the vehicle for displaying features or representations derived from features extracted from the three-dimensional map.

As to the position of the light receiving components and associated receivers, they may be collocated or spaced apart from one another. When used for blind spot detection, they should be positioned around the vehicle to encompass the blind spots of the driver.

A system for controlling a vehicular system based on the presence of an object in an environment around a vehicle comprises any of the foregoing constructions of the arrangement for obtaining information about an object in the environment surrounding the vehicle. A vehicular system is then adapted to be controlled or adjusted upon the determination of the presence of an object in the environment around the vehicle. To this end, a processor is coupled to the arrangement and the vehicular system for obtaining the information about the object based at least on the infrared light received by the receiver device and controlling the vehicular system based on the obtained information. The vehicular system may be a display visible to a driver of the vehicle for displaying features or representations derived from features extracted from a three-dimensional map generated by the processor from the optical waves or energy received by the receiver device. The vehicular system could also be a steering wheel having an adjustable turning resistance, which is adjustable with a view toward avoiding accidents, and an audio alarm and a visual warning viewable by a driver of the vehicle.

A main feature of one embodiment of the invention is the combination of an optical system with superimposed infrared patterns. In other words, the basic system is a passive optical system. Another feature is the use of a high dynamic range camera that can be used to get the image. A third feature is to use modulated light or triangulation to determine the distance to an object in the blind spot. Another feature of the invention is to interpret and identify the image rather than just offering it to the driver. Still another feature of the invention is to provide methods of obtaining three-dimensional information about objects in the vicinity of the vehicle by using modulated illumination and phase information from the reflected light.

Note as stated at the beginning this application is one in a series of applications covering safety and other systems for vehicles and other uses. The disclosure herein goes beyond that needed to support the claims of the particular invention that is being claimed herein. This is not to be construed that the inventor is thereby releasing the unclaimed disclosure and subject matter into the public domain. Rather, it is intended that patent applications have been or will be filed to cover all of the subject matter disclosed above.

8.2 Anticipatory Sensors

In general terms, disclosed above is an inflator system for inflating an airbag which comprises a gas inflow mechanism for inflating the airbag with gas, a vent system (if present) for controlling removal of gas from the airbag, a first anticipatory crash sensor for determining that a crash requiring deployment of the airbag will occur based on data obtained prior to the crash and, upon the making of such a determination, directing the gas inflow mechanism to inflate the airbag, and a second crash sensor for determining that a crash requiring deployment of the airbag will occur or is occurring and, upon the making of such a determination, controlling the vent system to enable the removal of gas from the airbag whereby the pressure in the airbag is changed by the removal of gas therefrom enabled by the vent system.

The gas inflow mechanism may be in the form of an inflator, which can be an aspirated inflator, which is activated to produce gas and release the gas through conduits into the interior of the airbag. The gas inflow mechanism can also be in the form of a tank of pressurized gas and a valve in a conduit leading from the tank to the interior of the airbag whereby opening of the valve causes flow of gas from the tank into the airbag. Any other type of structure or method which serves to cause accumulation of gas in the interior of the airbag can also be used as the gas inflow mechanism in accordance with the invention. The gas inflow mechanism can also constitute multiple inflators which are independently activated based on, the severity of the anticipated crash. In this case, one inflator would be activated for a minor or average crash whereas for a more severe crash, two or more inflators would be activated thereby increasing the flow of gas into the airbag and the inflation rate and/or pressure therein. Each inflator could be controlled by the same or a different crash sensor.

The vent system may be in the form of a variable outflow port or vent integral with the airbag, e.g., a flap built in an exterior surface of the airbag and providing a regulatable conduit between the interior of the airbag and exterior of the airbag (regulatable both with respect to the amount of gas flowing therethrough and/or the rate of gas flowing therethrough). The vent system may also be in the form of a conduit leading from the interior of the airbag to the exterior of the airbag and having a regulatable valve in the conduit whereby regulated opening of the valve causes removal of gas from the interior of the airbag. In some cases, notably most curtain airbags, a vent is not used and in others the gas from the airbag is vented back through the inflator assembly.

The airbag may be, but is not required to be, a side airbag arranged to inflate between the occupant and the side door. Regardless of the direction of the crash which will causes deployment of the airbag, it is beneficial to provide some form of an occupant displacement permitting system arranged in connection with the seat for permitting the occupant to be displaced away from the airbag mounting surface upon inflation of the airbag and thereby increase the space between the occupant and the airbag mounting surface. Thus, if the airbag is a side airbag mounted in the side door, it is beneficial to enable displacement of the occupant away from the side door. Such occupant displacement permitting or enabling system may be in the form of some structure which introduces slack into the seatbelt in conjunction with the deployment of the airbag or a mechanism by which the seat can be moved or is actually moved away from the side door, e.g., tilted inward.

The airbag can also be arranged to inflate to protect a rear-seated occupant and to this end, would be arranged in a back portion of the seat, attached to the back portion of the seat and/or integral with the back portion of the seat. It can also be inflated to protect occupants from striking each other by deploying the airbag between adjacent seats.

For any positioning and use, the airbag can be arranged in a housing of an airbag module. The airbag module could extend substantially along a vertical length of the back portion of the seat for a side airbag.

Another embodiment of the inflator system comprises an inflator for releasing a gas into the at least one airbag, a first anticipatory crash sensor for determining that a crash requiring deployment of the airbag will occur based on data obtained prior to the crash and, upon the making of such a determination, triggering the inflator to release gas into the airbag, and a second crash sensor for determining that a crash requiring deployment of the airbag will occur or is occurring and, upon the making of such a determination, changing the rate at which gas accumulates in the airbag. To this end, the second crash sensor is structured and arranged to control outflow of gas from the airbag. Outflow of gas from the airbag may be controlled via a variable outflow port.

A method for inflating an airbag comprises making a first determination by means of an anticipatory crash sensor that a crash requiring deployment of the airbag will occur based on data obtained prior to the crash and, upon the making of such a determination, inflating the airbag, and making a second, separate determination by means of a second crash sensor that a crash requiring deployment of the airbag will occur or is occurring and, upon the making of such a determination, changing the rate at which gas accumulates in the airbag. The rate at which gas accumulates in the airbag may be changed by enabling and regulating outflow of gas from the airbag.

In accordance with another embodiment of the invention, a vehicle comprises one or more inflatable airbags deployable outside of the vehicle, an anticipatory sensor system for assessing the probable severity of an impact involving the vehicle based on data obtained prior to the impact and initiating inflation of the airbag(s) in the event an impact above a threshold severity is assessed, and an inflator coupled to the anticipatory sensor system and the airbag for inflating the airbag when initiated by the anticipatory sensor system. The airbag may be housed in a module mounted along a side of the vehicle, in a side door of the vehicle, at a front of the vehicle or at a rear of the vehicle.

The anticipatory sensor system may comprise at least one receiver for receiving waves or energy and a pattern recognition system, e.g., data storage medium embodying a pattern recognition algorithm or neural network, for analyzing the received waves or energy or data representative of the received waves or energy to assess the probable severity of the impact. The pattern recognition system may also be designed to identify an object from which the waves or energy have been emitted or generated, in which case, the assessment of the probable severity of the impact is at least partially based on the identification of the object. The pattern recognition system can also be designed to determine at least one property of an object from which the waves or energy have been emitted or generated, in which case, the assessment of the probable severity of the impact is at least partially based on the determined at least one property of the object.

Also disclosed herein is an airbag passive restraint system for protecting an occupant adjacent the door in a side impact which comprises an airbag arranged to inflate between the door and the occupant and a side impact anticipatory sensor for determining that an accident requiring deployment of the airbag is about to occur prior to the accident. The sensor is arranged to receive waves generated by, modified by or reflected from an object about to impact the vehicle resulting in the accident and comprises an identifying and determining device for identifying the object based on a pattern of the received waves and determining whether the identified object will cause an accident requiring deployment of the airbag. The system also includes an inflator coupled to the sensor for inflating the airbag if the sensor determines that an accident requiring deployment of the airbag is about to occur. The identifying and determining device may comprise a neural network trained on data of possible patterns of received waves in conjunction with an identification of the object the received waves have been generated by, modified by or reflected from. In the alternative, the identifying and determining device may comprise a fuzzy logic algorithm or a rule based pattern recognition algorithm. The sensor may be arranged to receive electromagnetic waves or acoustic waves.

Another disclosed embodiment of a system for triggering deployment of an airbag passive restraint system in anticipation of an accident between the vehicle and an object approaching the vehicle comprises a transmitter arranged on the vehicle for sending waves toward the object, a receiver system arranged on the vehicle for receiving modified or reflected waves from the object and producing a signal representative of the waves, an identifying and determining device for identifying the object based on a pattern of the received waves and determining whether the identified object will cause an accident requiring deployment of the passive restraint system and a triggering system responsive to the identifying and determining for initiating deployment of the passive restraint system if the identifying and determining device determines that an accident requiring deployment of the passive restraint system is about to occur. The transmitter may be arranged to transmit electromagnetic waves, such as radar waves, or ultrasonic waves. The identifying and determining device may comprise a neural network trained on data of possible patterns of received waves in conjunction with an identification of the object the received waves have been modified by or reflected from, a fuzzy logic algorithm or a rule based pattern recognition algorithm. The transmitter may also comprise a laser transmitter and the receiver system may comprise one or more charge coupled devices or CMOS sensing arrays Still another disclosed embodiment of a system for triggering deployment of an airbag passive restraint system in anticipation of an accident between the vehicle and an object approaching the vehicle comprises a receiver system for receiving electromagnetic waves generated, reflected or modified by the object, an identifying and determining device for identifying the object based on a pattern of the received waves and determining whether the identified object will cause an accident requiring deployment of the passive restraint system and a triggering system responsive to the identifying and determining device for initiating deployment of the passive restraint system if the identifying and determining device determines that an accident requiring deployment of the passive restraint system is about to occur. The receiver system may be arranged to receive light waves or infrared waves. As in the embodiments discussed above, the identifying and determining device may comprise a neural network trained on data of possible patterns of received waves in conjunction with an identification of the object the received waves have been generated, reflected or modified by, a fuzzy logic algorithm or a rule based pattern recognition algorithm. The receiver system may comprise a charge-coupled device or CMOS sensing array of a plurality of such components.

Also disclosed is a method for controlling deployment of a passive restraint system in anticipation of an accident with an approaching object which comprises mounting at least one receiver on the vehicle to receive waves generated by, modified by or reflected from an object exterior of the vehicle, conducting training identification tests on a plurality of different classes of objects likely to be involved in a vehicular accident, each of the tests comprising receiving waves generated by, modified by or reflected from the object by means of the receiver(s) and associating an object class with data from each test, and generating an algorithm from the training test results, associated object classes and an indication as to whether deployment of the passive restraint system is necessary such that the algorithm is able to process information from the received waves from the receiver(s), identify the class of the object and determine whether deployment of the passive restraint system is necessary. During operational use, a plurality of waves generated by, modified by or reflected off an object exterior of the vehicle are received by means of the receiver(s) and the algorithm is applied using the received waves as input to identify the object exterior of the vehicle and determine whether deployment of the passive restraint system is necessary. At least one transmitter may be mounted on the vehicle to transmit waves toward the object exterior of the vehicle such that the waves are reflected off or modified by the object exterior of the vehicle and received by the receiver(s).

Any of the airbag passive restraint systems described herein may be used in conjunction with the variable inflation rate inflator system described above, or with aspirated inflators, and may be used in conjunction with one another to optimize protection for the occupant.

Another possible method entails the use of an externally deployable airbag system for protecting the occupant in a side impact with an impacting object. This method would involve determining that a side impact requiring deployment of an airbag outside of the vehicle between the side of the vehicle and the impacting object is required based on data obtained prior to the crash, and then inflating the airbag in the event a side impact requiring deployment of the airbag is detected.

Some embodiments of inventions disclosed above comprises an anticipatory crash sensor arrangement which provides information about an object such as a vehicle about to impact the resident vehicle, i.e., the vehicle in which the anticipatory crash sensor arrangement is situated, and causes inflation of one or more airbags. For example, internal and/or external airbags might be deployed. One particular embodiment comprises an anticipatory sensor system which uses (i) a source of radiant energy either originating from or reflected off of an object or vehicle which is about to impact the side of a target vehicle, plus (ii) a pattern recognition system to analyze the radiant energy coming from the soon-to-be impacting object or vehicle to (iii) assess the probable severity of a pending accident and (iv) if appropriate, inflate an airbag prior to the impact so as to displace the occupant away from the path of the impacting object or vehicle to create space required to cushion the occupant from an impact with the vehicle interior. Instead of or in addition to inflation of an airbag in the interior of the vehicle, an airbag may be inflated exterior of the vehicle to resist the force of the colliding object and thereby reduce the severity of the collision.

Although the primary area of application of some embodiments of inventions disclosed herein is for protection in side impacts, embodiments of the invention also provide added protection in frontal impacts by reducing the incidence of injury to out-of-position occupants by permitting a slower inflation of the airbag and displacing the occupant away from the airbag prior to the impact. Additionally, it can provide added protection in rear impacts by reducing the incidence of injury caused by impacts of the occupant's head with the headrest by pre-positioning the headrest adjacent the head of the occupant based on an anticipatory rear impact sensor.

Also disclosed herein is a method for obtaining information about objects in an environment around a vehicle which includes emitting infrared or visible light from the vehicle into a portion of the environment around the vehicle, receiving infrared light from the portion of environment around the vehicle, measuring distance between the vehicle and an object from which the infrared light is reflected based on the emission of the infrared light and reception of the infrared light, determining an identification of the object from which light is reflected based at least in part on the received infrared light, creating a three-dimensional representation of the portion of the environment around the vehicle from which infrared light is received based on the measured distance and the determined identification of the object, and displaying on a display visible to the driver icons representative of the objects and their position relative to the vehicle based on the three-dimensional representation.

There are numerous ways to measure distance between the vehicle, i.e., the location of the sensor at which the infrared light is received and possibly emitted. These include using structured light, measuring time of flight of the infrared light, modulating the infrared light and measuring the phase shift between the modulated and received infrared light, emitting noise, pseudonoise or code modulated infrared light in combination with a correlation technique, focusing the received infrared light, receiving infrared light at multiple locations or stereographically, range-gating the emitted and received infrared light and using triangulation.

Identification of each object may be determined using a trained pattern recognition technique or a neural network. Also, if images of the environment around the vehicle are formed from the received infrared light, then the determination of the identification of each object can be based on analysis of the images and on the measured distance. Each image can be processed in combination with the distance between the vehicle and the object from which the infrared light is reflected to determine the identification of the object.

A method for controlling a vehicular system based on the presence of an object in an environment around a vehicle in accordance with the invention includes emitting infrared light from the vehicle into a portion of the environment around the vehicle, receiving infrared light from the portion of environment around the vehicle, measuring distance between the vehicle and an object from which the infrared light is reflected based on the emission of the infrared light and reception of the infrared light, determining the presence of and an identification of the object from which light is reflected based at least in part on the received infrared light, and controlling or adjusting a vehicular system based on the determination of the presence of an object in the environment around the vehicle and the identification of the object and the distance between the object and the vehicle.

In one embodiment, the velocity of the object is determined and the vehicular system is controlled or adjusted based on the determination of the presence of an object in the environment around the vehicle, the identification of the object, the distance between the object and the vehicle and the velocity of the object.

Also, the expected future path of the vehicle may be monitored and a warning provided when the expected future path of the vehicle approaches within a threshold distance of an identified object or vice versa.

The same techniques for measuring distance between the vehicle and the object described above can be applied in this method.

Another method for controlling a vehicular system based on the presence of an object in an environment around a vehicle in accordance with the invention includes emitting infrared light from the vehicle into a portion of the environment around the vehicle, receiving infrared light from the portion of environment around the vehicle, determining the position and velocity of an object in the environment around the vehicle and from which infrared light is reflected based on the emission of the infrared light and reception of the infrared light, classifying the object from which light is reflected based on the reception of the infrared light, and controlling or adjusting a vehicular system based on the classification of the object and the position and velocity of the object. The same enhancements to the methods described above can be applied in this method.

This invention is also a system to identify, locate and monitor objects outside of a motor vehicle, such as a tractor, bulldozer, automobile or truck, by illuminating the objects outside of the vehicle with electromagnetic or ultrasonic radiation, and if electromagnetic, preferably infrared radiation, or using radiation naturally emanating from the object, or reflected from the environment and using one or more horns, reflectors or lenses to focus images of the contents onto one or more arrays of charge coupled devices (CCDs) or CMOS arrays, or on a single detector. Outputs from the CCD or CMOS arrays or other detector may be analyzed by appropriate computational systems employing trained pattern recognition technologies, to classify, identify and/or locate the external objects. In general, the information obtained by the identification and monitoring system may be used to affect the operation of at least one other system in the vehicle.

In some embodiments of the invention, several CCD or CMOS arrays are placed in such a manner that the position and the motion of an object toward the vehicle can be monitored as a transverse motion across the field of the array. In this manner, the need to measure the distance from the array to the object is obviated. In other embodiments, a source of infrared light is a pulse modulated laser which permits an accurate measurement of the distance to the point of reflection through the measurement of the time-of-flight of the radiation pulse which may use the technique of range gating. In still other embodiments, a scanning array of infrared LEDs are used to illuminate spots on the object in such a manner that the location of the reflection of the spot in the field of view provides information as to the location of the object relative to the vehicle through triangulation.

In some embodiments, the object being monitored is the ground.

In still other embodiments, a scanning laser diode or equivalent is modulated and the distance determined by phase measurement with or without range gating. The light can also be modulated with more than one frequency, or with a random, pseudo-random or other code to extend the range without a loss in range accuracy at the expense of slightly more complicated electronics and/or software.

In some applications, a trained pattern recognition system, such as a neural network or neural-fuzzy system, is used to identify the object in the blind spot of the vehicle. In some of these cases, the pattern recognition system determines which of a library of images most closely matches the object in the blind spot and thereby the location of the object can be accurately estimated from the matched images and the relative size of the captured image thus removing the requirement for special lighting or other distance measuring systems.

When the wave transmitter is arranged to transmit electromagnetic waves and the wave receiver to receive electromagnetic waves, the processor may be arranged to determine both the distance between a wave transmission and reception point and the ground based on a phase difference or time of flight between the transmitted and received waves and the speed of travel of the vehicle on the ground based on the Doppler velocity. The wave receiver optionally includes a notch filter for filtering light other than infrared light emitted by the wave transmitter. Optionally, the wave receiver comprises a light valve.

In another embodiment of the invention, the vehicle comprises a wave emitting mechanism arranged on the vehicle for emitting waves at an angle toward the ground near the vehicle, a receiver mechanism arranged on the vehicle for receiving waves reflected from the ground near the vehicle, a vehicular system adapted to be controlled or adjusted based on the velocity of the vehicle relative to the ground, and a processor coupled to the wave emitting mechanism, the receiver mechanism and the vehicular system for determining the velocity of the vehicle relative to the ground and the distance to the ground based on the transmission of waves by the wave emitting mechanism and reception of waves by the receiver mechanism. The processor uses the determined distance to correct the determined velocity of the vehicle relative to the ground and controlling the vehicular system based on the corrected velocity. The waves are transmitted by the wave emitting mechanism in pulses or modulated such that the processor is able to determine the distance between a wave-transmission and reception point and the ground and the velocity of the vehicle based on analysis of the waves transmitted by the wave emitting mechanism and the waves received by the wave receiver mechanism. The same features described for the vehicle above may be used in this embodiment as well.

As stated at the beginning this application is one in a series of applications covering safety and other systems for vehicles and other uses. The disclosure herein goes beyond that needed to support the claims of the particular invention that is being claimed herein. This is not to be construed that the inventor is thereby releasing the unclaimed disclosure and subject matter into the public domain. Rather, it is intended that patent applications have been or will be filed to cover all of the subject matter disclosed above.

The inventions described above are, of course, susceptible to many variations, combinations of disclosed components, modifications and changes, all of which are within the skill of those practicing the art. It should be understood that all such variations, modifications and changes are within the spirit and scope of the inventions and of the appended claims. Similarly, it will be understood that applicant intends to cover and claim all changes, modifications and variations of the examples of the preferred embodiments of the invention herein disclosed for the purpose of illustration which do not constitute departures from the spirit and scope of the present invention as claimed.

Although several preferred embodiments are illustrated and described above, there are possible combinations using other geometries, sensors, materials and different dimensions for the components that perform the same functions. This invention is not limited to the above embodiments and should be determined by the following claims.

The invention claimed is:

1. A vehicle, comprising:
a reactive system that controls the motion or travel direction of the vehicle; and
an anticipatory sensor system that determines that an impact involving the vehicle is about to occur unless a corrective action is taken based on data obtained prior to the impact and determining whether the potential impact requires activation of said reactive system;
said anticipatory sensor system comprising at least one receiver that receives waves or energy and a pattern recognition system that analyzes the received waves or energy or data representative of the received waves or energy to determine that an impact is about to occur if corrective action is not taken and to determine whether the potential impact requires activation of said reactive system,
said pattern recognition system being arranged to ascertain the identity of an object from which the waves or energy have been emitted, reflected or generated, the determination whether the impact requires activation of said reactive system being at least partially based on the identification of the object,
said pattern recognition system comprising a processor embodying a pattern recognition algorithm which provides an output of one of a number of pre-determined identities of the object,
said anticipatory sensor system further comprising at least one transmitter that transmits waves or energy away from the vehicle,
said at least one receiver receiving waves or energy transmitted by said at least one transmitter which have been reflected from objects exterior of the vehicle,
the received waves or energy being analyzed by said pattern recognition system to enable the determinations that an impact involving the vehicle is about to occur and that the impact requires activation of said reactive system,
said at least one transmitter transmitting infrared waves in an eye-safe range.

2. The vehicle of claim 1, wherein the vehicle has a front, a rear, a left side and a right side, said anticipatory sensor comprising a monitoring system that monitors at least one of the front, rear, right or left side of the vehicle.

3. The vehicle of claim 1 wherein said reactive system is a system which is arranged to activate at least one of the brakes of the vehicle, a throttle of the vehicle or steering of the vehicle.

4. The vehicle of claim 1, wherein said pattern recognition system is further arranged to determine that the object from which the waves or energy have been emitted, reflected or generated, is a human, pedestrian, animal or cyclist.

5. The vehicle of claim 1, wherein said pattern recognition system is arranged to receive images from said at least one receiver and analyze images of the object in order to ascertain the identity thereof.

6. The vehicle of claim 5, wherein said pattern recognition system is arranged to perform image subtraction when analyzing the images.

7. The vehicle of claim 6, wherein the received waves or energy are analyzed by said pattern recognition system to enable determination of the identity of the object, said at least one receiver and said at least one transmitter being controlled such that said at least one receiver receives a first image of the object illuminated by waves transmitted from the vehicle and a second image of the object which is not illuminated by waves transmitted from the vehicle, said pattern recognition system analyzing the first and second images in relation to one another.

8. The vehicle of claim 1, wherein said at least one transmitter is controlled such that the intensity of transmitted infrared waves is determined at least in part by the distance to the reflecting object.

9. The vehicle of claim 1, wherein said anticipatory sensor system is arranged to apply range gating to select a range of an object to be identified.

10. The vehicle of claim 1, wherein said monitoring system monitors a rear of the vehicle and said reactive system is a system which activates the brakes of the vehicle.

11. A vehicle, comprising:
a reactive system that controls the motion or travel direction of the vehicle; and
an anticipatory sensor system that determines that an impact involving the vehicle is about to occur unless a corrective action is taken based on data obtained prior to the impact and determining whether the potential impact requires activation of said reactive system;
said anticipatory sensor system comprising at least one receiver that receives waves or energy and a pattern recognition system that analyzes the received waves or energy or data representative of the received waves or energy to determine that an impact is about to occur if corrective action is not taken and to determine whether the potential impact requires activation of said reactive system,
said pattern recognition system being arranged to ascertain the identity of an object from which the waves or energy have been emitted, reflected or generated, the determination whether the impact requires activation of said reactive system being at least partially based on the identification of the object,
said pattern recognition system comprising a processor embodying a pattern recognition algorithm which provides an output of one of a number of pre-determined identities of the object,
said anticipatory sensor system further comprising at least one transmitter that transmits waves or energy away from the vehicle,
said at least one receiver receiving waves or energy transmitted by said at least one transmitter which have been reflected from objects exterior of the vehicle, the received waves or energy being analyzed by said pattern recognition system to enable the determinations that an impact involving the vehicle is about to occur and that the impact requires activation of said reactive system, said at least one transmitter being arranged to transmit infrared waves and being controlled such that the intensity of transmitted infrared waves is determined at least in part by the distance to the reflecting object.

12. A method for protecting an occupant of a vehicle during an impact between the vehicle and an object, comprising:

determining that an impact involving the vehicle is about to occur if corrective action is not taken prior to the impact;

determining whether the impact requires activation of a reactive system for controlling motion or travel direction of the vehicle, the step of determining whether the impact requires activation of the reactive system comprising:

receiving waves or energy from the object, and ascertaining the identity of the object based on the received waves or energy by inputting the received waves or energy or data representative of the received waves or energy into a pattern recognition algorithm which ascertains the identity of the object based thereon, the pattern recognition algorithm being designed to provide an output of one of a number of pre-determined identities of the object; and activating the reactive system when the impact is determined to require such activation, the step of determining that an impact is about to occur comprising transmitting waves away from the vehicle, receiving the transmitted waves after the waves have been reflected from the object and analyzing the received waves, the transmitted waves being infrared waves in an eye-safe range.

13. The method of claim 12, further comprising designing the pattern recognition algorithm to identify at least one of a human, pedestrian, animal and a cyclist.

14. The method of claim 12, further comprising determining an intensity of the infrared waves based at least in part on a distance to the reflecting object.

15. The method of claim 12, wherein the step of activating the reactive system comprises activating at least one of the brakes of the vehicle, throttle of the vehicle or steering of the vehicle.

16. The method of claim 12, further comprising using range gating to select a range of an object being monitored for potential impact with the vehicle.

* * * * *